(12) United States Patent
Suemura et al.

(10) Patent No.: US 6,243,178 B1
(45) Date of Patent: Jun. 5, 2001

(54) OPTICAL CROSSBAR NETWORK USING WAVELENGTH DIVISION MULTIPLEXING AN OPTICAL CROSSBAR EXCHANGE

(75) Inventors: Yoshihiko Suemura; Yoshiharu Maeno, both of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/003,759

(22) Filed: Jan. 7, 1998

(30) Foreign Application Priority Data

| Jan. 7, 1997 | (JP) | 9-000793 |
| Apr. 28, 1997 | (JP) | 9-111044 |
| Nov. 12, 1997 | (JP) | 9-310179 |

(51) Int. Cl.$^7$ .................................................. H04J 14/02
(52) U.S. Cl. .......................................... 359/128; 359/117
(58) Field of Search .................................. 359/123, 117, 359/128, 139

(56) References Cited

U.S. PATENT DOCUMENTS

| 5,194,977 | * | 3/1993 | Nishio ................................... | 359/128 |
| 5,450,224 | * | 9/1995 | Johansson .............................. | 359/128 |
| 5,703,707 | * | 12/1997 | Dieudonne et al. ................... | 359/128 |
| 6,061,156 | * | 5/2000 | Takeshita et al. .................... | 359/117 |
| 6,061,482 | * | 5/2000 | Davis .................................... | 359/128 |

FOREIGN PATENT DOCUMENTS

| 0639015 | 2/1995 | (EP) . |
| 62-90626 | 4/1987 | (JP) . |
| 62-90627 | 4/1987 | (JP) . |
| 6181585 | 6/1994 | (JP) . |
| 7087097 | 3/1995 | (JP) . |

OTHER PUBLICATIONS

Tai, C., et al., Dynamic Range and Switching Speed Limitations of an N x N Optical Packet Switch Based on Low Gain Semiconductor Optical Amplifiers; Apr. 1996, Journal of Lightwave Technology.

Jin, Yongdong, "An Optical Cross–Connect System as a High Speed Switching Core and Its Performance Analysis", Jun. 1996, Journal of Lightwave Technology, vol. 14, No. 6.

Moser, L.E., et al., "Lossless packet switching with small buffers" Oct. 1996, IEE Proceedings, vol. 143, No. 5.

* cited by examiner

Primary Examiner—Leslie Pascal
(74) Attorney, Agent, or Firm—Ostrolenk, Faber, Gerb & Soffen, LLP

(57) ABSTRACT

Including optical transmitters for producing optical signals on different wavelengths, an optical network comprises an optical crossbar exchange for exchanging the optical signals into an exchanged signal, demultiplexers for demultiplexing the exchanged signals into receiver input signals, optical receivers for converting the receiver input signals into electric output signals, and memory units for storing the output signals as their contents and producing at least one of the contents as a reception signal upon request. It is possible to make such an optical network deal with multiplexed optical signals as the above-mentioned optical signals particularly when supplied with multiplexed electric transmission signals to multiplexed optical signal transmitters.

6 Claims, 34 Drawing Sheets

OPTICAL CROSSBAR NETWORK USING WAVELENGTH DIVISION MULTIPLEXING AN OPTICAL CROSSBAR EXCHANGE

BACKGROUND OF THE INVENTION

This invention relates to an optical switch network or optical network for use in a network comprising a plurality of computers, an optical exchange network, or a like information switching network.

Comprising optical switches for switching optical signals, an optical network is preferred as a large-capacity network which can not be implemented by purely electric networks. Various optical crossbar exchanges or switches are known which comprise optical switches made of lithium niobate matrix switches or semiconductor optical amplifiers operable as gate switches. Various structures are furthermore known for use as such optical networks.

In the manner which will later be described a little more in detail, a paper was contributed by Yoshiharu Maeno and two others, namely, Yoshihiko Suemura one of the present joint inventors, and another, to the 1996 General Meeting of the Institute of Electronics, Information, and Communication Engineers of Japan, as Paper No. SB-9-5, under the title of "The Possibility of Optical Switching Technology for Parallel Processing Systems" as translated by the contributors. Another paper was contributed by Osamu Ishida and three others to the 1996 Telecommunication Society Meeting of the Institute of Electronics, Information, and Communication Engineers of Japan, as Paper No. B-1072, under the title of "Parallel-Optical-Interconnecting Multiwavelength Star Network (POIMS Net) for High Capacity Switching" as translated by the contributors.

A similar paper was contributed by O. Ishida and two others to the Electronics Letters, the 12th September 1996 Issue, Volume 32, No. 19, pages 1804 to 1805, under the title of "Parallel-optical-interconnecting multiwavelength star network (POIMS Net) for high-capacity switching".

According to the Maeno et al paper, an optical network is for use between a plurality of transmitting nodes and a plurality of receiving nodes in transmitting a transmission electric signal from one of the transmitting nodes as an optical signal selectively to one of the receiving nodes through an optical crossbar exchange. It will be presumed that such an electric signal is a sequence of packets, each having a packet duration of a certain number of bits, such as four bits. Two of the transmitting nodes may concurrently send respective packet sequences to the optical network.

This Maeno et al optical network comprises memory units, such as FIFO (first-in first-out) units, connected to the transmitting nodes, respectively. Optical transmitters are connected to the memory units, respectively, and to the optical crossbar exchange. Optical receivers are connected to the optical crossbar exchange and respectively to the receiving units. The optical crossbar exchange comprises optical splitters connected respectively through input waveguides to the optical transmitters. Each optical splitter splits the optical signal into a plurality of split signals, equal in number to the receiving nodes. It will be surmised that the transmitting nodes are equal to or less in number than a first predetermined integer N which is not less than two and that the receiving nodes are similarly equal to or not less in number than N.

In the optical crossbar exchange, N amplifier groups are connected respectively to the optical transmitters through the input waveguides. Each amplifier group consists of N semiconductor optical amplifiers. As a consequence, $N^2$ or square-N semiconductor optical amplifiers are connected to the input waveguides. Each semiconductor optical amplifier serves as the gate switch controlled by a destination of the packet sequence of the split signal to make the split signal pass therethrough to one of N optical combiners that corresponds to the destination. Through N output waveguides, the optical combiners are respectively connected to the optical receivers.

According to each Ishida et al paper referred to above, an optical network is similar to the Maeno et al optical network except for primarily the fact that this Ishida et al optical network has an increased propagation capacity by using a wavelength multiplexed signal in which optical signals of M wavelength, such as first to fourth wavelengths $\lambda 0$, $\lambda 1$, $\lambda 2$, and $\lambda 3$, are multiplexed, where M represents a second predetermined integer which is not less than two. Consequently, M optical transmitters are connected to each memory unit as a transmitter group capable of producing up to M optical signals of different wavelengths respectively in response to up to M packet sequences transmitted from one of the transmitting nodes that is connected to the transmitter group through one of the memory units. Such N transmitter groups can therefore concurrently deliver up to N wavelength multiplexed signals, namely, up to NM individual-wavelength signals, to an input side of the optical crossbar exchange. Connected to an output side of the optical crossbar exchange, are N optical or wavelength demultiplexers, each for demultiplexing such a wavelength multiplexed signal into M individual-wavelength signals for delivery respectively to M optical receivers connected as one of N receiver groups for the receiving nodes, respectively.

It should be noted in connection with such conventional optical networks of Maeno et al and Ishida et al that the memory units are indispensable on supplying the packet sequences to the optical transmitters. If at least two different packet sequences should concurrently be directed from the transmitting nodes to a common receiving node of the receiving nodes without the memory units, a conflict or collision would occur between two single-wavelength signals in either the Maeno et al optical signals or in the wavelength multiplexed signals on one of the output waveguides that is assigned in the optical crossbar exchange to the common receiving node. The memory units are therefore indispensable in temporarily storing such two conflicting packet sequences until an arbitration or compromise is settled therebetween to deliver a privileged one of the conflicting packet sequences to the optical crossbar exchange either through one of the N optical transmitters alone or through such a one of the NM optical transmitters and the optical multiplexer connected to one of the N transmitter groups that includes this one of the NM optical transmitters. The other or others of the conflicting packet sequences are held in the memory units until the privileged packet sequence is delivered through the optical crossbar exchange. Such an optical network is herein called an input buffered switch network.

It is known that throughput of the input buffered switch network can not exceed a theoretical restriction of 58.6%. This restriction is described in a book which is originally written by Martin der Pryker and published by the Prentice-Hall, Inc., and is translated into the Japanese language, pages 178 to 189, by Matusima-Hideki as transliterated according to the ISO Standard No. 3602. It should be pointed out in this connection that, if a leading packet is not privileged in one of the packet sequences that is other than the privileged packet sequence, this nonprivileged packet sequence is held in the memory unit until completion of delivery of at least one simultaneously delivered packet of the privileged packet sequence out of the optical crossbar exchange even though a next following packet of the non-privileged packet sequence does not conflict with the packets concurrently produced at other transmitting nodes. This gives rise to the theoretical restriction.

It should moreover be noted in the conventional optical networks that the optical crossbar exchange comprises an appreciable number of the semiconductor optical amplifiers as optical gate switches, respectively. The optical crossbar exchange has N input ports connected either to the N optical transmitters or to the N optical multiplexers and N output ports connected either to N optical receivers directly or to the N optical demultiplexers. The number of optical gate switches is equal to a square of N. As a result, the optical crossbar exchange has a scale and requires a cost of manufacture, each of which much increases when the first predetermined integer increases.

SUMMARY OF THE INVENTION

It is consequently an object of the present invention to provide an optical network or optical switch network which is for transmitting an electric signal from one of a plurality of transmitting nodes to one of a plurality of receiving nodes as an optical signal through an optical crossbar exchange and in which it is unnecessary to preliminarily settle an arbitration among at least two electric signals transmitted from two or more of the transmitting nodes to a common one of the receiving nodes in order to thereby prevent a conflict from otherwise occurring in the optical crossbar exchange.

It is another object of this invention to provide an optical network which has a raised throughput beyond a known theoretical restriction.

It is still another object of this invention to provide an optical network in which the optical crossbar switch is compact and is of a low cost.

It is yet another object of this invention to provide an optical network in which the optical crossbar switch comprises a plurality of optical gate switches of a number that does not increases up to an enormous integer even when the number of the transmitting or the receiving nodes increases.

Other objects of this invention will become clear as the description proceeds.

In accordance with this invention, there is provided an optical network which is for use between at most N transmitting nodes and at most N receiving nodes, where N represents a primary predetermined integer which is not less than two, each of the transmitting nodes being for producing at most one transmission signal at a time, and which comprises (a) optical transmitter means for transmitting transmission signals of the transmitting nodes as optical signals of M wavelengths, where M represents a secondary predetermined integer which is not less than two, (b) input optical signal producing means responsive to the optical signals for producing exchange input signals, (c) an optical crossbar exchange device for exchanging the exchange input signals into exchanged signals, (d) output optical signal producing means responsive to the exchanged signals for producing a plurality of receiver input signals, and (e) optical receiver means responsive to the receiver input signals for producing reception signals for the receiving nodes, wherein the optical transmitter means comprises at most NM optical transmitters responsive to the transmission signals for producing the optical signals.

DESCRIPTION OF THE PREFERRED EMBODIMENTS

Figure 1:
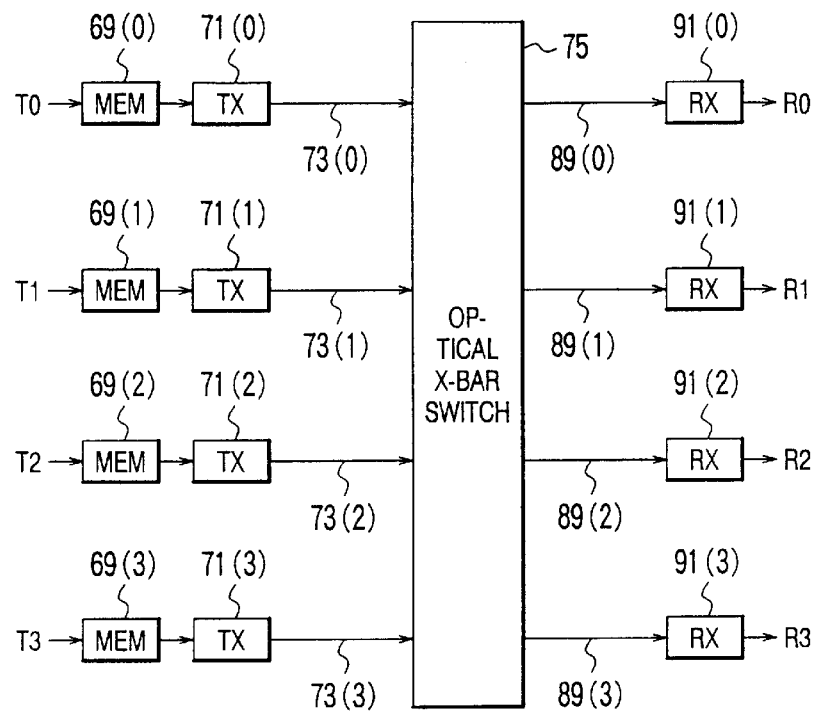
FIGS. 1 and 2 are block diagrams of conventional optical networks.
Figure 2:
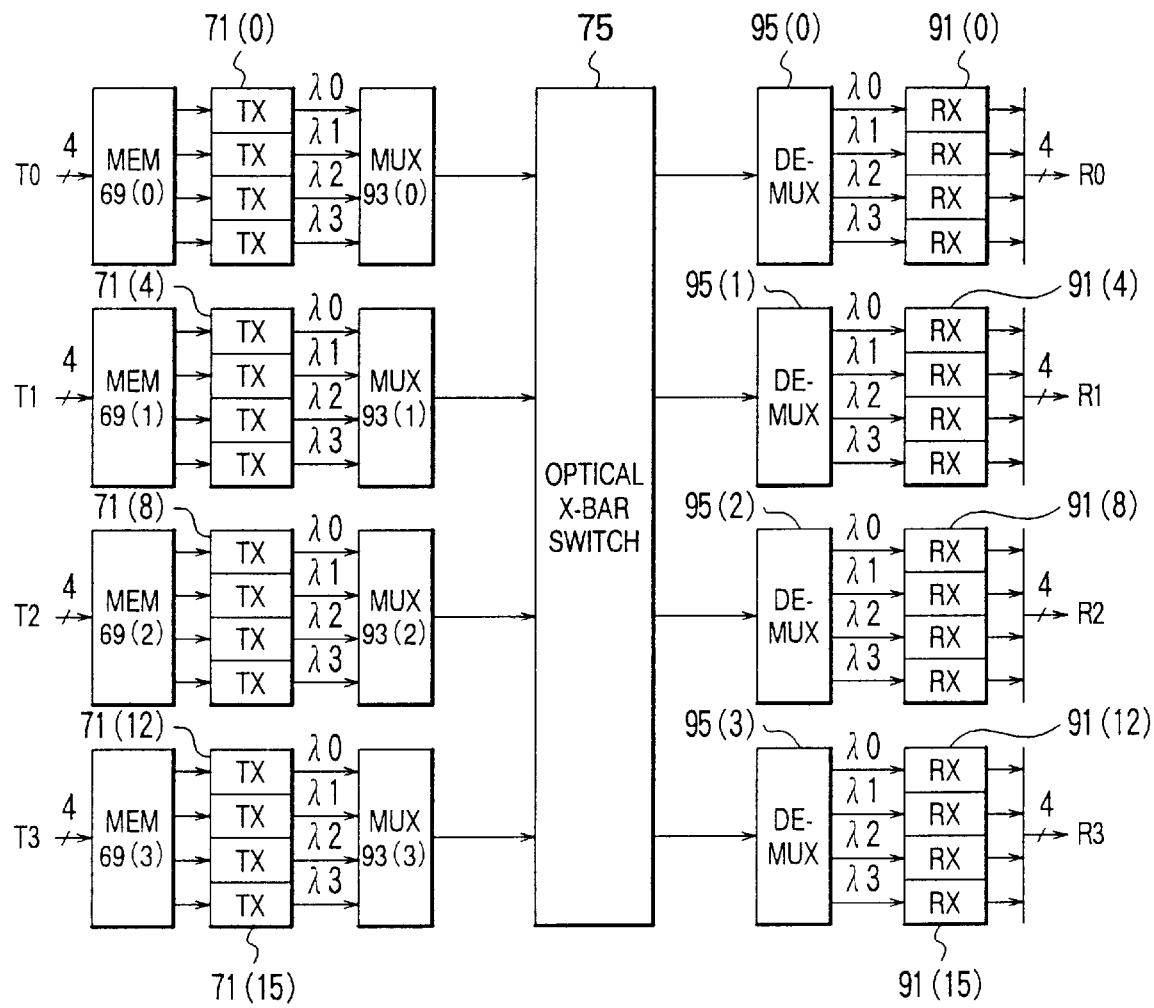

Referring to FIGS. 1 and 2, conventional optical networks will first be described in order to facilitate an understanding of the present invention. FIG. 1 shows the optical network described in the Maeno et al paper referred to hereinabove. FIG. 2 shows that described in the two Ishida et al papers referenced heretobefore.

In FIG. 1, the optical network is for use between N or less transmitting nodes T and N or less receiving nodes R, where N represents a primary predetermined integer which is not less than two. In the example being illustrated, the transmitting nodes T are zeroth to third transmitting nodes T0, T1, T2, and T3. The receiving nodes R are zeroth to third receiving nodes R0, R1, R2, and R3. Each transmitting node R is for producing an electrical information or transmission signal.

The optical network comprises zeroth to third memory units (MEM) 69(0), 69(1), 69(2), and 69(3) which will be referred to either singly as a memory unit 69 or collectively as memory units 69. The memory unit 69 is typically an FIFO (first-in first-out) unit for temporarily storing the transmission signal of a corresponding one of the transmitting nodes T as a buffered signal until an arbitration is settled in the manner described heretoabove among like buffered signals. Responsive to the buffered signals, zeroth to third optical transmitters (TX) 71(0), 71(0), 71(2), and 71(3) or 71 transmit the transmission signals as zeroth to third optical signals. Zeroth to third input connections or optical fibers 73(0), 73(0), 73(2), and 73(2) or 73 are herein optical waveguides for supplying the zeroth to the third optical signals as zeroth to third exchange input signals, respectively, to an optical crossbar exchange or switch 75.

Figure 3:
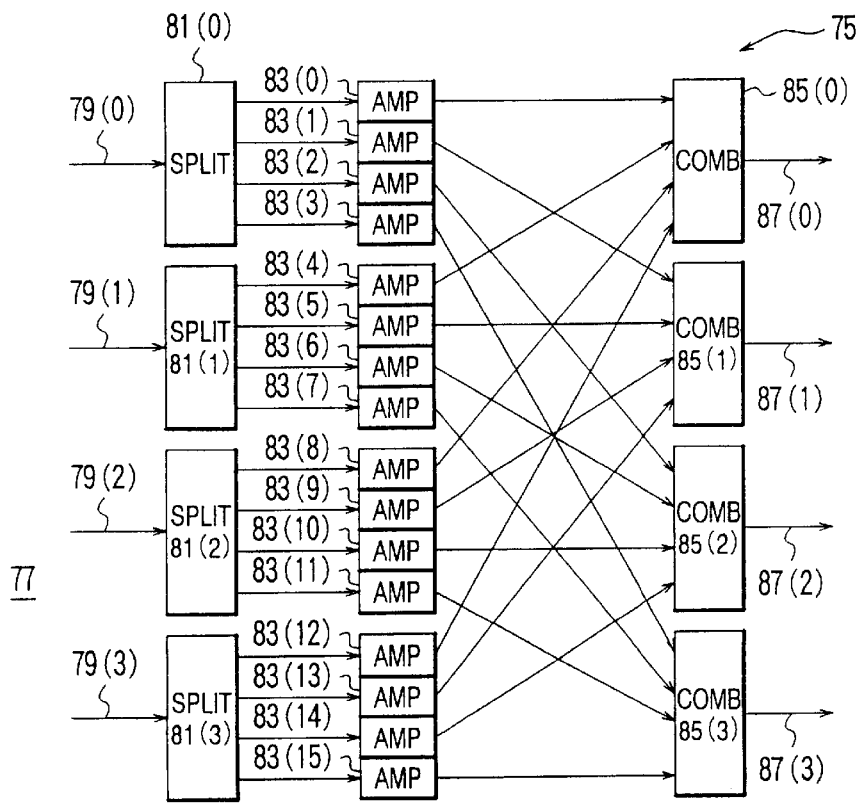
FIG. 3 is a block diagram of an optical crossbar exchange for use in each of the conventional optical networks and of an optical network according to the instant invention.

Turning to FIG. 3 during a short while, the optical crossbar exchange 75 comprises a semiconductor substrate 77 on which formed are zeroth to third input waveguides or ports 79(0), 79(1), 79(2), and 79(3) or 79 for receiving the zeroth to the third exchange input signals described above, respectively. Connected respectively to the zeroth to the third waveguides 79, are zeroth to third optical splitters (SPLIT) 81(0), 81(0), 81(2), and 81(3) or 81, each of which splits a supplied one of the zeroth to the third exchange input signals into one of N or primary to quaternary split signal groups consisting of $N^2$ or zeroth to fifteenth split signals.

Connected respectively to the zeroth to the third optical splitters 81, N or primary to quaternary amplifier groups consist of zeroth to third, fourth to seventh, eighth to eleventh, and twelfth to fifteenth semiconductor optical amplifiers (AMP) 83(0) to 83(2), 83(4) to 83(7), 83(8) to 83(11), and 83(12) to 83(15) or 83, respectively. Each semiconductor amplifier 83 serves as an optical gate switch rendered on and off, when a bias current is and is not supplied, to be operable as a crosspoint of the optical crossbar exchange 75. For example, the semiconductor optical amplifiers 83 have an electrical gain of 0 dB and minus 60 dB when the bias current is 30 mA and 0 mA, respectively, according to a request, which will become clear as the description proceeds. Produced in this manner, switched signals are delivered through intermediate waveguides to zeroth to third optical combiners (COMB) 85(0), 85(1), 85(2), and 85(3) or 85 connected to zeroth to third output waveguides or ports 87(0), 87(1), 87(2), and 87(3) or 87, respectively. More particularly, the intermediate waveguides connect the zeroth optical combiner 85(0) to the zeroth, the fourth, the eighth, and the twelfth semiconductor optical amplifiers 83(0), 83(4), 83(8), and 83(12), the first combiner 85(1) to the first, the fifth, the ninth, and the thirteenth optical amplifiers 83(0), 83(5), 83(9), and 83(13), the second combiner 85(2) to the second, the sixth, the tenth, and the fourteenth optical amplifiers 83(2), 83(6), 83(10), and 83(14), and the third combiner 85(3) to the third, the seventh, the eleventh, and the fifteenth optical amplifiers 83(2), 83(7), 83(11), and 83(15). The zeroth to the third optical combiners 85 deliver zeroth to third exchanged signals to the zeroth to the third output ports 87, respectively.

Turning back to FIG. 1, the above-mentioned output ports 87 of the optical crossbar exchange 75 are connected to zeroth to third output connections 89(0), 89(1), 89(2), and 89(3) or 89 which are herein optical fibers and are responsive to the zeroth to the third exchanged signals for producing zeroth to third receiver input signals, respectively. Responsive to the zeroth to the third receiver input signals, respectively, zeroth to third optical receivers 91(0), 91(0), 91(2), and 91(3) or 91 deliver zeroth to third reception signals to the zeroth to the third receiving nodes R, respectively.

More particularly referring to FIG. 2, each of the zeroth to the third transmitting nodes T produces zeroth to third transmission signals at a time directed to the zeroth to the third receiving nodes R, respectively, as a quadruple multiplexed electric signal. Supplied from the zeroth to the third memory units 69(0) to 69(3) with primary to quaternary transmission signal groups, respectively, primary to quaternary transmitter groups consist of zeroth to third, fourth to seventh, eighth to eleventh, and twelfth to fifteenth optical transmitters 71(0) to 71(3), 71(4) to 71(7), 71(8) to 71(11), and 71(12) to 71(15), respectively. In this manner, each of N transmitter groups consists of M optical transmitters, where M represents a secondary predetermined integer which is not less than two. In the example being illustrated, these (0 mod N)-th to ((N−1) mod N)-th optical transmitters are for producing (0 mod N)-th to ((N−1) mod N)-th optical signals of zeroth to third wavelengths λ0 to λ3, respectively, in the manner indicated by legends representative of such respective wavelengths. The zeroth to the third input connections 73 of FIG. 1 now consist of zeroth to third optical multiplexers (MUX) 93(0), 93(0), 93(2), and 93(2) or 93 for delivering zeroth to third wavelength multiplexed signals to the optical crossbar exchange 75 as the zeroth to the third exchange input signals, respectively, which are exchanged into the zeroth to the third exchanged signals.

The zeroth to the third output connections 89 of FIG. 1 now consist of zeroth to third optical demultiplexers (DEMUX) 95(0), 95(1), 95(2), and 95(3) or 95 for demultiplexing the zeroth to the third exchanged signals to N or primary to quaternary receiver input signal groups which consist of zeroth to third, fourth to seventh, eighth to eleventh, and twelfth to fifteenth receiver input signals and are delivered to N or primary to quaternary receiver groups connected to the zeroth to the third receiving nodes R and consisting of zeroth to third, fourth to seventh, eighth to eleventh, and twelfth to fifteenth optical receivers 91(0) to 91(3), 91(4) to 91(7), 91(8) to 91(11), and 91(12) to 91(15) or 91, respectively.

Reviewing FIGS. 1 to 3, a collision takes place without the memory units, for example, when the zeroth and the first transmitting nodes T0 and T1 are concurrently transmitting either the zeroth and the first transmission signals or two component signals of zeroth and first multiplexed electric signals, respectively, with the second receiving node R2 selected as their common destination, between the second exchanged signal. Consequently, the memory units 69 are indispensable in order to settle the arbitration.

Figure 4:
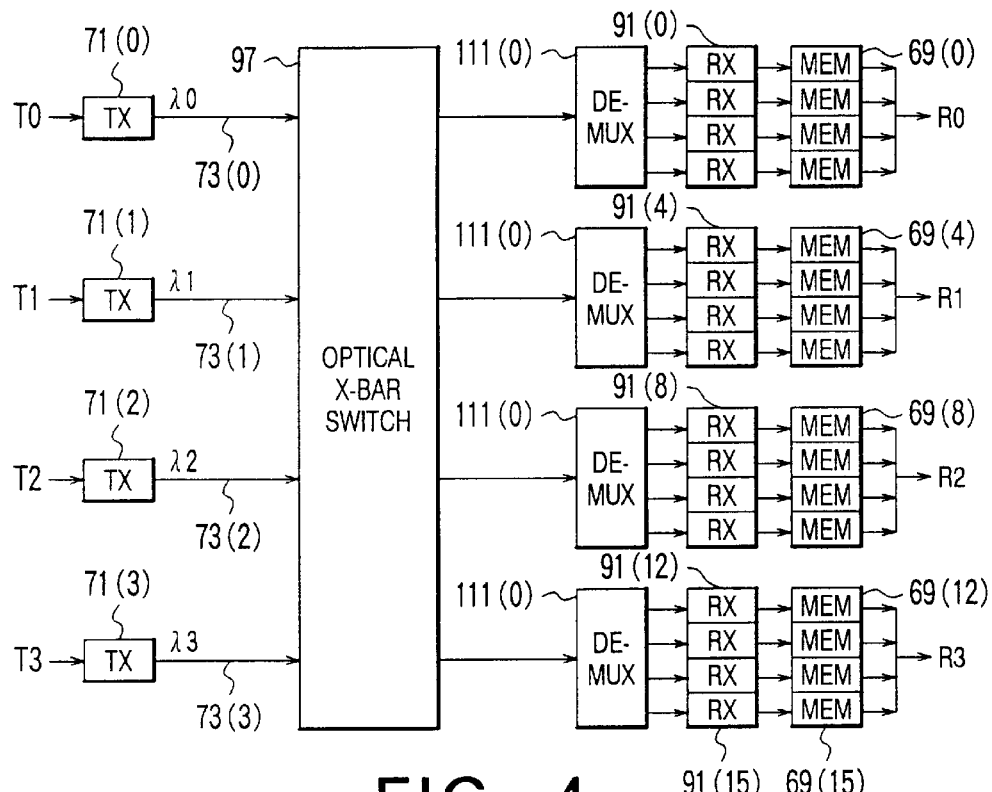
FIG. 4 is a block diagram of an optical network according to a first embodiment of this invention.

Referring now to FIG. 4, the description will proceed to an optical switch or optical network according to a first preferred embodiment of this invention. Throughout the description which follows, similar parts are designated by like reference numerals as in FIGS. 1 to 3 and are similarly operable with likewise named signals.

In FIG. 4, the zeroth to the third or N optical transmitters 71 are not preceded by the memory units 69 described in conjunction with FIGS. 1 and 2. These N optical transmitters 71 produce N optical signals with N different wavelengths. The secondary predetermined integer M is equal in this example to the primary predetermined integer N. The zeroth to the third wavelengths $\lambda 0$ to $\lambda 3$ are therefore used as legends on the zeroth to the third input connections 73 which are connected to a primary optical crossbar exchange or switch 97 with the optical crossbar exchange 75 hereafter called a secondary optical crossbar exchange.

Figure 5:
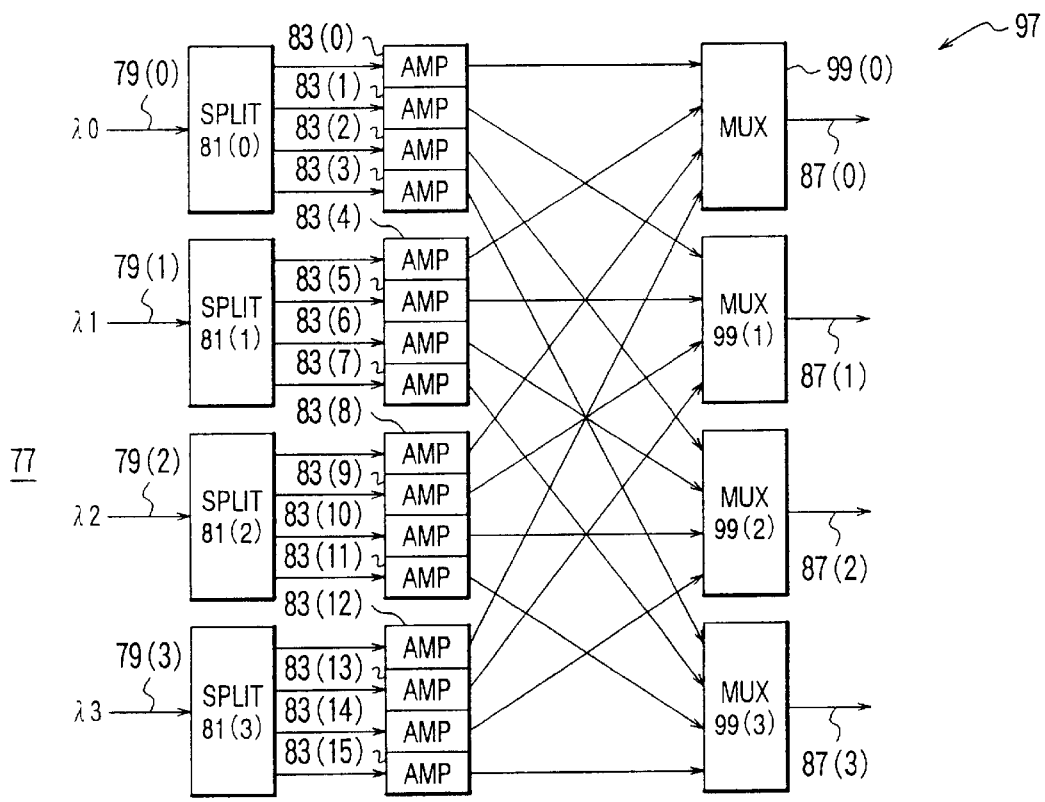
FIG. 5 is a block diagram of another optical crossbar exchange for use in the optical network illustrated in FIG. 4.

Turning to FIG. 5 for a short while, the primary optical crossbar exchange 97 comprises, like the secondary optical crossbar exchange 75, the semiconductor substrate 77 on which formed are N or zeroth to the third input waveguides or ports 79, N or the zeroth to the third output waveguides or ports 87, N or the zeroth to the third optical splitters 81 for splitting the M or N or the zeroth to the third optical signals into N or primary to quaternary optical signal groups of $N^2$ or zeroth to fifteenth split signals, and N or primary to quaternary amplifier groups supplied with the primary to the quaternary optical signal groups, respectively, and consisting of $N^2$ or the zeroth to the fifteenth semiconductor optical amplifiers 83 operable as $N^2$ crossbar switch crosspoints, respectively. Instead of the optical combiners 85 of the secondary optical crossbar exchange 75, used are N or zeroth to third wavelength multiplexers (MUX) 99(0), 99(1), 99(2), and 99(3) or 99 connected to the N output ports 87, respectively, and to the zeroth to the fifteenth optical amplifiers 83 by the intermediate waveguides in a cross-connection or crossbar fashion.

Figure 6:
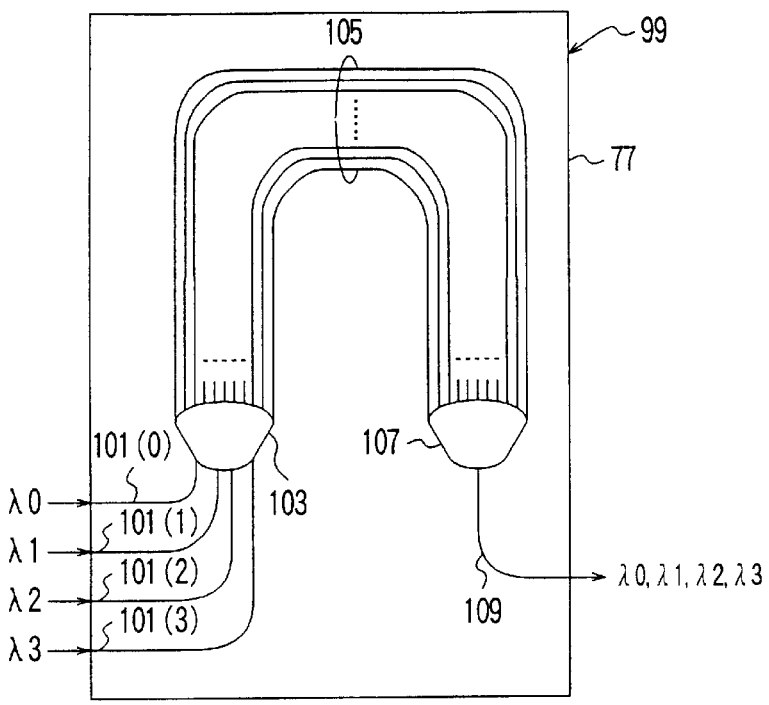
FIG. 6 is a schematic diagram of a wavelength multiplexer for use in the optical crossbar exchange depicted in FIG. 5.

Further turning to FIG. 6, each wavelength multiplexer 99 is of an arrayed waveguide grating type and comprises on the semiconductor substrate 77, M or zeroth to third input routes or waveguides 101(0), 101(0), 101(2), and 101(3) or 101 for the optical signals of the zeroth to the third wavelengths $\lambda 0$ to $\lambda 3$, respectively, an input slab waveguide 103 for the split signals, an arrayed waveguide grating 105 connected to the input slab waveguide 103, an output slab waveguide 107 connected to the diffraction grating 105, an output route or waveguide 109 connected to the output slab waveguide 107 and to one of the output ports 87. Supplied to an m-th input route 101(m) of the M input routes 101, where m represents an arbitrary one of zero to (M−1), the optical signal of an m-th wavelength $\lambda(m)$ is concentrated by the output slab waveguide 107 at an m-th point, namely, dependent on the wavelength $\lambda(m)$ and which of the M input routes 101 the m-th input route 101(m) is. Herein, the M optical signals are all focussed at the output route 109.

Turning back to FIG. 4 with FIG. 5 again referred to, the zeroth to the third output waveguides 87 of the primary optical crossbar exchange 97 are connected to the zeroth to the third output connections 89 which are described in connection with FIG. 1 and which now consist of N or zeroth to third wavelength demultiplexers (DEMUX) 111(0), 111(0), 111(2), and 111(3) or 111 for demultiplexing the zeroth to the third exchanged signals into N or primary to quaternary received signal groups. It should be noted that these signal groups are called the received signal groups rather than receiver input signal groups in contrast to the receiver input signals described in conjunction with FIG. 3 and consist of NM or zeroth to third, fourth to seventh, eighth to eleventh, and twelfth to fifteenth received signals.

Figure 7:
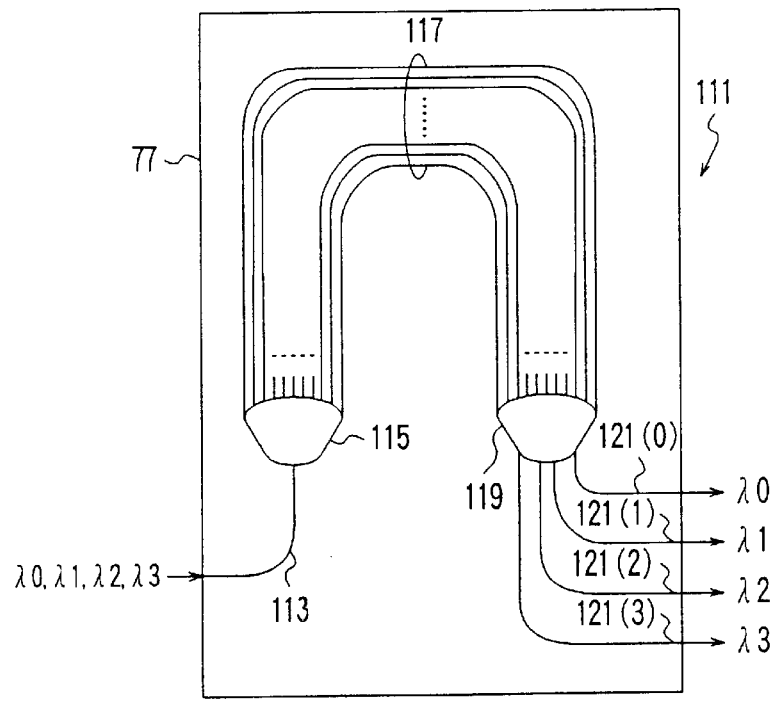
FIG. 7 is a schematic diagram of a wavelength demultiplexer for use in the optical network illustrated in FIG. 4.

Temporarily turning to FIG. 7, each wavelength demultiplexer 111 is of the arrayed waveguide grating type and comprises a semiconductor substrate which may be an extension of the semiconductor substrate 77 of the primary (97) or the secondary (75) optical crossbar exchange and on which formed are single input route 113 for optical signals of one or more of the M wavelengths, such as $\lambda 0$ to $\lambda 3$, an input slab waveguide 115 connected to the input route 113, an arrayed waveguide grating 117 connected to the input slab waveguide 115, an output slab waveguide 119 connected to the diffraction grating 117, and M or zeroth to third output routes 121(0), 121(0), 121(2), and 121(3) or 121 for the M wavelengths $\lambda(0)$ to $\lambda(3)$, respectively. Like in FIG. 6, the output slab waveguide 119 focuses the optical signals of different wavelengths at different points depending on the different wavelengths. In the example being illustrated, the optical signals of M wavelengths are concentrated at the zeroth to the third output routes 121, respectively, as M received signals of one of N received signal groups.

Again turning back to FIG. 4 with FIG. 7 continuously referred to, NM optical receivers 91 are grouped, like in FIG. 2, into N or primary to quaternary receiver groups and consist of the zeroth to the fifteenth receivers 91(0) to 91(15). Responsive to the NM received signals, the NM optical receivers 91 produce NM reception signals which are reproductions of NM component signals of the N reception signal groups. These N reception signal groups are supplied to the zeroth to the third receiving nodes R preferably through output memory units which are similar to those used in FIGS. 1 and 2 and are designated at 69(0) to 69(3), 69(4) to 69(7), 69(8) to 69(11), and 69(12) to 69(15) according to N or primary to quaternary memory group respectively connected to the primary to the quaternary receiver groups and to the zeroth to the third receiving nodes R.

Reviewing FIGS. 4 to 7, it will be presumed in accordance with a request of delivering the zeroth and the first transmission signals both as the second reception signal to the second receiving node R 2 that only the second and the sixth semiconductor optical amplifiers 83(2) and 83(6) are on and that all other optical amplifiers are off. Originating at the zeroth transmitting node T0, the zeroth transmission signal is supplied to the zeroth input route 79(0) as the optical signal of the zeroth wavelength $\lambda 0$, split and thereafter delivered to the optical amplifiers 83(0) to 83(2) of the primary amplifier group. The second split signal of the primary split signal group alone is delivered to the second wavelength multiplexer 99(2) and thence to the second output port 87(2). Produced by the first transmitting node T1, the first transmission signal is supplied to the first input route 79(1) as the optical signal of the first wavelength $\lambda 1$, split and then delivered to the optical amplifiers 83(4) to 83(7) of the secondary amplifier group, which delivers the second split signal of the secondary split signal group alone to the second wavelength multiplexer 99(2). Wavelength multiplexing such amplifier output signals of primary and secondary amplifier output signal groups, the second wavelength multiplexer 99(2) supplies the second output port 87(2) with the second exchanged signal in which the zeroth and the first wavelengths are wavelength multiplexed.

It will now be presumed in FIGS. 4 to 7 in accordance with a request that the zeroth and the first optical amplifiers 83(0) and 83(0) are on, that all other amplifiers 83(2) to 83(15) are off, and that the zeroth transmission signal is directed at the zeroth transmitting node T0 to the zeroth and the first receiving nodes R0 and R1 although the zeroth receiving node R0 may be used in an information network at a location of the zeroth transmitting node T0 collectively as an information transmitting and receiving node. Having different destinations, the zeroth optical signal of the zeroth wavelength is split by the zeroth optical splitter 81(9) into the zeroth to the third split signals of the primary split signal group. Only the zeroth and the first split signals are allowed to pass through the zeroth to the fifteenth optical amplifiers 83 to arrive at the zeroth and the first wavelength multiplexers 99(0) and 99(1) and thence to be delivered to the zeroth and the first output ports 87(0) and 87(1).

It is now understood in connection with FIGS. 4 to 7 that the primary optical crossbar exchange 97 is supplied with optical signals of M different wavelengths at its N input ports 79 and is capable of exchanging up to N exchange input signals of different ones of M wavelengths, when their destinations are a single common destination, into a single exchanged signal in which the different ones of the M wavelengths are wavelength multiplexed. When a single exchange input signal of one of the M wavelengths has up to N different destinations, the primary optical crossbar exchange 97 is capable of exchanging this exchange input signal into up to N exchanged signals all at once according to the up to N different destinations, respectively.

Again in FIG. 4, the N optical transmitters 71 are assigned with M different wavelengths, herein N different wavelengths, respectively. It will be presumed in FIGS. 4 to 7 that the zeroth and the first transmission signals are concurrently directed from the zeroth transmitting node T0 according to a request towards the second receiving node R2 and from the first transmission node T1 towards also the second receiving node R2, respectively. Converted by the zeroth optical transmitter 83(0) to the optical signal of the wavelength $\lambda 0$, the zeroth transmission signal is supplied through the zeroth input connection 73(0) to the primary optical crossbar exchange 97 as the zeroth exchange input signal. Connected by the first optical transmitter 71(0) to the optical signal of the wavelength $\lambda 1$, the first transmission signal is delivered through the first input connection 73(0) to the primary optical crossbar exchange 97 as the first exchange input signal. Directed towards in common to the second receiving node R2, the zeroth and the first exchange input signals are simultaneously produced at the second output port 87(2) of FIG. 5 with the zeroth and the first wavelengths multiplexed as the second exchanged signal. No conflict arises on the second output waveguide 87(2) because such transmission signals are converted to an at most quadruple wavelength multiplexed signal.

This exchanged signal of multiplexed wavelengths $\lambda 0$ and $\lambda 1$ is demultiplexed by the second wavelength demultiplexer 111(2) into the eighth and the ninth receiver input signals in the tertiary received signal group, which are converted by the eighth and the ninth optical receivers 91(8) and 91(9) respectively into the eighth and the ninth reproductions of the zeroth and the first transmission signals for the second nodes R2. When the eighth and the ninth reproductions are concurrently produced with their packet durations commonly timed, an arbitration is settled therebetween by the eighth and the ninth memory units 69(8) and 69(9). The privileged one of the eighth and the ninth reproductions is first delivered as the second reception signal to the second node R2 with the other immediately following this privileged reproduction.

Moreover in FIG. 4, the optical network is completely a nonblocking crossbar network. For each combination among various combinations of the transmission signals and the reception signals, its transmission path from an arbitrary one of the at most N transmitting nodes T towards any one of the receiving nodes R is uniquely determined. Even without being buffered by the memory units 69(0) to 69(3) of FIG. 1 or 2, two or more transmission signals are never subjected to the collision on one of the output waveguides 87 of FIG. 5 even if directed to a common one of the receiving nodes R. In other words, it is entirely unnecessary to preliminarily settle the arbitration and it is possible thereby to raise the throughput beyond the theoretical restriction.

Figure 8:
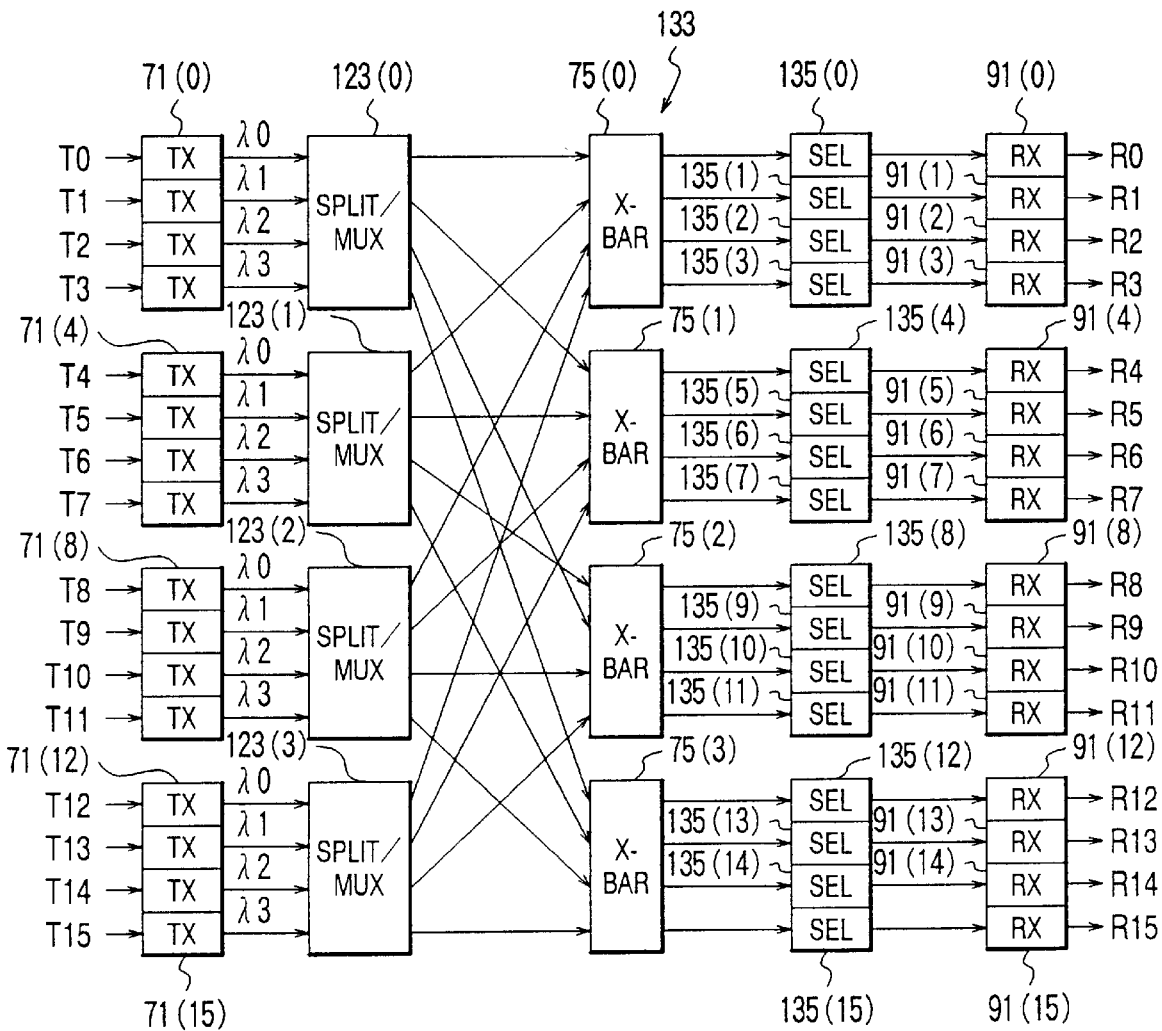
FIG. 8 is a block diagram of an optical network according to a second embodiment of this invention.

Referring afresh to FIG. 8 and once more to FIG. 3, the description will proceed to an optical network according to a second preferred embodiment of this invention. In this example, the transmitting nodes T are zeroth to fifteenth transmitting nodes T0 to T15 and are grouped into P node groups, each consisting of at most Q transmitting nodes, where P and Q represent primary first and second predetermined integers, each of which is not less than two. The primary predetermined integer N is equal to PQ and is herein not less than four. The receiving nodes R are zeroth to fifteenth receiving nodes R0 to R15 and are grouped into Q node groups, each consisting of at most P receiving nodes.

In the example depicted in FIG. 8, the secondary predetermined integer Q is equal to the first predetermined integer P. P or primary to quaternary node groups consist of the zeroth to the third transmitting or receiving nodes T0 to T3 or R0 to R3, the fourth to the seventh transmitting or receiving nodes T4 to T7 or R4 to R7, the eighth to the eleventh transmitting or receiving nodes T8 to T11 or R8 to R11, and the twelfth to the fifteenth transmitting or receiving nodes T12 to T15 or R12 to R15. This concept of groups applies to various network parts except for the fact that each group consists of Q network parts rather than the "at most" Q network parts.

In FIG. 8, the primary to the quaternary node groups of the transmitting nodes T are connected respectively to P or primary to quaternary optical transmitter groups, each of which consists of Q optical transmitters assigned with M or Q wavelengths $\lambda 0$ to $\lambda 3$, respectively. The optical transmitters are called zeroth to fifteenth optical transmitters 71(0) to 71(15) or 71. The input connections 73 of FIG. 1 or 4 now consist of zeroth to third combinations of optical splitters and wavelength multiplexers, which combinations are referred to as splitter/multiplexers (SPLIT/MUX) 123(0), 123(0), 123(2), 123(2) or 123. In each transmitter group, the Q optical transmitters 71 transmit Q optical signals of the M or Q wavelengths in response at most Q transmission signals supplied thereto.

Figure 9:
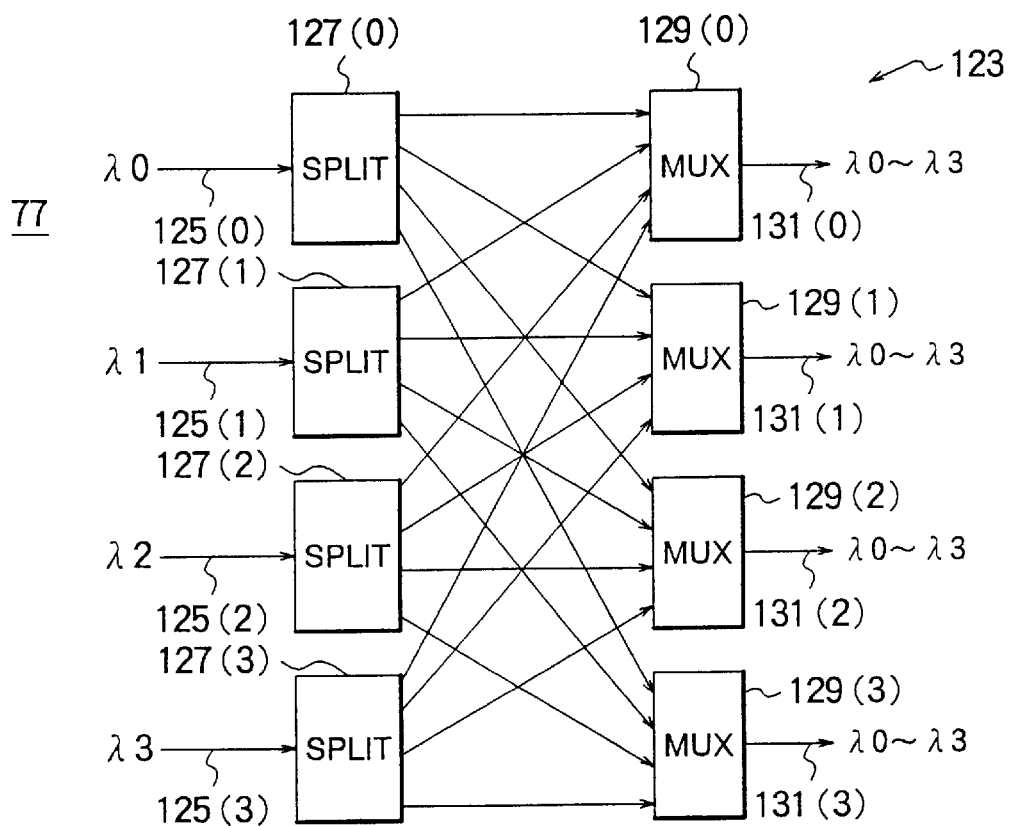
FIG. 9 is a block diagram of a splitter/multiplexer for use in the optical network illustrated in FIG. 8.

Turning to FIG. 9 during a short while, each splitter/ multiplexer 123 comprises a semiconductor substrate which may be the above-mentioned substrate 77 and on which formed are Q or zeroth to third input waveguides 125(0), 125(1), 125(2), and 125(3) or 125 supplied with one of P or primary to quaternary optical signal groups that consists of Q optical signals of the wavelengths λ0 to λ3 as indicated. On the substrate 77, Q or zeroth to third optical splitters (SPLIT) 127(0), 127(1), 127(2), and 127(3) or 127 are connected respectively to the Q input waveguides 125 to split each optical signal into Q split signals with no regard to destinations of the split signals. Cross-connected to the Q optical splitters 127 by intermediate waveguides are Q or zeroth to third wavelength multiplexers (MUX) 129(0), 129(1), 129(2), and 129(3) or 129 to produce Q wavelength multiplexed signals, in each of which wavelength multiplexed are the zeroth to the third split signals supplied from the Q optical splitters 127, respectively. These Q wavelength multiplexed signals are delivered to Q or zeroth to third output waveguides 131(0), 131(0), 131(2), and 131(3) or 131, respectively. Each wavelength multiplexer 129 is not different from the wavelength multiplexer 99 illustrated with reference to FIG. 6. It is now understood that the zeroth to the third splitter/multiplexers 123 are responsive to P or primary to quaternary optical signal groups of PQ optical signals of M or Q different wavelengths for producing PQ or zeroth to fifteenth wavelength multiplexed signals in P or primary to quaternary multiplexed signal groups, respectively.

Turning back to FIG. 8, the PQ wavelength multiplexed signals are supplied to an optical crossbar exchange 133 which is in practice the secondary optical crossbar exchange 75 or the primary crossbar exchange 97. In the example of FIG. 8, this optical crossbar exchange 133 consists of zeroth to third secondary exchange parts 75(0) to 75(2) which are crosswire connected to the zeroth to the third splitter/ multiplexers 123. Each of these zeroth to third optical crossbar exchange parts 75(0) to 75(3) is not different from that illustrated with reference to FIG. 3.

Reviewing FIG. 3, the secondary optical crossbar exchange part 75 comprises the optical combiners 85 in place of the wavelength multiplexers 99 described in conjunction with FIG. 5 or 6. Each optical combiner 85 is supplied with the amplifier output signals of a common destination to produce an optical combined signal of the common destination. It should be noted that each optical combiner 85 gives the optical combined signal a greater loss than a loss which each wavelength multiplexer 99 gives to the wavelength multiplexed signal.

In FIG. 8, the secondary zeroth optical crossbar exchange part 75(0) is supplied from the zeroth to the third splitter/ multiplexers 123 with the zeroth wavelength multiplexed signals as zeroth exchanged input signals of a common destination in a primary exchange input signal group and produces, as a primary exchanged signal group, P exchanged signals. In this manner, the ternary optical crossbar exchange 133 has PQ exchange input ports and PQ exchange output ports and exchanges exchange input signals supplied to arbitrary ones of the PQ exchange input ports with various destinations according to the destinations to simultaneously produce exchanged signals of a common destination at one of the PQ exchange output ports. Moreover, the ternary optical crossbar exchange 133 is capable of exchanging the exchange input signals of one of the PQ exchange input ports with various destinations to produce exchanged signals at some of the PQ exchange output ports according to the destinations, respectively. Such exchanged signals of Q or primary to quaternary exchanged signal groups are delivered to the zeroth to the third output connections which are depicted in FIG. 1 at 89 and which now consist of Q or primary to quaternary selector groups of PQ or zeroth to fifteenth optical selectors (SEL) 135(0) to 135(15) or 135, with each exchanged signal group of a common destination supplied to one of the selector groups.

Figure 10:
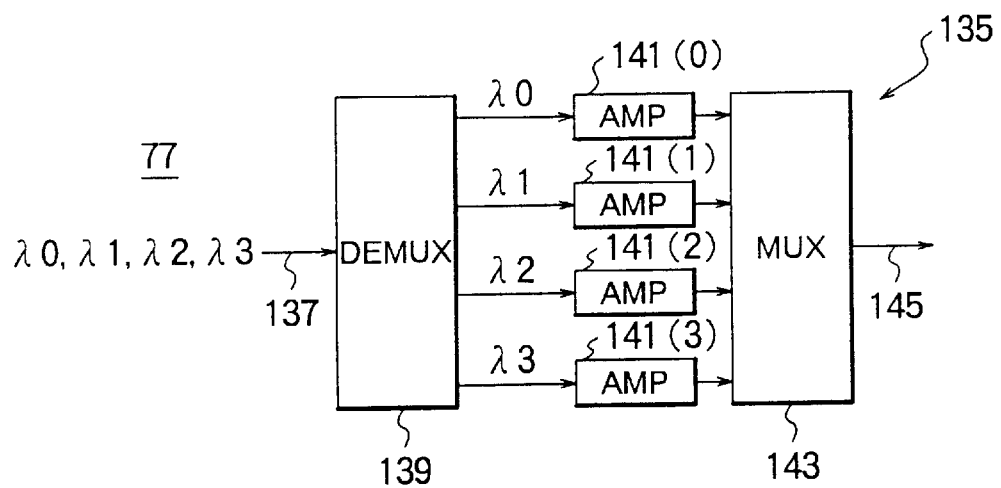
FIG. 10 is a block diagram of an optical selector for use in the optical network illustrated in FIG. 8.

Turning to FIG. 10 for a short while, each optical selector 135 is formed on a semiconductor substrate which may again be the semiconductor substrate 77 and on which formed is a single input waveguide 137 for one of the exchanged signals that is the wavelength multiplexed signal of the M wavelengths λ0 to λ3 and is of a common destination. Connected to the single input waveguide 137, a wavelength demultiplexer (DEMUX) 139 is for demultiplexing the wavelength multiplexed signal into M or Q individual-wavelength signals of the wavelengths λ0 to λ3. Connected to the wavelength demultiplexer 139 are M or Q or zeroth to third semiconductor optical amplifiers (AMP) 141(0) to 141(3) or 141 which are rendered on and off in compliance with the wavelengths, namely, in accordance here with sources of the optical signals of respective wavelengths, to produce zeroth to third optical switched signals. Connected to the Q semiconductor optical amplifiers 141, a wavelength multiplexer (MUX) 143 multiplexes the optical switched signals into a switched and multiplexed signal for delivery to a single output waveguide 145. The wavelength demultiplexer 139, each optical amplifier 141, and the wavelength multiplexer 143 are identical with each wavelength demultiplexer 111, each optical amplifier 83, and each wavelength multiplexer 99 described in conjunction with FIG. 4 or 7, FIG. 5, and FIG. 5 or 6, respectively.

Turning back again to FIG. 8, the optical selectors 135 of the primary to the quaternary selector groups produce PQ switched and multiplexed signals now as PQ receiver input signals of Q or primary to quaternary groups dependent on the destinations, respectively. Those receiver input signals are supplied to PQ or zeroth to fifteenth optical receivers 91(0) to 91(15) or 91 of Q or primary to quaternary receiver groups. The PQ optical receivers 91 are for the receiving nodes R, namely, connected, in this example, directly to the zeroth to the fifteenth receiving nodes R, respectively.

In FIG. 8, it will be presumed that the zeroth and the first transmitting nodes T0 and T1 simultaneously send their transmission signals to the first and the zeroth receiving nodes R1 and R0, respectively. Delivered from the zeroth tranesmitting node T0, a zeroth electric signal is converted by the zeroth optical transmitter 71(0) into a zeroth optical signal of the zeroth wavelength λ0 and sent to the zeroth splitter/multiplexer 123(0). Produced by the first transmitting node T1, a first electric signal is converted by the first optical transmitter 71(0) into a first optical signal of the first wavelength λ1 and delivered also to the zeroth splitter/ multiplexer 123(0). Multiplexed by the zeroth splitter/ multiplexer 123(0), the zeroth and the first optical signals are sent as a zeroth wavelength multiplexed signal to the secondary optical crossbar exchange parts 75(0) to 75(3). In these crossbar exchange parts, the semiconductor optical amplifiers 83 are all off except for those in the zeroth crossbar exchange part 75(0).

In the zeroth crossbar exchange part 75(0), the zeroth and the first optical amplifiers 83(0) and 83(0) of a zeroth amplifier group are selectively switched on. As a consequence, only the zeroth and the first optical combiner 85(0) and 85(1) of a zeroth combiner group deliver two wavelength combined signals of the zeroth and the first wavelengths $\lambda 0$ and $\lambda 1$ to the zeroth and the first optical selectors 135(0) and 135(1), respectively. In the zeroth optical selector 135(0), the first semiconductor optical amplifier 141(0) is selectively switched on to deliver the signal of the first wavelength $\lambda 1$ through the multiplexer 143 to the zeroth optical receiver 91(0), where the signal is received as a zeroth reproduced electric signal which is delivered to the zeroth receiving node R0. In the first optical selector 135(1), the zeroth optical amplifier 141(0) alone is rendered on to send the signal of the zeroth wavelength $\lambda 0$ through the multiplexer 143 to the first optical receiver 91, where the signal is converted back into a first reproduced electric signal which is sent to the first receiving node R1.

Figure 11:
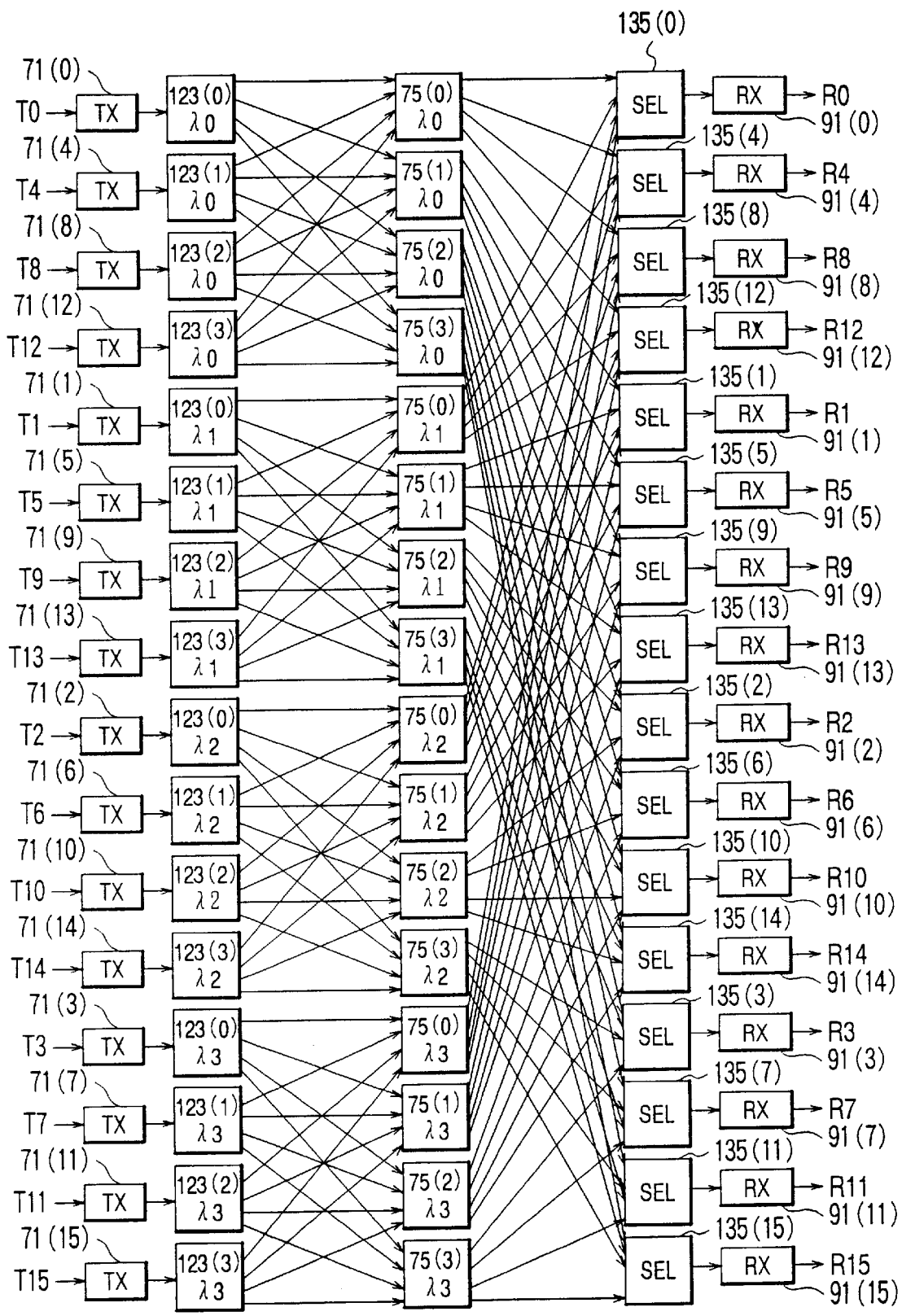
FIG. 11 is another block diagram illustrative of the optical network depicted in FIG. 8.

Turning to FIG. 11 with FIG. 8 continuously referred to, another optical network is equivalent to that illustrated with reference to FIGS. 3 and 8 to 10. In FIG. 11, each of the zeroth to the third splitter/multiplexers 123 is divided into M or four splitter/multiplexer parts according to the M wavelengths $\lambda 0$ to $\lambda 3$, which are used as labels. Similarly, each of the secondary zeroth to third optical crossbar exchange parts 75(0) to 75(3) is divided into M exchange parts according to their exchanged signals of the M wavelengths $\lambda 0$ to $\lambda 3$, which are used as labels. The optical selectors 135 are depicted as PQ four-input and one-output space division optical switches, which are designated by the reference numerals 135(0), 135(4), 135(8), 135(12) and so forth. The optical network therefore comprises PQ optical transmitters 91 as in FIG. 8, PQ splitter/multiplexer parts 123, PQ exchange parts 75(0) and others, PQ optical switches or selectors 135, and the PQ optical receivers 91.

Figure 12:
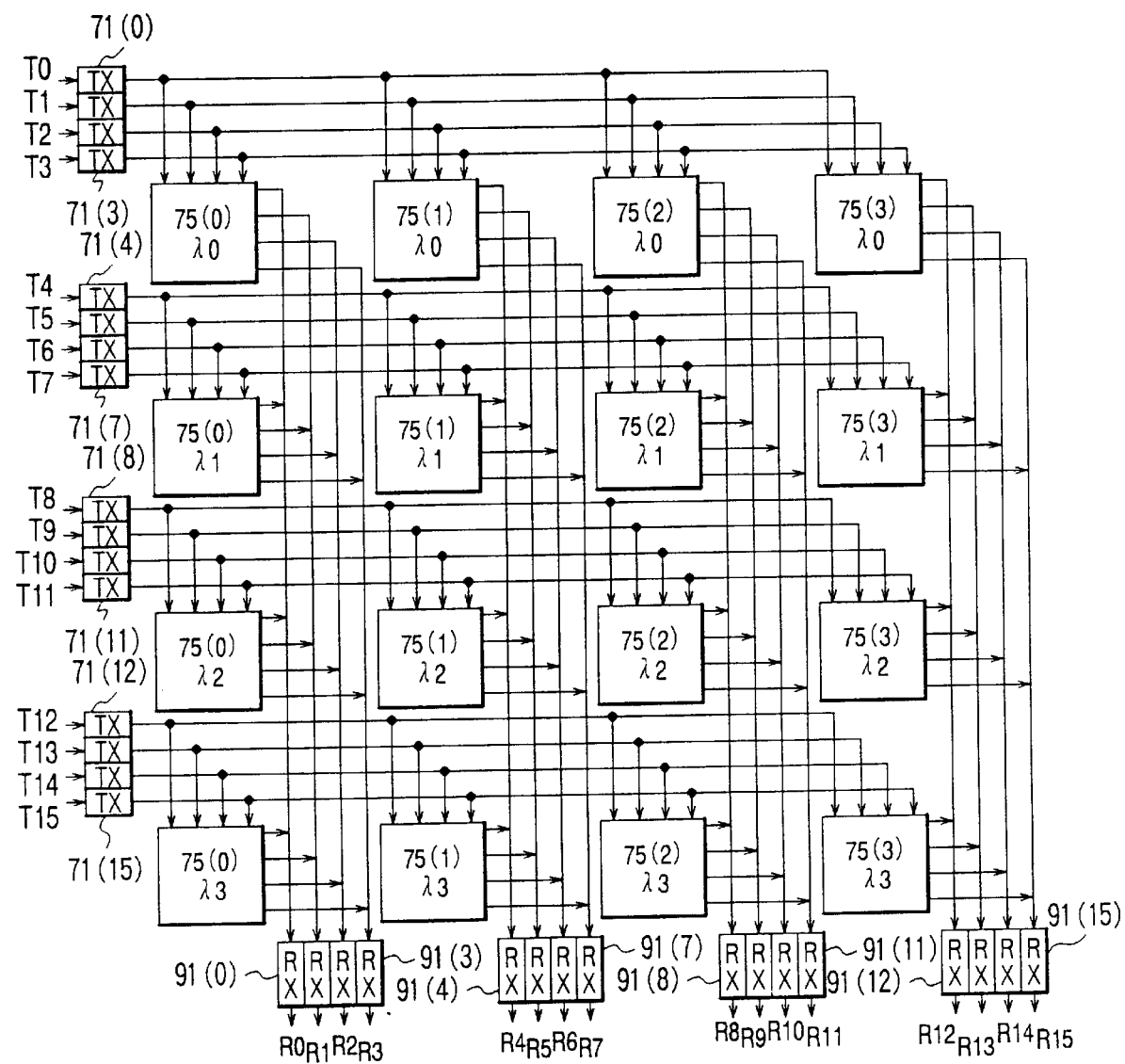
FIG. 12 is still another block diagram illustrative of the optical network depicted in FIG. 8.

Further turning to FIG. 12 with FIGS. 8 and 11 continuously referred to, still another optical network is equivalent to each of those illustrated with reference to FIGS. 8 and 11. It should be noted in this connection that each of the four-input and one-output space division optical switches 135 of FIG. 11 is not concurrently supplied with two or more input signals. As a consequence, it is possible to use a four-input and one-output optical combiner, such as each optical combiner 85 used in FIG. 3, instead of the four-input and one-output space division optical switch. The optical network is not different from an optical network comprising an optical crossbar exchange having sixteen by sixteen cross points. Consequently, the optical network of FIG. 8 is theoretically an optical crossbar network. In other words, this optical network is completely nonblocking and is readily controlled because an optical path is decided in connection with each optical signal uniquely by its source and destination.

A necessary number of the semiconductor optical amplifiers is equal, in the optical network being illustrated, to sixty-four in the secondary optical crossbar exchange part 75 and also sixty-four in the wavelength selectors 135 and is equal in total to one hundred and twenty-eight. This total is only a half in number of the optical amplifiers which are indispensable in implementing the sixteen by sixteen cross points by using the structure of the conventional optical network described in connection with FIG. 1, namely, a half of two hundred and fifty-six.

Figure 13:
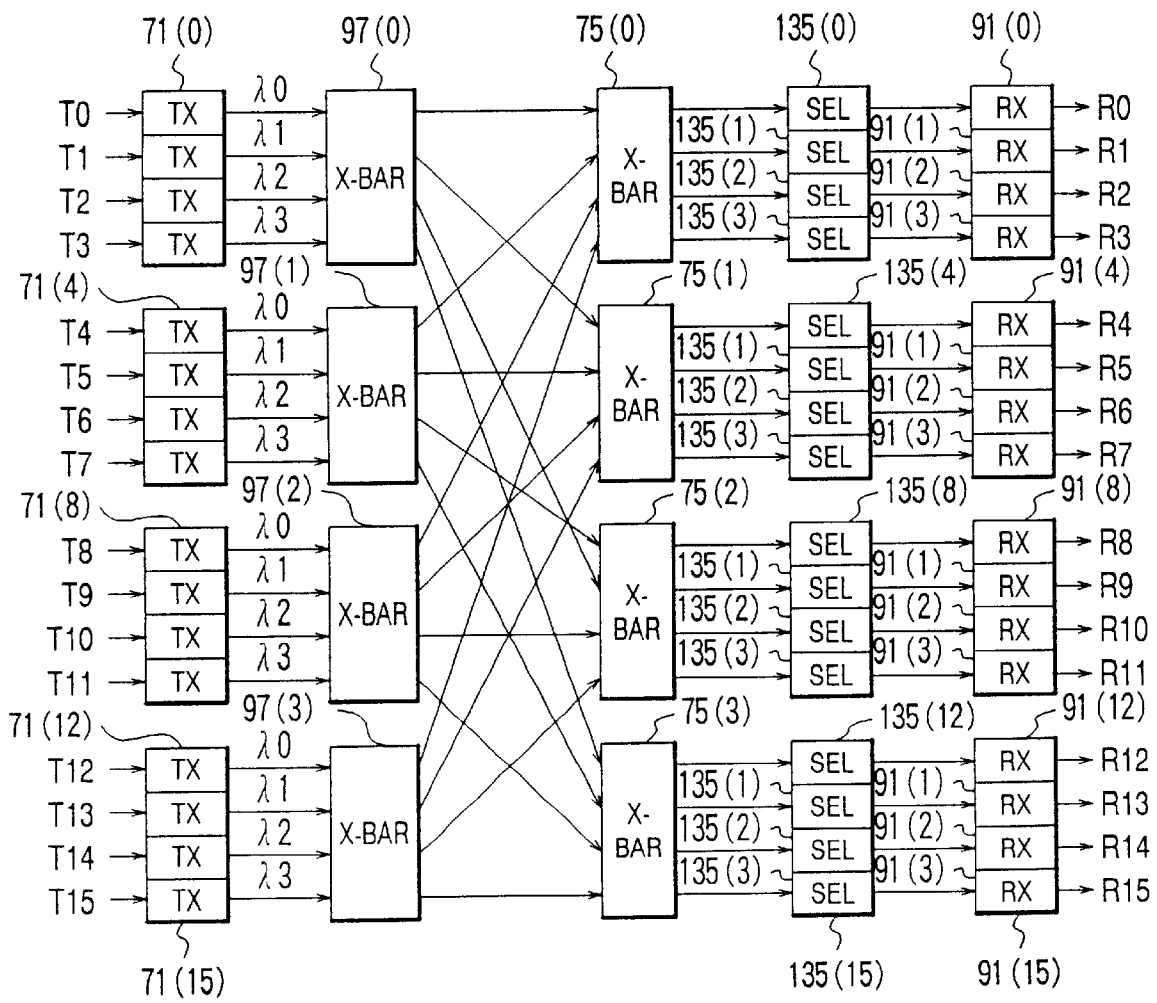
FIGS. 13 and 14 are block diagrams of optical networks according to third and fourth embodiments of this invention, respectively.

Referring now to FIG. 13, attention will be directed to an optical network according to a third preferred embodiment of this invention. For the optical network being illustrated, each of the primary first and second integers P and Q is equal to four. The optical network is consequently between at most N or sixteen transmitting nodes T0 to T15 grouped into P or primary to quaternary transmitting node groups, each consisting of Q or four transmitting nodes T, and at most PQ or N receiving nodes T0 to T15 which are similarly grouped into Q receiving node group like in FIG. 8. Instead of the P splitter/multiplexers 123 of FIG. 8, primary P or zeroth to third optical crossbar exchange parts 97(0) to 97(3) are used with the secondary P optical crossbar exchange parts (X-BAR) 75(0) to 75(3) cross-connected to the primary P optical crossbar exchange parts 97(0) to 97(3). In other respects, the optical network is identical with that illustrated with reference to FIG. 8, including allocation of the M or zeroth to third wavelengths $\lambda 0$ to $\lambda 3$ to the optical transmitters 71 of each transmitter group.

In FIG. 13, it will again be presumed that the zeroth and the first electrical signals are concurrently sent respectively from the zeroth and the first transmitting nodes T0 and T1 with their final destinations selected at the first and the zeroth receiving nodes R1 and R0, respectively. Converted like in FIG. 8 to the zeroth and the first optical signals of their respective wavelengths $\lambda 0$ and $\lambda 1$, the zeroth and the first electric signals are delivered to the primary zeroth optical crossbar exchange part 97(0) of FIG. 5 at the zeroth and the first input ports 79(0) and 79(1), respectively. In the primary zeroth optical crossbar exchange part 97(0), switched on are the zeroth and the fourth semiconductor optical amplifiers 83(0) and 83(4) which are connected to the zeroth and the first input ports 79(0) and 79(1), respectively, and are selected in accordance with intermediate destinations, respectively. For this example, the intermediate destinations are a common one of the secondary zeroth optical crossbar exchange part 75(0) which is connected through the optical selectors 135 and the optical receivers 91 to the final destinations, namely in this example, the first and the zeroth receiving nodes R1 and R0.

Responsive to switched or amplifier output signals of the zeroth and the fourth optical amplifiers 83(0) and 83(4) of FIG. 5, the zeroth wavelength multiplexer 99(0) supplies the zeroth output port 87(0) with a wavelength multiplexed signal as a primary zeroth exchanged signal in which the zeroth and the first wavelengths $\lambda 0$ and $\lambda 1$ are multiplexed. In the secondary zeroth optical crossbar exchange part 75(0) depicted in FIG. 3 and supplied with this primary exchanged signal as a secondary zeroth exchange input signal, the zeroth and the first semiconductor optical amplifiers 83(0) and 83(0) are switched on according respectively to the final destinations. Through the zeroth and the first optical combiners 85(0) and 85(1), zeroth and first combined signals are delivered respectively to the zeroth and the first output ports 87(0) and 87(1) as secondary zeroth and first exchanged signals, each of which is now a wavelength combined signal of only two wavelengths $\lambda 0$ and $\lambda 1$ in a primary exchanged signal group. In the primary selector-group zeroth and first wavelength selectors 135(0) and 135(1) depicted in FIG. 10 and supplied with the secondary zeroth and first secondary exchanged signals, respectively, only the first and the zeroth semiconductor optical amplifiers 141(0) and 141(0) are rendered on, respectively, according to the sources from which the component signals are derived in the secondary exchanged signals. As a result, the receiver input signals of the wavelengths $\lambda 1$ and $\lambda 0$ are delivered from the first and the zeroth optical amplifiers 141, respectively, to the zeroth and the first optical receivers 91(0) and 91(0). This complete simultaneous transmission of the zeroth and the first electric signals to the first and the zeroth receiving nodes R1 and R0, respectively.

It should be noted in FIG. 13 that the primary zeroth to third optical crossbar exchange parts 97(0) to 97(3) are used in place of the zeroth to the third splitter/multiplexers 123 described in connection with FIG. 8. By each splitter/multiplexer 123 illustrated with reference to FIG. 9, the optical signal of each wavelength is produced as the component signals in the zeroth to the third wavelength multiplexed signals with an inevitable power reduction or loss of at least 6 dB in each optical splitter 127. In contrast, it is possible to give a gain to each optical amplifier 83 in FIG. 5. It is thereby possible in FIG. 13 to make each optical receiver 71 have a large power margin to the receiver input signal thereof. Moreover, it should be noted in connection with FIGS. 9 and 7 that the wavelength multiplexed signal is produced by each splitter/multiplexer 123 with at most M wavelengths multiplexed. In contrast, each of the exchanged signals of each of the primary optical exchange parts 97(0) to 97(3) is a wavelength "multiplexed" signal of either only one of the M wavelengths or at most M wavelengths that are selected by the optical amplifier or amplifiers 83 of FIG. 5. As a consequence, another technical merit is achieved by the optical network of FIG. 13 such that each optical amplifier 83 of FIG. 3 is less liable to saturation. Like in FIG. 8, this optical network. is completely nonblocking and is readily controlled because an optical route of every optical signal is decided with no ambiguity by its source and final destination.

In this optical network, the number of indispensable semiconductor optical amplifiers 83 and 141 is equal to sixty-four in the primary optical crossbar exchange parts 79(0) to 79(3) of FIG. 5, again sixty-four in the secondary optical crossbar exchange parts 75(0) to 75(3) of FIG. 3, and also sixty-four in the zeroth to the fifteenth optical selectors 135 of FIG. 10, namely, to one hundred and ninety-two in total. Although greater than the necessary number for the optical amplifiers 83 and 141 in the optical network of FIG. 8, the total of one hundred and ninety-two is appreciably less than two hundred and fifty-six required in the conventional optical network of FIG. 1.

Figure 14:
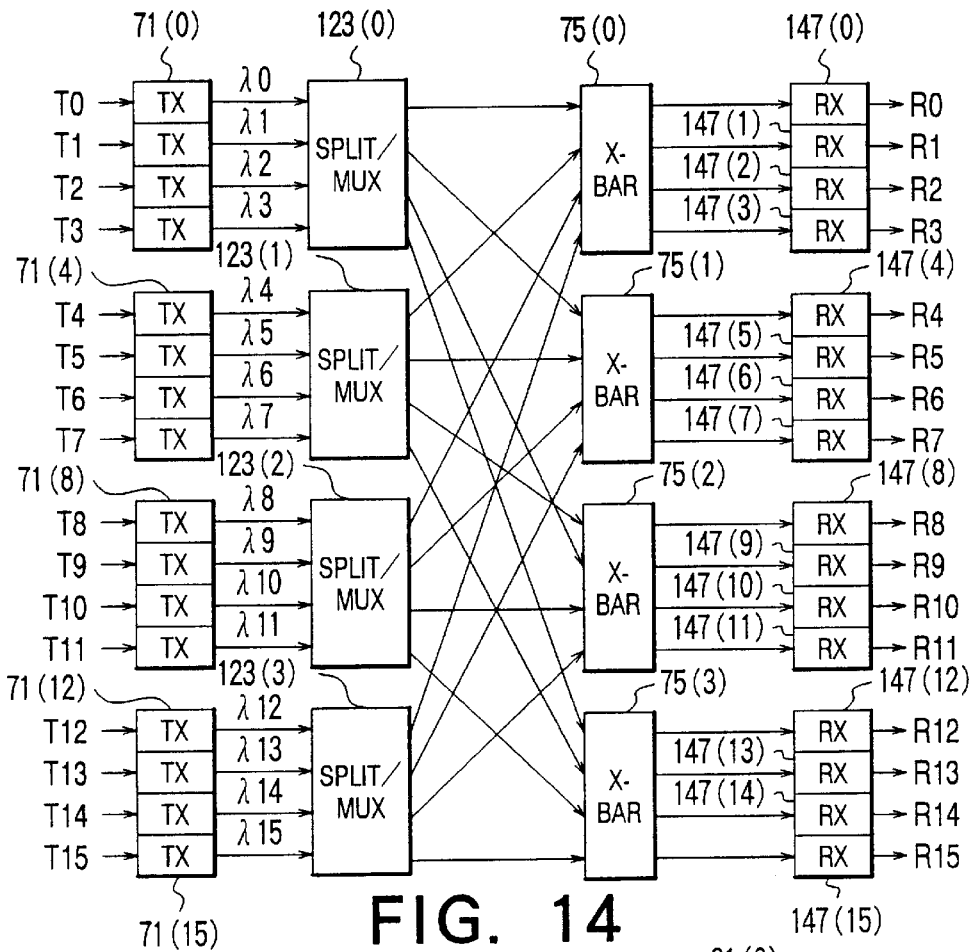

Referring to FIG. 14, the description will further proceed to an optical network according to a fourth preferred embodiment of this invention. In this optical network, the zeroth to the fifteenth optical transmitters 71(0) to 71(15) are for producing the zeroth to the fifteenth optical signals with M or zeroth to fifteenth wavelength $\lambda 0$ to $\lambda 15$. The secondary predetermined integer M is now equal to N, namely, to PQ or sixteen.

The optical network comprises the secondary zeroth to third optical crossbar exchange parts 75(0) to 75(3) having their input ports 79 crosswise connected to the output waveguides 131 on which the zeroth to the third splitter/multiplexers 123(0) to 123(2) produce the wavelength multiplexed signals of the wavelengths $\lambda 0$ to $\lambda 3$, $\lambda 4$ to $\lambda 7$, $\lambda 8$ to $\lambda 11$, and $\lambda 12$ to $\lambda 15$, respectively. The zeroth to the third optical crossbar exchange parts 75(0) to 75(3) produce wavelength multiplexed and combined signals of the wavelengths $\lambda 0$ to $\lambda 15$ at each of their output ports 87. As PQ receiver input signals, these wavelength multiplexed and combined signals are supplied to N or zeroth to fifteenth multiplexed optical signal receivers 147(0) to 147(15) or 147, which are grouped into Q or primary to quaternary receiver groups, each consisting of P or four of the multiplexed optical signal receivers 147.

Figure 15:
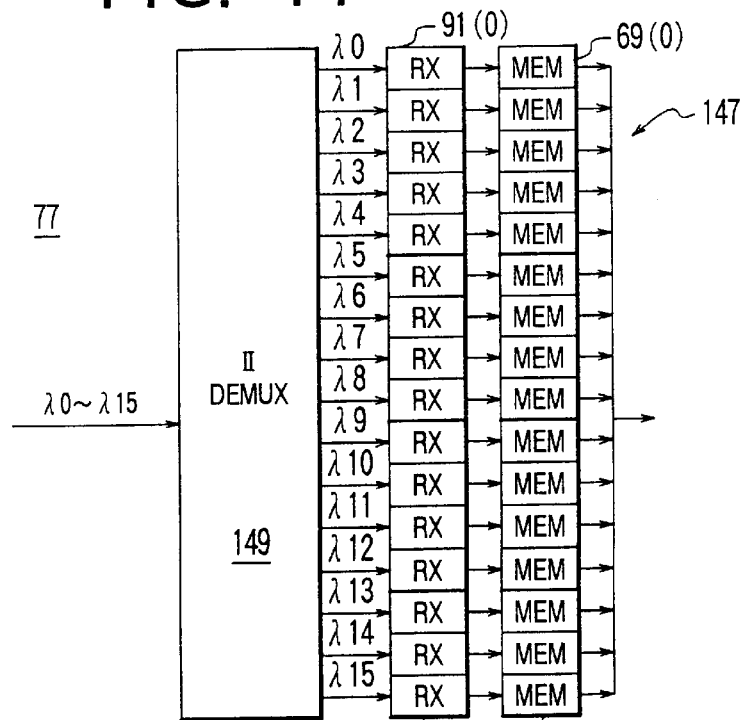
FIG. 15 is a block diagram of a multiplexed optical signal receiver for use in the optical network illustrated in FIG. 14.

Turning temporarily to FIG. 15, each multiplexed optical signal receiver 147 comprises a semiconductor substrate which may again be the semiconductor substrate 77 and on which formed is a wavelength demultiplexer 149, similar to the wavelength demultiplexer 111 of FIG. 7, for demultiplexing each of the wavelength multiplexed and combined signals into M or zeroth to fifteenth demultiplexed signals having M or the zeroth to the fifteenth wavelengths $\lambda 0$ to $\lambda 15$, respectively. Connected to the wavelength demultiplexer 149 are the zeroth to the fifteenth optical receivers 91 for respectively converting the zeroth to the fifteenth wavelength demultiplexed signals to zeroth to fifteenth reproductions of the zeroth to the fifteenth electric signals together with their sources. Connected to the zeroth to the fifteenth optical receivers 91 are the zeroth to the fifteenth memory units 69 for respectively storing as their contents the zeroth to the fifteenth reproductions with their respective sources and final destinations. In compliance with the final destinations, the zeroth to the fifteenth memory units 69 of the multiplexed optical signal receivers 147 respectively deliver their contents, after the arbitration is settled, as the zeroth to the fifteenth reception signals to the zeroth to the fifteenth receiving nodes R and are crosswise connected to the optical receiver 91.

In FIGS. 14 and 15, it will now be presumed that the zeroth, the first, and the fourth transmitting nodes T0, T1, and T4 are concurrently transmitting the zeroth, the first, and the fourth transmission signals respectively with the first, the zeroth, and also the zeroth receiving nodes R1, R0, and R0 selected as final destinations. Converted respectively to the zeroth optical signal of the zeroth wavelength $\lambda 0$ and to the first optical signal of the first wavelength $\lambda 1$, the zeroth and the first transmission signals are sent to the zeroth splitter/multiplexer 123(0), which delivers a wavelength multiplexed signal of the wavelengths $\lambda 0$ and $\lambda 1$ to the zeroth input ports 79(0) to 79(3) of the secondary zeroth to the optical crossbar exchange parts 75(0) to 75(3) of the secondary zeroth to third optical crossbar exchange parts 75(0) to 75(3) as their zeroth exchange input signals. Converted to the fourth optical signal of the fourth wavelength $\lambda 4$, the fourth transmission signal is sent through the first splitter/multiplexer 123(0), which supplies a wavelength "multiplexed" signal of the wavelength $\lambda 4$ to the first input ports 79(1) of the exchange parts 75(0) to 75(3) as their first exchange input signals.

The zeroth and the first exchange input signals are absorbed in the secondary first to third optical crossbar exchange parts 75(1) to 75(3) because these signals are not directed to the output ports 87 of these exchange parts 75(1) to 75(3) and therefore none of the semiconductor optical amplifiers 83 are switched on in the exchange parts 75(1) to 75(3). In the zeroth exchange part 75(0), only the zeroth and the first optical amplifiers 83(0) and 83(0) and only the fourth optical amplifier 83(4) connected respectively to its zeroth and first input ports 79(0) and 79(1) are switched on because the zeroth and the first optical combiners 85(0) and 85(1) are intermediate destinations of the zeroth, the first, and the fourth optical signals and of the zeroth and the first optical signals, respectively. As a consequence, the zeroth exchange part 75(0) supplies its zeroth and first output ports 87(0) and 87(1) with zeroth and first exchanged signals in which the wavelengths $\lambda 0$, $\lambda 1$, and $\lambda 4$ and the wavelengths $\lambda 0$ and $\lambda 1$ are combined, respectively.

In the zeroth multiplexed optical signal receiver 147(0) supplied with the zeroth exchanged signal, the zeroth, the first, and the fourth optical receivers 91(0), 91(0), and 91(4) store respectively the reproductions of the zeroth, the first, and the fourth transmission signals together with their sources of the zeroth, the first, and the fourth transmitting nodes T0, T1, and T4 in the zeroth, the first, and the fourth memory units 69(0), 69(1), and 69(4) as their contents. In the first multiplexed optical signal receiver 147(1) supplied with the first exchanged signal, the zeroth and the first optical receivers 91(0) and 91(0) respectively store the reproductions of the zeroth and the first transmission signals together with their sources of the zeroth and the first transmitting nodes T0 and T1 in the zeroth and the first memory units 69(0) and 69(1) as their contents.

As for the zeroth and the first memory units 69(0) and 69(1), their contents are not different even delivered from whichever of the zeroth and the first optical receivers 91. As regards the zeroth receiving node R0, such a content of the first memory unit 69(1) and the content of the fourth memory unit 69(4) would be supplied thereto as the zeroth reception signal. It should be noted here that the contents of the first and the fourth memory units 69(1) and 69(4) originate at different sources of the first and the fourth transmitting nodes T1 and T4. The arbitration is therefore settled. For example, first delivered as a privileged content is the content of the first memory unit 69(1). Next delivered as a less privileged content is the content of the fourth memory unit 69(4). In connection with the first receiving node R1, a single content may have been stored as separate contents in the zeroth and the first memory units 69(0) and 69(1). Such separate contents, however, originate at a common source of the zeroth transmitting node R0. No conflict therefore arises between these contents. For example, the content of the zeroth memory unit 69(0) is delivered at once as the first reception signal to the first receiving node R1.

In FIG. 14, the optical network is theoretically similar to the optical network which is described with reference to FIG. 8 and in which a four-input and one-output electronic switch (not shown) is used instead of each selector group of Q optical selectors 135. The optical network of FIG. 14 is therefore in principle a completely nonblocking crossbar network. For each transmission signal, its transmission route from an arbitrary one of the at most PQ transmitting node T towards any one of the at most PQ receiving nodes R is determined with no ambiguity and is readily controlled. Moreover, the optical network is an output buffered type as is the case with the network described in conjunction with FIG. 4. With none of the transmission signals buffered on the side of the transmitting node T, it is possible to raise the throughput beyond the theoretical restriction for an input buffered optical network.

In the optical network of FIG. 14, the semiconductor optical amplifiers are necessary sixty-four in number only in the secondary optical crossbar exchange parts 75(0) to 75(3). This number is only a quarter of the number of the optical amplifiers which are indispensable in the conventional optical network described in connection with FIG. 1.

Referring to FIG. 16 and again to FIGS. 5 and 3, attention will be directed to an optical network according to a fifth preferred embodiment of this invention. This optical network is similar to that described with reference to FIG. 13 except for substitution of the multiplexed optical signal receivers 147 used in FIG. 14 for the use in FIG. 13 of combinations of the optical selectors 135 and the optical receivers 91.

Figure 16:
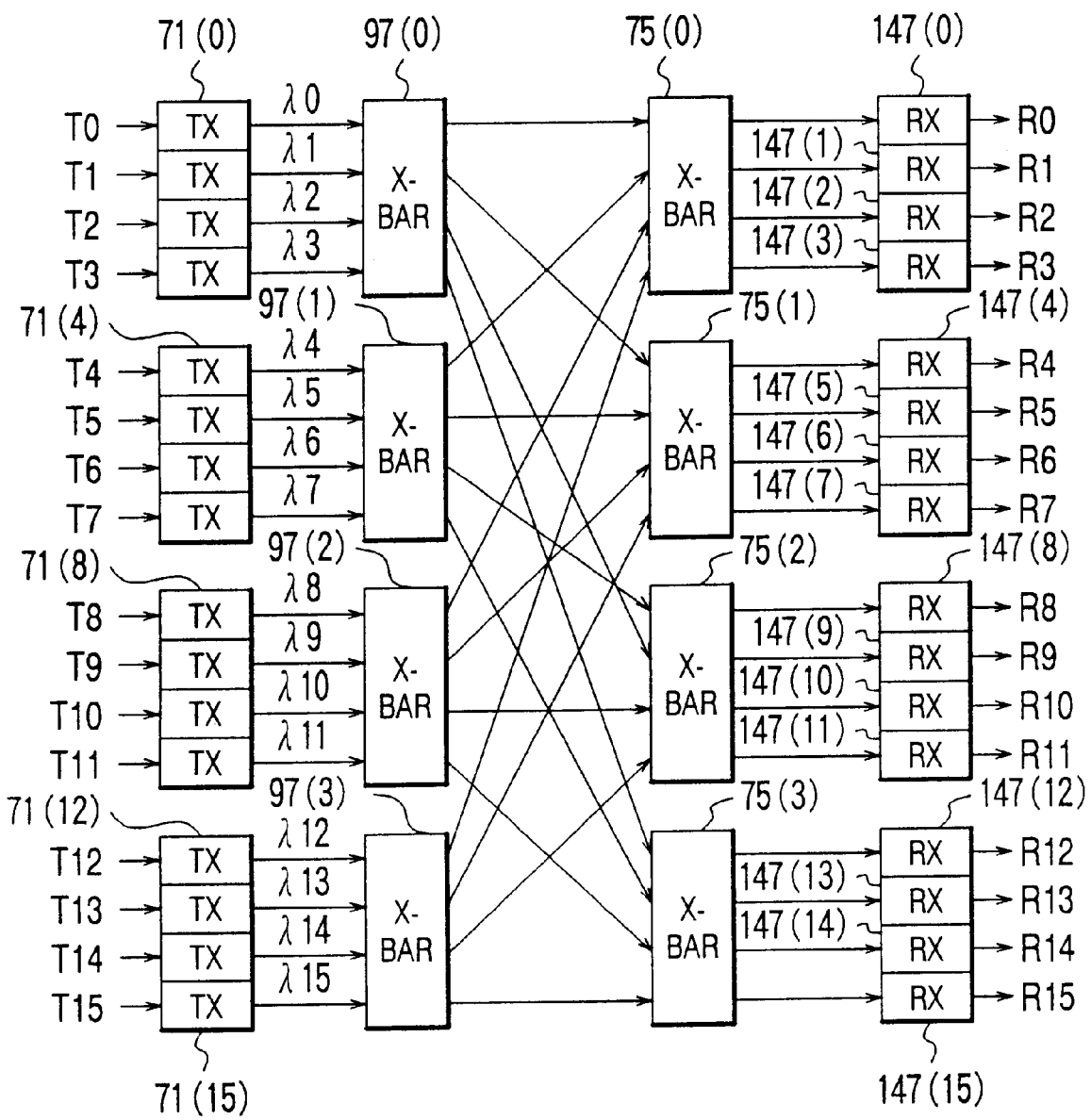
FIGS. 16 and 17 are block diagrams of optical networks according to fifth and sixth embodiments of this invention, respectively.

In FIG. 16, it will be presumed as in FIGS. 14 and 15 that the zeroth, the first, and the fourth transmitting nodes T0, T1, and T4 are simultaneously transmitting the zeroth, the first, and the fourth transmission signals or electric signals with the first, the zeroth, and also the zeroth receiving nodes R1, R0, and R0 selected as their final destinations, respectively. In the example being presumed, the zeroth optical signal of the zeroth wavelength $\lambda 0$ and the first optical signal of the wavelength $\lambda 1$ are delivered to the primary zeroth optical crossbar exchange part 97(0). The fourth optical signal of the wavelength $\lambda 4$ is supplied to the primary first optical crossbar exchange part 97(1). In the primary zeroth optical crossbar exchange part 97(0) depicted in FIG. 5, the zeroth and the fourth semiconductor optical amplifiers 83(0) and 83(4) are rendered on in compliance with an intermediate destination of the zeroth wavelength multiplexer 99(0) to produce their output signals at the zeroth output port 87(0) as the primary zeroth exchanged signal in which the wavelengths $\lambda 0$ and $\lambda 1$ are multiplexed. In the primary first crossbar exchange part 97(1), the zeroth optical amplifier 83(0) alone is switched on in compliance with the intermediate destination to deliver its output signal also to its zeroth output port 87(0) as the primary first exchanged signal of a single wavelength $\lambda 4$.

The zeroth exchanged signal of a primary wavelength multiplexing of two wavelengths $\lambda 0$ and $\lambda 1$ and the first exchanged signal having the signal wavelength $\lambda 4$ "wavelength multiplexed" are supplied both to the secondary zeroth optical crossbar exchange part 75(0) and respectively at the zeroth and the first input ports 79(0) and 79(1). In this exchange part 75(0), the zeroth and the first optical amplifiers 83(0) and 83(0) connected indirectly to the zeroth input port 79(0) are switched on respectively according to the destinations R0 and R1 of the component signals of the wavelengths $\lambda 0$ and $\lambda 1$ of the zeroth exchange input signal. Furthermore, the fourth optical amplifier connected indirectly to the first input port 79(1) is rendered on according to the destination R0 of the first exchange input signal of the single wavelength $\lambda 4$. Through the zeroth wavelength multiplexer 99(0), the zeroth, the first, and the fourth optical amplifiers 83(0), 83(0), and 83(4) supply the zeroth output port 87(0) with the zeroth exchanged signal in which the wavelengths $\lambda 0$, $\lambda 1$, and $\lambda 4$ are multiplexed. Through the first wavelength multiplexer 99(1), the zeroth and the first optical amplifiers 83(0) and 83(0) supply the first output port 87(1) with the first exchanged signal in which the wavelengths $\lambda 0$ and $\lambda 1$ are multiplexed.

From the zeroth and the first output ports 87(0) and 87(1) of the secondary zeroth optical crossbar exchange part 75(0) of FIG. 3, the zeroth exchanged signal of the wavelengths $\lambda 0$, $\lambda 1$, and $\lambda 4$ and the first exchanged signal of the wavelengths $\lambda 0$ and $\lambda 1$ are delivered respectively to the zeroth and the first multiplexed optical signal receivers 147(0) and 147(1), each of which is illustrated with reference to FIG. 15. In the zeroth multiplexed optical signal receiver 147(0), the component signals of the wavelengths $\lambda 0$, $\lambda 1$, and $\lambda 4$ are delivered respectively to the zeroth, the first, and the fourth optical receivers 91(0), 91(0), and 91(4), from which the zeroth, the first, and the fourth received signals are respectively directed to the first, to the zeroth, and also to the zeroth receiving nodes R after buffered in the zeroth, the first, and the fourth memory units 69(0), 69(1), and 69(4). In the first multiplexed optical signal receiver 147(1), the component signals of the wavelengths $\lambda 0$ and $\lambda 1$ are supplied respectively to the zeroth and the first optical receivers 91(0) and 91(0), from which the zeroth and the first received signals are respectively directed to the first and the zeroth receiving nodes R1 and R0 after buffered in the zeroth and the first memory units 69(0) and 69(1).

Directed all in common to the final destination of the zeroth receiving node R0, the contents of the first and the fourth memory units 69(1) and 69(4) respectively originate at the first and the fourth transmitting nodes T1 and T4 and are successively delivered to the zeroth receiving node R0 both as the zeroth reception signal in compliance with results of the arbitration. Directed to the final destination of the first receiving node R1, the content of the zeroth memory unit 69(0) originates at the zeroth transmitting node T0 alone although stored separately from the zeroth optical receivers 91(0) of the zeroth and the first multiplexed optical signal receivers 147(0) and 147(1). This content is consequently produced as the first reception signal immediately without the arbitration.

In FIG. 16, the optical network is theoretically equivalent to that of FIG. 13 except for substitution of each optical selector 135 for a four-input and one-output electronic switch in the manner described in connection with FIG. 14. Consequently, this optical network is in principle a completely nonblocking crossbar network and is readily controlled because a transmission path of each transmission signal is uniquely determined from any one of the transmitting nodes T to an arbitrary one of the receiving nodes R. This optical network moreover is an output buffered optical network like that illustrated with reference to FIG. 4 and can achieve a rise of the throughput beyond the theoretical restriction unavoidable in an input buffered one as is the case with the conventional optical networks of FIGS. 1 and 2.

In the optical network being illustrated, the primary optical exchange parts 97(0) to 97(3) are substituted like in FIG. 13 for the splitter/multiplexers 123 used in FIG. 14. It is therefore possible as in FIG. 13 to enlarge the margin of signals delivered to the optical receivers 91 used in the multiplexed optical signal receivers 147. Moreover, an additional technical merit is attained like in FIG. 13 such that the optical amplifiers 83 are less liable to saturation in the secondary optical crossbar exchange parts 75(0) to 75(3).

For this optical network, the optical amplifiers 83 are necessary in number equal to sixty-four in the primary exchange parts 97(0) to 97(3) and also sixty-four in the secondary exchange parts 75(0) to 75(3) and therefore one hundred and twenty-eight in total. This total is only a half of the number indispensable in the optical network described in conjunction with FIG. 4.

Referring afresh to FIG. 17 and again to FIGS. 3 and 9, the description will proceed to an optical network according to a sixth preferred embodiment of this invention. Each of the zeroth to the fifteenth transmitting nodes T produces like in FIG. 2 an S-ple or quadruple multiplexed electric signal of zeroth to third component transmission signals which may be directed to one of the zeroth to the fifteenth receiving nodes R that is selected as a final destination, where S represents a ternary predetermined integer which is not less than two. Use is made of also the zeroth to the fifteenth wavelengths $\lambda 0$ to $\lambda 15$, which are divided into U or primary to quaternary wavelength groups, each consisting of V wavelengths, where U and V represent secondary first and second predetermined integers, each of which is not less than two.

In the illustrated example, the zeroth to the fifteenth transmitting nodes T are connected in the optical network to first to fifteenth multiplexed optical signal transmitters 151 (0) to 151(15) or 151, respectively, which produce zeroth to fifteenth multiplexed optical signals in Q or primary to quaternary optical signal groups. In each optical signal group, each multiplexed optical signal consists of S or zeroth to third component optical signals of the wavelengths $\lambda 0$ to $\lambda 3$, $\lambda 4$ to $\lambda 7$, $\lambda 8$ to $\lambda 11$, and $\lambda 12$ to $\lambda 15$ as indicated by legends attached to output lines of the multiplexed optical transmitters 151(0) to 151(3), 151(4) to 151(7), 151(8) to 151(11), or 151(12) to 151(15).

Figure 18:
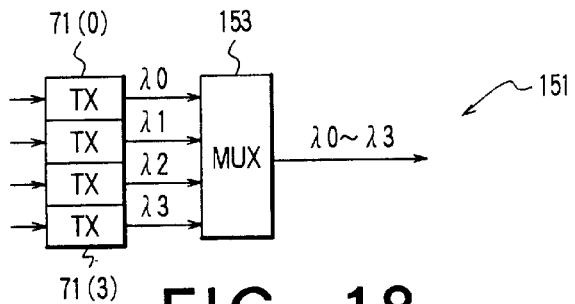
FIG. 18 is a block diagram of a multiplexed optical transmitter for use in the optical network illustrated in FIG. 17.

Turning to FIG. 18 for a short while, each of the multiplexed optical signal transmitters 151 comprises the optical transmitter 71, S in number, and a wavelength multiplexer 153 for multiplexing S output signals of the respective optical transmitters 71 into an S-ple multiplexed signal of V or S wavelengths. The wavelength multiplexer 153 is identical in structure and operation with the multiplexer 99 of FIG. 6. For example, the multiplexed optical transmitter 151 produce the multiplexed signal of the wavelengths $\lambda 0$ to $\lambda 3$.

Turning back to FIG. 17, the zeroth to the third input connections 73 described in conjunction with FIG. 1 consist of the zeroth to the third splitter/multiplexers 123 described with reference to FIG. 9 and supplied respectively with the primary to the quaternary optical signal groups to now produce at each of their zeroth to the third output waveguides 131 an M-ple multiplexed signal in which the M wavelengths $\lambda 0$ to $\lambda 15$ are multiplexed. Herein, each splitter/multiplexer 123 is a four-input and a four-output star coupler formed on a semiconductor substrate. From such zeroth to third output waveguides 131 of the zeroth to the third splitter/multiplexers 123, the wavelength multiplexed signals of all the wavelengths $\lambda 0$ to $\lambda 15$ are crosswise delivered to the zeroth to the third input ports 79 of secondary zeroth to third optical crossbar exchange parts 75(0) to 75(3), each of which is illustrated with reference to FIG. 3 and which produce an exchanged signal at each of their zeroth to third output ports 87. In this example, each exchanged signal is an M-wavelength combined signal in which optical signals of the wavelengths $\lambda 0$ to $\lambda 15$ are combined.

Herein, it will be surmised that the zeroth to the fifteenth wavelengths $\lambda 0$ to $\lambda 15$ are in a predetermined sequential order, such as an ascending or a descending order, of the wavelengths with the primary to the quaternary wavelength groups afresh called zeroth to third wavelength groups and denoted by $\lambda G(0), \lambda G(1), \lambda G(2)$, and $\lambda G(3)$ or $\lambda G$. From the zeroth to the third output ports 87 of the exchange parts 75(0) to 75(3), such exchanged signals are delivered to zeroth to fifteenth router-selector (RSEL) 155(0) to 155(15) or 155 and therefrom to zeroth to fifteenth optical receiver arrays (RXA) 157(0) to 157(15) or 157. In the manner which will presently become clear, each optical receiver array 157 supplies a corresponding one of the receiving nodes R with a reproduction of the quadruple multiplexed electric signal collectively as a reception signal.

Figure 19:
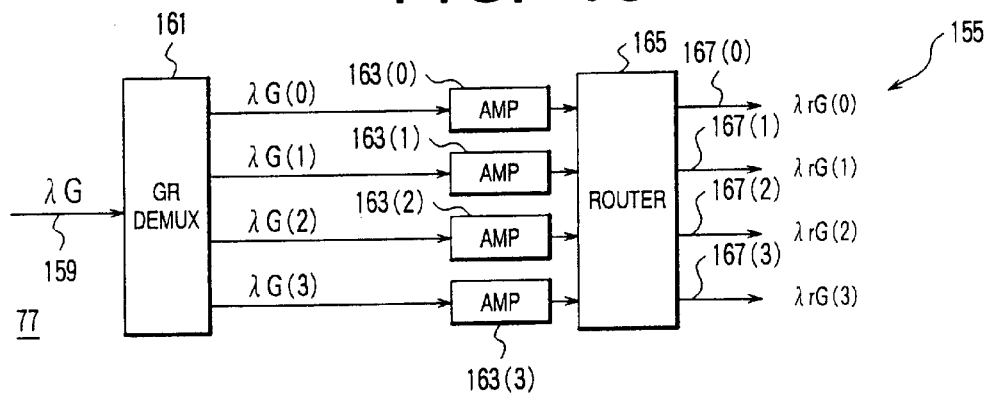
FIG. 19 is a block diagram of a router-selector for use in the optical network illustrated in FIG. 17.

Turning to FIG. 19 during a short while, each router-selector 155 comprises a semiconductor substrate which may again be the semiconductor substrate 77 and on which an input waveguide 159 is formed. From the output ports 87 of each exchange part 75, the zeroth to the third wavelength groups $\lambda G$ are supplied to the input waveguide 159 as indicated by a legend and thence delivered to a wavelength group demultiplexer (GR DEMUX) 161 having a transmittance TR which is dependent on the wavelength groups $\lambda G$ as will presently be described to separately produce output signals which have the zeroth to the third wavelength group $\lambda G(0)$ to $\lambda G(3)$ as indicated by legends, respectively. Like in the wavelength demultiplexer 139 described with reference to FIG. 10, zeroth to third semiconductor optical amplifiers (AMP) 163(0) to 163(2) or 163 are switched on or off to deliver signals of the wavelength groups $\lambda G(0)$ to $\lambda G(3)$ selectively to a wavelength group router 165, which will soon be described more in detail to supply zeroth to third routed waveguides 167(0) to 167(3) or 167 with routed signals of zeroth to third routed groups $\lambda rG(0)$ to $\lambda rG(3)$ or $\lambda rG$ which respectively consist of the wavelengths $\lambda 0$, $\lambda 4$, $\lambda 8$, and $\lambda 12$; $\lambda 1, \lambda 5, \lambda 9$, and $\lambda 13$; $\lambda 2, \lambda 6, \lambda 10$, and $\lambda 14$; and $\lambda 3, \lambda 7, \lambda 11$, and $\lambda 15$.

Figure 20:
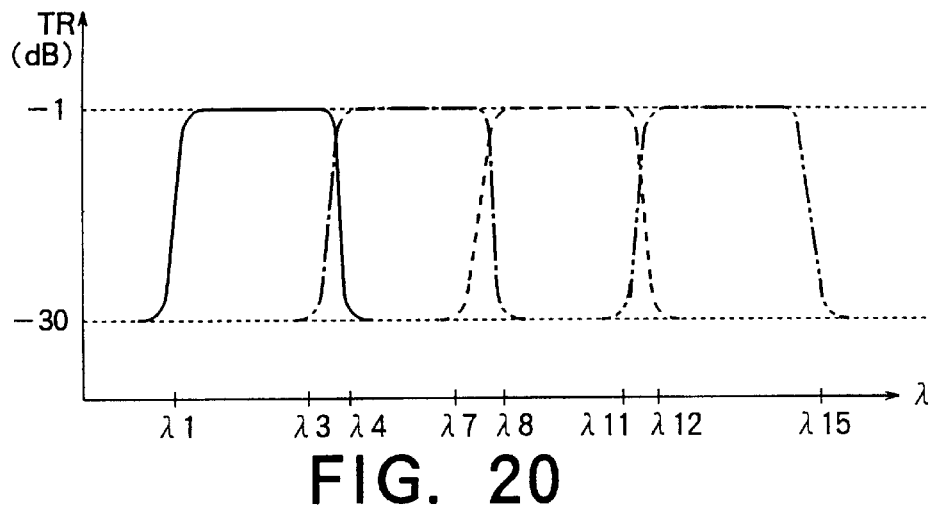
FIG. 20 schematically shows transmittance characteristics of a wavelength group demultiplexer for use in the router-selector depicted in FIG. 19.

Further turning to FIG. 20 with FIG. 19 continuously referred to, the transmittance TR of the wavelength group demultiplexer 161 is schematically illustrated versus the wavelength λ. In the manner described in the foregoing as regards the zeroth to the fifteenth wavelengths λ0 to λ15, the zeroth to the third wavelength groups λG(0) to λG(3) have sequentially ordered wavelengths. The transmittance is variable between minus 1 dB and minus 30 dB as depicted by a solid line for the zeroth wavelength group λG(0), a dash-dot line for the first wavelength group λG(1), a dashed line for the second wavelength group λG(2), and a dash and two-dot line for the third wavelength group λG(3). It is therefore possible with this wavelength group demultiplexer 161 to selectively deliver the signals of the zeroth to the third wavelength groups λG(0) to λG(3) respectively to the optical amplifiers 163(0) to 163(2).

Figure 21:
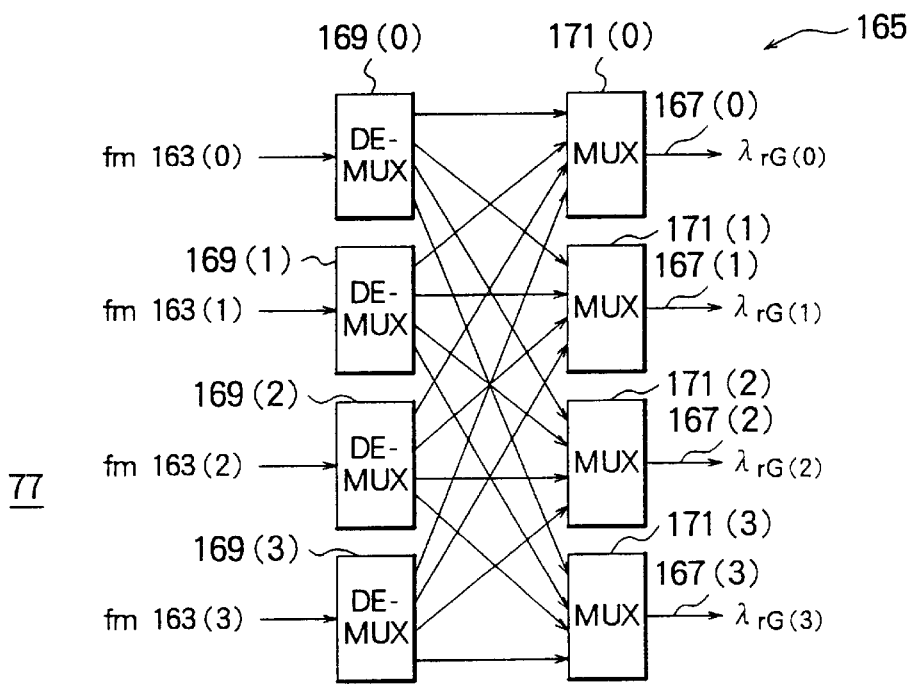
FIG. 21 is a block diagram of a wavelength group router for use in the router-selector depicted in FIG. 19.

Still further turning to FIG. 21 with FIG. 19 continuously referred to, the wavelength group router 165 comprises on the semiconductor substrate 77 zeroth to third wavelength demultiplexers 169(0) to 169(3) or 169, which are connected respectively to the zeroth to the third optical amplifiers 163 and each of which is similar to the wavelength demultiplexer 111 described in conjunction with FIG. 7 and has zeroth to third output ports. Furthermore formed on the semiconductor substrate 77 are zeroth to third wavelength multiplexers 171(0) to 171(3) or 171 which are connected respectively to the zeroth to the third routed waveguides 167 and each of which is similar to the waveguide multiplexer 99 described in connection with FIG. 6 and has zeroth to third input ports. The output ports of the zeroth to the third wavelength demultiplexers 169 are cross-connected by intermediate waveguides to the input ports of the zeroth to the third waveguide multiplexers 171. Responsive to the signal of the zeroth wavelength group λG(0), the zeroth wavelength demultiplexer 169(0) delivers signals of individual wavelengths of λ0 to λ3 through its zeroth to third output ports to the zeroth input ports of the zeroth to the third wavelength multiplexers 171. In this manner supplied additionally with signals of individual wavelengths λ4 to λ7, λ8 to λ11, and λ12 to λ15, the zeroth to the third wavelength multiplexers 171 deliver the routed signals of the zeroth to the third routed groups λrG(0) to λrG(3) respectively to the zeroth to the third output waveguides 167 of the router-selector 155.

In FIGS. 19 and 21, it should be noted that the signals of the zeroth to the third wavelength groups λG are supplied through the optical amplifiers 163 selectively to the zeroth to the third wavelength demultiplexers 169. For example, the signal of the zeroth wavelength group λG(0) alone is supplied to the wavelength group router 165 when only the zeroth optical amplifier 163(0) is switched on while other optical amplifiers 163(0) to 163(2) are rendered off. In this event, the routed signals have only the wavelengths λ0, λ1, λ2, and λ3, respectively, on the routed waveguides 167 of FIG. 19. As a consequence, the router-selector 155 is operable responsive to the exchanged signals of input wavelengths in the wavelength groups λG, to route selected ones of the input wavelengths as the routed signals of individual output wavelengths to different ones of the routed waveguides 167 in accordance with switch on and off of the semiconductor optical amplifiers 163.

Figure 22:
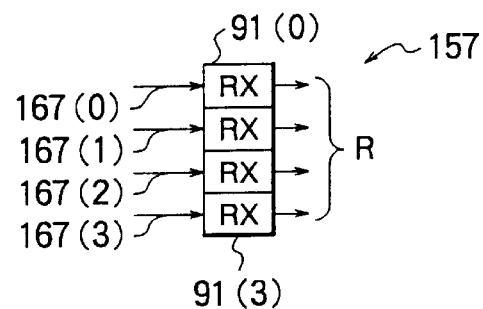
FIG. 22 is a block diagram of an optical receiver array for use in the optical network illustrated in FIG. 19.

Temporarily turning now to FIG. 22 with FIGS. 17 and 19 again referred to, each optical receiver array 157 comprises V or zeroth to third optical receivers which are not different from those used in FIG. 1 and other drawing figures and will therefore be referred to as the optical receivers 91(0) to 91(3). Arranged parallel as an array, the optical receivers 91 are connected to the routed waveguides 167 and pertinent ones of the receiving nodes R. Supplied with the routed signals as the receiver input signals, the optical receiver array 155 delivers the reception signals to the pertinent receiving nodes R.

Turning back to FIG. 17 with FIGS. 18 to 22 additionally referred to, it will be presumed as described in connection with FIG. 8 that the zeroth and the first transmitting nodes T0 and T1 are concurrently transmitting the zeroth and the first S-ple or quadruple multiplexed transmission signals with the first and the zeroth receiving nodes R1 and R0 selected as their final destinations, respectively. The zeroth to the third component transmission signals of the zeroth multiplexed transmission signal are respectively converted by the zeroth to the third optical transmitters 71 of the zeroth multiplexed optical signal transmitter 151(0) into the zeroth to the third component optical signals having the wavelengths λ0 to λ3, respectively, and wavelength multiplexed into the zeroth multiplexed optical signal. Likewise, the first multiplexed optical signal transmitter 151(0) produces the first multiplexed optical signal into which wavelength multiplexed are the fourth to the seventh component optical signals having the wavelengths λ4 to λ7, respectively.

Again wavelength multiplexing the zeroth and the first multiplexed optical signals, the zeroth splitter/multiplexer 123(0) supplies the input ports 79(0) of the zeroth to the third optical crossbar exchange parts 75(0) to 75(3) with the wavelength multiplexed signal of the zeroth and the first wavelength groups λG(0) to λG(1). In the first to the third exchange parts 75(1) to 75(3), all semiconductor optical amplifiers 83 are kept closed to produce no exchanged signals. In the zeroth exchange part 75(0) alone, only the zeroth and the first optical amplifiers 83(0) and 83(0) are switched on to produce the zeroth and the first exchanged signals respectively at the zeroth and the first output ports 87(0) and 87(1) both as a wavelength group combined signal in which the zeroth and the first wavelength groups λG(0) and λG(1) are combined.

In the zeroth router-selector 155(0), the wavelength group demultiplexer 161 delivers the signals of the zeroth and the first wavelength group λG(0) and λG(1) respectively to the zeroth and the first semiconductor optical amplifiers 163(0) and 163(0). In compliance with the final destination of the zeroth receiving node R0, the first optical amplifier 163(0) alone is switched on. Responsive to the signals of the first wavelength group λG(1), the wavelength group router 165 routes the routed signals of the wavelengths λ4 to λ7 in the zeroth to the third routed groups λrG(0) to λrG(3) to the first optical receiver array 157(1). In a similar manner, the first router-selector 155(1) selects the signal of the zeroth wavelength group λG(0) to route the routed signal of the wavelengths λ0 to λ3 in the routed groups λrG(0) to 80 rG(3) to the first optical receiver array 157(1). To deliver to the zeroth receiving node R0 collectively as the zeroth reception signal, the optical receivers 91 of the zeroth array 157(0) respectively reproduce the transmission signals from the component optical signals of the wavelengths λ4 to λ7. To deliver to the first receiving node R1 collectively as the first reception signal, the first optical receiver array 157(1) receives the component optical signals of the wavelengths λ0 to λ3.

Figure 17:
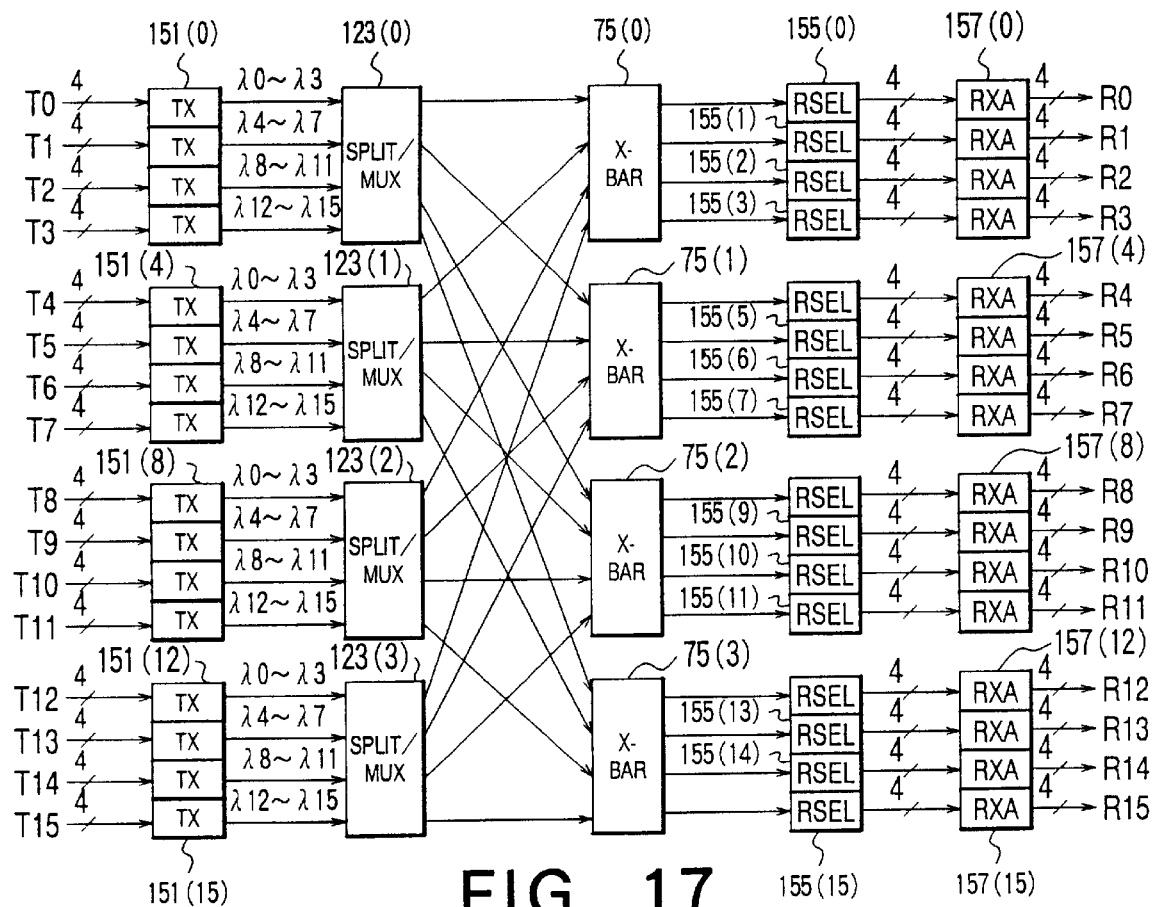

In FIG. 17, the optical network is equivalent to S or four optical networks of the type illustrated with reference to FIG. 8. This optical network is therefore an optical crossbar network in principle. That is to say, the optical network is a completely nonblocking network and is readily controlled because the propagation path of each transmission signal is uniquely determined from any one of the transmitting node T to an arbitrary one of the receiving nodes R. Despite the fact that use is made of the splitter/multiplexers 123 and the second optical crossbar exchange parts 75(0) to 75(3) like the optical network of FIG. 8, the optical network of FIG. 17 has an exchange capacity which is four times as great as that of the optical network of FIG. 8 and equivalent to that achieved by a sixteen by sixteen switching network by using the structure of the conventional optical network described in connection with FIG. 2.

As for the necessary semiconductor optical amplifiers 83 and 163, their number is equal to sixty-four in the zeroth to the third exchange parts 75(0) to 75(3) and also to sixty-four in the zeroth to the fifteenth router-selectors 155, namely, one hundred and twenty-eight in total. This total is only a half of the number of two hundred and fifty-six of the optical amplifiers 83 which are indispensable on implementing an optical network having the exchange capacity of the optical network by using the conventional structure of FIG. 2.

Figure 23:
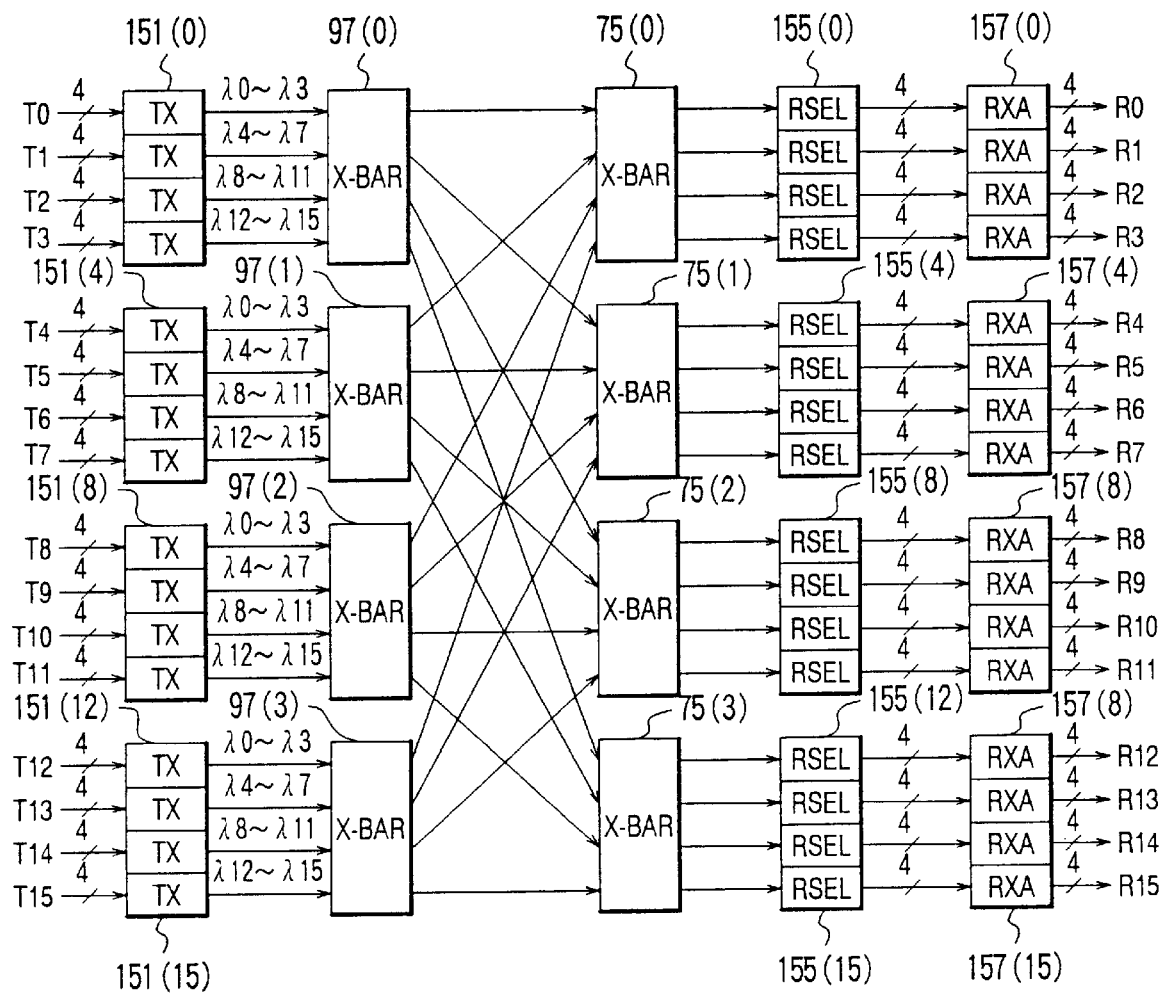
FIGS. 23 and 24 are block diagrams of optical networks according to seventh and eighth embodiments of this invention, respectively.

Referring to FIG. 23, the description will further proceed to an optical network according to a seventh preferred embodiment of this invention. This optical network is for use between the zeroth to the fifteenth transmitting nodes T1 to T15, each producing an S-ple or quadruple multiplexed transmission signal of zeroth to third electric signals, and the zeroth to the fifteenth receiving nodes R0 to R15, each of which is for receiving as an S-ple multiplexed reception signal a reproduction of the multiplexed transmission signal produced at one of the transmitting nodes T. The optical network comprises the zeroth to the fifteenth multiplexed optical signal transmitters 151, the primary zeroth to third optical crossbar exchange parts 97(0) to 97(3) of the type described in conjunction with FIG. 5, the secondary zeroth to third optical crossbar exchange parts 75(0) to 75(3) of the type of FIG. 3, the zeroth to the fifteenth router-selectors 155, and the zeroth to the fifteenth optical receiver arrays 157. Like for the optical network described in connection with FIG. 17, the wavelengths λ0 to λ15 are grouped into the zeroth to the third wavelength groups λG(0) to λG(3) which are converted in the optical network to the zeroth to the third routed groups λrG(0) to λrG(3). The primary and the secondary exchange parts 97(0) to 97(3) and 75(0) to 75(3) are identical in structure and operation with those used in FIG. 13. The multiplexed optical signal transmitters 151, the router-selector 155, and the optical receiver arrays 157 are identical in structure and operation to those used in FIG. 17.

In FIG. 23, it will again be presumed that the zeroth and the first transmitting nodes T0 and T1 are concurrently transmitting the zeroth and the first quadruple multiplexed electric signals with the first and the zeroth receiving nodes R1 and R0 selected respectively as their final destinations. The zeroth to the third transmission signals of the zeroth multiplexed electric signal are respectively converted by the zeroth to the third optical transmitters 71 of the zeroth multiplexed optical signal transmitter 151(0) to the optical component signals which have the wavelengths λ0 to λ3, respectively, and are wavelength multiplexed into the zeroth multiplexed signal of the zeroth wavelength group λG(0). Likewise, the first multiplexed optical signal transmitter 151(0) produces the first wavelength multiplexed signal of the first wavelength group λG(1) into which wavelength multiplexed are the fourth to the seventh component optical signals having the wavelengths λ4 to λ7, respectively.

As depicted in detail in FIG. 5, the zeroth and the first wavelength multiplexed signals are respectively delivered to the zeroth and the first input ports 79(0) and 79(1) of the primary zeroth optical crossbar exchange part 97(0). Switched on according to the intermediate destination of the zeroth wavelength multiplexer 99(0), the zeroth and the fourth optical amplifiers 83(0) and 83(4) supply the zeroth output port 87(0) with the zeroth exchanged signal in which further multiplexed are the zeroth and the first wavelength multiplexed signals of the zeroth and the first wavelength groups λG(0) and λG(1).

In the manner depicted in detail in FIG. 3, the exchanged signal is delivered to the zeroth input port 79(0) of the secondary zeroth optical crossbar exchange part 75(0). Switched on in compliance with the final destinations, the first and the zeroth optical amplifiers 83(0) and 83(0) of this secondary zeroth exchange part 75(0) supply the first and the zeroth output ports 87(1) and 87(0) respectively with the first and the zeroth exchanged signals, in each of which "combined" is wavelength multiplexing of the zeroth and the first wavelength groups λG(0) and λG(1).

In FIGS. 23 and 19, the zeroth exchanged signal is supplied to the zeroth router-selector 155(0) in which the first wavelength group λG(1) is selected by the first optical amplifier 163(0) switched on and routed by the wavelength group router 165 to the zeroth to the third routed waveguides 167 respectively as the routed signals of the zeroth to the third routed groups λrG(0) to λrG(3), namely, the wavelengths λ4 to λ7. Similarly, the first router-selector 155(1) selects the zeroth wavelength group λG(0) by the zeroth optical amplifier 163(0) and routes, respectively to the zeroth to the third routed waveguides 167, the routed signals of the zeroth to the third routed groups λrG(0) to λrG(3), namely, the wavelengths λ0 to λ4.

Connected to the zeroth router-selector 155(0), the zeroth optical receiver array 157(0) converts the routed signals of the wavelengths λ4 to λ7 to the reproductions of the zeroth to the third component electric signals of the first multiplexed transmission signal for delivering collectively as the zeroth reception signal to the zeroth receiving node R0. By the first optical receiver array 157(1), the routed signals of the wavelengths λ0 to λ3 are converted respectively to the zeroth to the third reproduced electric signals of the zeroth multiplexed transmission signal for delivery to the first receiving node R1.

In FIG. 23, the optical network is theoretically equivalent to S or four optical networks, each illustrated with reference to FIG. 13. This optical network is therefore an optical crossbar network of the completely nonblocking type in principle and is easy to control because each multiplexed transmission signal is propagated therethrough from an arbitrary one of the transmitting nodes T to any selected one of the receiving nodes R with no ambiguity. Furthermore, the optical network has an exchange capacity which is four times as great as that attained by the optical network of FIG. 13 and is equal to that achieved by a sixteen by sixteen network implemented by the conventional structure of FIG. 2.

In the optical network being illustrated, the primary exchange parts 97(0) to 97(3) are used in place of the splitter/multiplexers 123 which is described in connection with FIG. 9 and is used in the optical network of FIG. 17. In each splitter/multiplexer 123, each optical splitter 127 unavoidably gives an optical power loss of at least 6 dB. In contrast, it is possible to give a gain to each semiconductor optical amplifier 83 of the primary exchange parts 97(0) to 97(3) and accordingly give a large margin to the receiver input signal supplied to each optical receiver 69 used in the optical receiver arrays 157 of the type described with reference to FIG. 22. Additionally, each splitter/multiplexer 123 produces its output signal in which the wavelength groups λG may at most be multiplexed. In contrast, each of the exchange signals is produced by the primary exchange parts 97(0) to 97(3) to include only one of the wavelength groups λG. This gives a further additional technical merit of preventing the optical amplifiers 83 from being saturated in the secondary exchange parts 75(0) to 75(3).

In the illustrated optical network, the number of necessary semiconductor optical amplifiers 83 and 163 is equal to sixty-four in the primary exchange parts 97(0) to 97(3), also sixty-four in the secondary exchange parts 75(0) to 75(3), and again sixty-four in the router-selectors 155 and is equal in total to one hundred and ninety-two. This total is, although greater than the total of one hundred and twenty-eight necessary in the optical network of FIG. 17, appreciably less than the total of two hundred and fifty-six, which total is indispensable on implementing the sixteen by sixteen exchange network with the conventional structure of FIG. 2.

Figure 24:
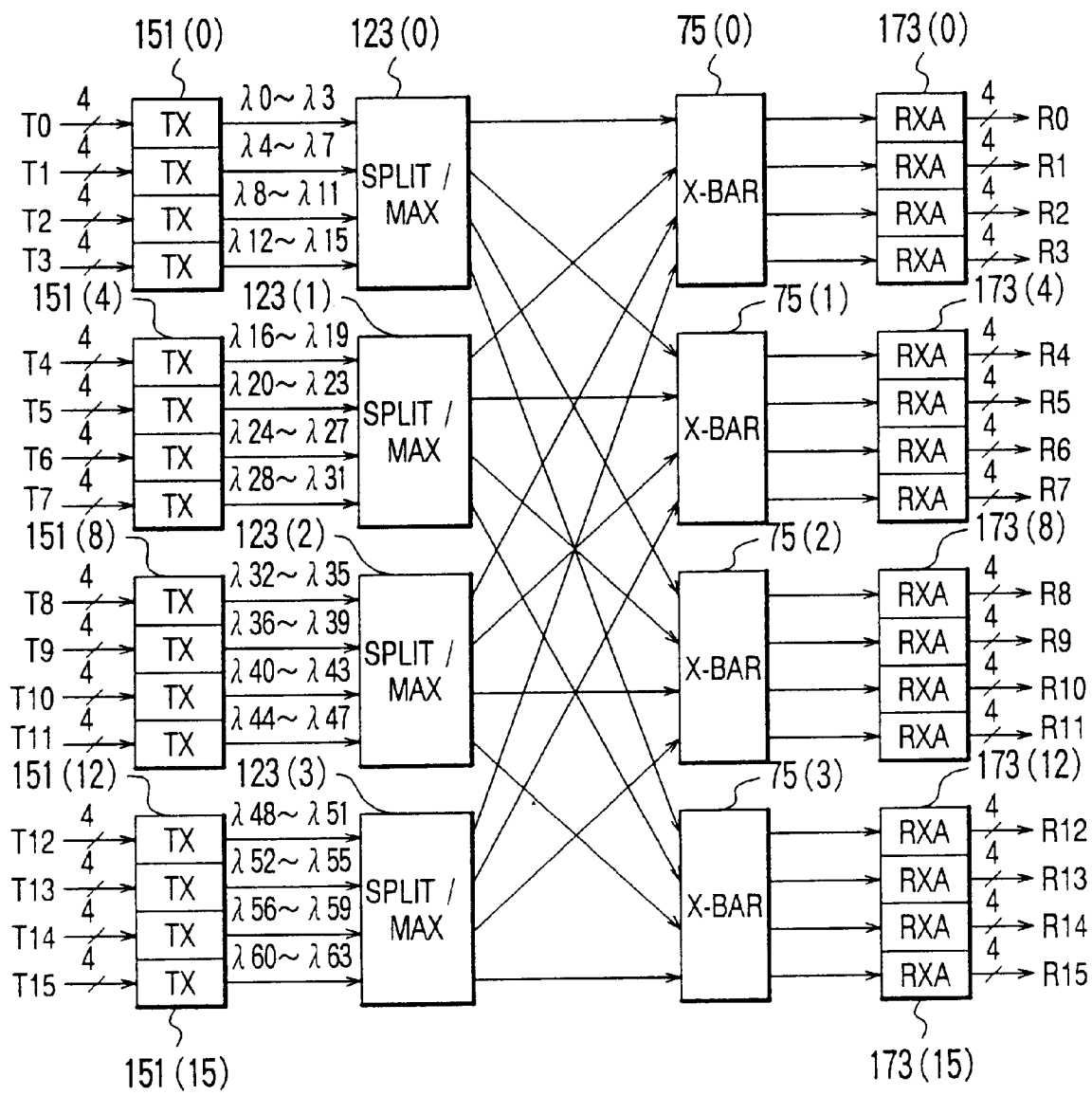

Referring to FIG. 24, an optical network is according to an eighth preferred embodiment of this invention and is for use, as before, between the zeroth to the fifteenth transmitting nodes T and the zeroth to the fifteenth receiving nodes R. In this example, used are sixty-four different wavelengths $\lambda 0$ to $\lambda 63$ which are grouped into sixteen wavelength groups of zeroth to fifteenth wavelength groups $\lambda G(0)$ to $\lambda G(15)$. Each wavelength group $\lambda G$ consists of four wavelengths. The secondary predetermined integer M and the secondary first and second predetermined integers U and V are equal to sixty-four, sixteen, and four, respectively.

The optical network comprises, like in FIG. 17, the zeroth to the fifteenth multiplexed optical signal transmitters 151, the zeroth to the third splitter/multiplexers 123, and the secondary zeroth to third optical crossbar exchange parts 75(0) to 75(3). Each multiplexed optical signal transmitter 151 is similar to that described in conjunction with FIG. 17. It should, however, be noted that the zeroth to the fifteenth multiplexed optical transmitters 151 are for producing the wavelength multiplexed signals in which the wavelengths $\lambda 0$ to $\lambda 3$, $\lambda 4$ to $\lambda 7$, . . . , $\lambda 16$ to $\lambda 19$, . . . , $\lambda 32$ to $\lambda 35$, . . . , $\lambda 48$ to $\lambda 51$, . . . , and $\lambda 60$ to $\lambda 63$ are multiplexed, respectively, as indicated by legends attached to their output waveguides. Furthermore, this optical network comprises U or zeroth to fifteenth multiplexed optical signal receivers 173(0) to 173(15) or 173, which are different from each described with reference to FIG. 19 and will be described in the following.

Figure 25:
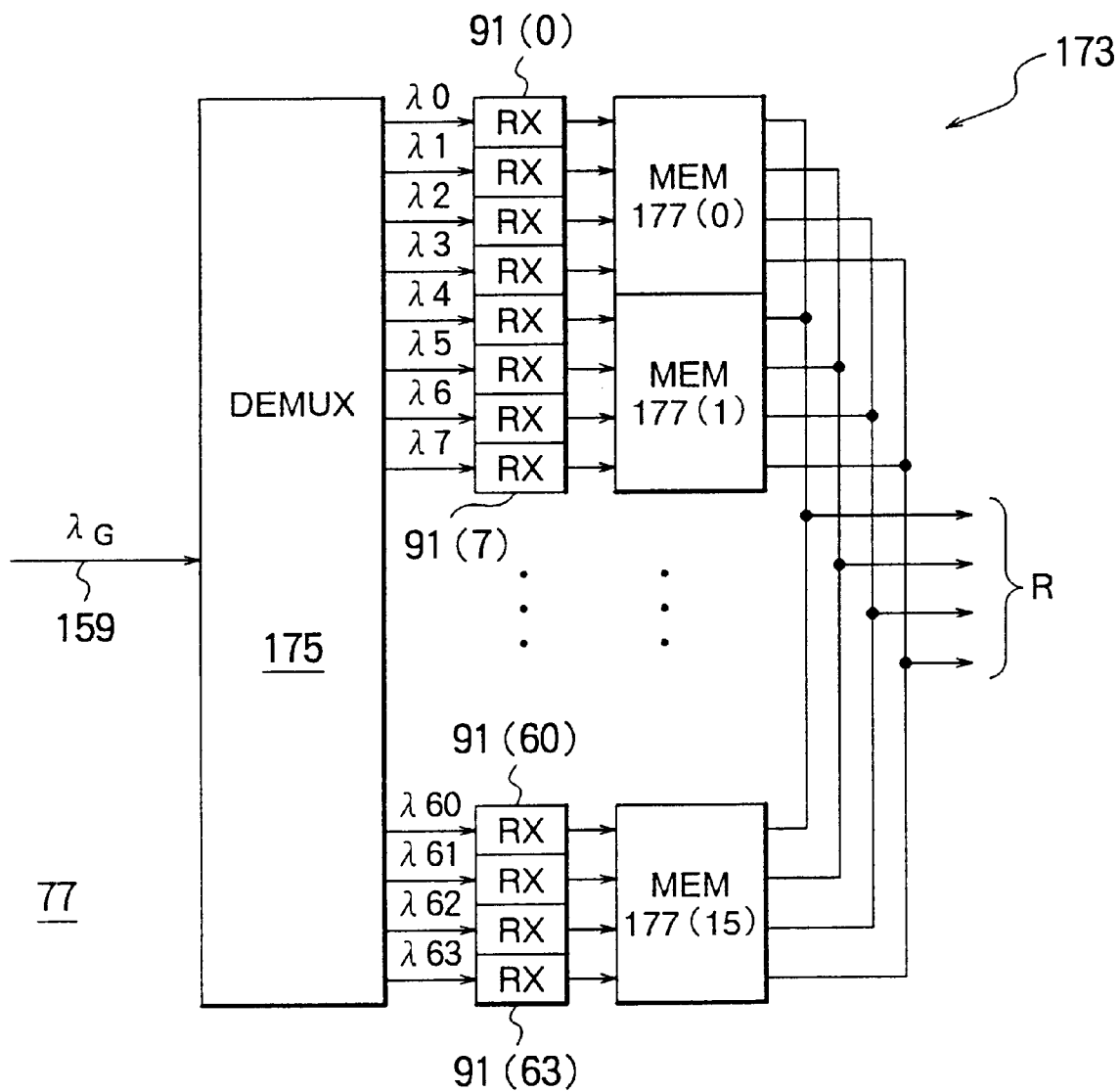
FIG. 25 is a block diagram of a multiplexed optical receiver for use in the optical network illustrated in FIG. 24.

Turning to FIG. 25 for a short while with FIG. 24 continuously referred to, it should be noted that a wavelength multiplexed and combined signal of at most V wavelength groups, namely, the zeroth to the fifteenth wavelength groups $\lambda G$, is produced as the exchanged signal at each of PQ output ports 87 of the P exchange parts, such as 75(0) to 75(3). Each multiplexed optical receiver 173 comprises on a semiconductor substrate, such as 77, the input waveguide 159 supplied with the exchanged signal of the at most zeroth to fifteenth wavelength groups $\lambda G$ and a wavelength demultiplexer (DEMUX) 175 which is similar to the wavelength demultiplexer 111 depicted in FIG. 7 and produces at most zeroth to sixty-third demultiplexed signals of the wavelengths $\lambda 0$ to $\lambda 63$. Supplied with these demultiplexed signals, respectively, are zeroth to sixty-third optical receivers (RX) 91(0) to 91(63) or 91 grouped into zeroth to fifteenth receiver groups in one-to-one correspondence to the zeroth to the fifteenth wavelength groups $\lambda G$, for producing zeroth to sixty-third receiver output signals. The zeroth to the fifteenth receiver group of the optical receivers 91 are connected respectively to zeroth to fifteenth memory units (MEM) 177(0) to 177(15) or 177, each of which produces S or four reproductions of the component transmission signals in the manner which will presently become clear. These four reproductions are multiplexed into a reproduction of the multiplexed transmission signal produced in one of the transmitting nodes T that is indicated as a source by the wavelength group corresponding to one of the receiver groups of the optical receivers 91. This reproduction is delivered, after arbitration if necessary relative to contents stored in the memory units 177 of others of the zeroth to the fifteenth multiplexed optical signal receivers 173, as the reception signal to one of the receiving nodes R that is specified as the final destination by the electric signals originating at the transmitting nodes T.

In FIGS. 24 and 25, it will be presumed in a manner similar to that described in conjunction with FIGS. 14 and 16 that the zeroth, the first, and the fourth transmitting nodes T0, T1, and T4 are concurrently transmitting the zeroth, the first, and the fourth multiplexed electric signals, each comprising the zeroth to the third component transmission signals, with their final destinations set respectively at the first, at the zeroth, and also at the zeroth receiving nodes R1, R0, and again R0. The zeroth, the first, and the fourth multiplexed electric signals are respectively converted by the zeroth, the first, and the fourth multiplexed optical signal transmitters 151(0), 151(0), and 151(4) to the zeroth, the first, and the fourth multiplexed optical signals of the zeroth, the first, and the fourth wavelength signal groups $\lambda G(0)$, $\lambda G(1)$, and $\lambda G(4)$ as indicated by legends of $\lambda 0$ to $\lambda 3$, $\lambda 4$ to $\lambda 7$, and $\lambda 16$ to $\lambda 19$. Supplied with the zeroth and the first multiplexed optical signals, the zeroth splitter/multiplexer 123(0) produces a zeroth double multiplexed signal of the zeroth and the first wavelength groups $\lambda G(0)$ and $\lambda G(1)$ at its zeroth output waveguide 131(0). Supplied with the fourth multiplexed optical signal, the first splitter/multiplexer 123(0) produces a first "double multiplexed" signal of the fourth wavelength group $\lambda G(4)$ at its output waveguide 131(0).

These double multiplexed signals of the wavelength groups $\lambda G(0)$ and $\lambda G(1)$ and the double multiplexed signal of the fourth wavelength group $\lambda G(4)$ are supplied to the zeroth to the third optical crossbar exchange parts 75(0) to 75(3), among which the first to the third exchange parts 75(1) to 75(3) do not allow the double multiplexed signal of the zeroth, the first, and the fourth wavelength groups to pass therethrough because none of the semiconductor optical amplifiers 83 is switched on therein. Only in the zeroth exchange part 75(0), the zeroth, the first, and the fourth optical amplifiers 83(0), 83(0), and 83(4) are switched on according to intermediate destinations of the zeroth and the first optical combiners 85(0) and 85(1) to respectively produce the zeroth and the first exchanged signals at the zeroth and the first output ports 87(0) and 87(1) with the wavelength groups $\lambda G(0)$, $\lambda G(1)$, and $\lambda G(4)$ and with the wavelength groups $\lambda G(0)$ and $\lambda G(1)$ combined in the zeroth and the first exchanged signals.

With structures of the type depicted in FIG. 25, the zeroth and the first multiplexed optical signal receivers 173(0) and 173(0) are supplied respectively with the zeroth and the first exchanged signals. In the zeroth multiplexed optical signal receiver 173(0), optical signals of the wavelengths in the zeroth, the first, and the fourth wavelength group are received by the optical receivers 91 of the zeroth, the first, and the fourth receiver groups, respectively. From the optical receivers 91(0) to 91(7) and 91(16) to 91(19) (not shown), the reproductions of the component transmission signals are stored together with the final destinations of the first, the zeroth, and again the zeroth receiving nodes R1, R0, and R respectively in the zeroth, the first, and the fourth (not shown) memory units 177(0), 177(1), and 177(4) as zeroth, first, and fourth contents. In the first multiplexed optical signal receiver 173(0), optical signals of the wavelengths in the zeroth and the first wavelength groups are received by the optical receivers 91 of the zeroth and the first receiver groups, respectively. From these optical receivers of the first multiplexed optical signal receiver 173(0), the reproductions of the component transmission signals are stored together with their respective final destinations of the first and the zeroth receiving nodes R1 and R0 respectively in the zeroth and the first memory units 177(0) and 177(1) as zeroth and first contents of the first multiplexed optical signal receiver 173(0). It should be noted in connection with the foregoing that the memory units 177 of the zeroth to the fifteenth multiplexed optical signal receivers 173 respectively store their contents originating at the transmitting nodes T which are numbered with ordinal numbers in one-to-one correspondence to the ordinal numbers of the memory units 177.

On delivering such contents of the multiplexed optical signal receivers 173 to, in the example being illustrated, the zeroth and the first receiving nodes R0 and R1 respectively as the zeroth and the first reception signals, it is understood that the zeroth contents of the zeroth and the first multiplexed optical signal receivers 173(0) and 173(0) are directed to the first receiving node R1 and originate at the zeroth transmitting node T0 in common and that no arbitration is necessary. Consequently, the zeroth contents are delivered at once to the first receiving node R1. Similarly, no arbitration is necessary between the first contents of the zeroth and the first multiplexed optical receivers 173(0) and 173(0). In contrast, such first contents and the fourth content are directed in common to the zeroth receiving node R0 and individually originate at different sources. Therefore, the arbitration is settled among the first and the fourth contents to supply in succession the first and the fourth contents to the zeroth receiving node R0.

In FIGS. 24 and 25, the optical network is theoretically equivalent to four optical networks, each of which is illustrated with reference to FIGS. 14 and 15. Therefore, this optical network again is an optical crossbar network in principle, is of the completely nonblocking type, and is easily controlled because each multiplexed electric signal is transmitted therethrough uniquely from any one of the transmitting nodes T to any selected one of the receiving nodes R. Furthermore, the optical network has an exchange capacity which is four times as great as that achieved by the optical network described in connection with FIGS. 14 and 15.

In addition, this optical network is of the output buffered type and is therefore capable of raising the throughput beyond the theoretical restriction imposed on an input buffered optical network. In the optical network being illustrated, the number of necessary semiconductor optical amplifiers 83 is equal to sixty-four only in the exchange parts 75(0) to 75(3) and only a quarter of the number of the optical amplifiers 83 indispensable for an optical network which would be implemented by using the structure of FIG. 4 to realize a sixteen by sixteen switching network.

Figure 26:
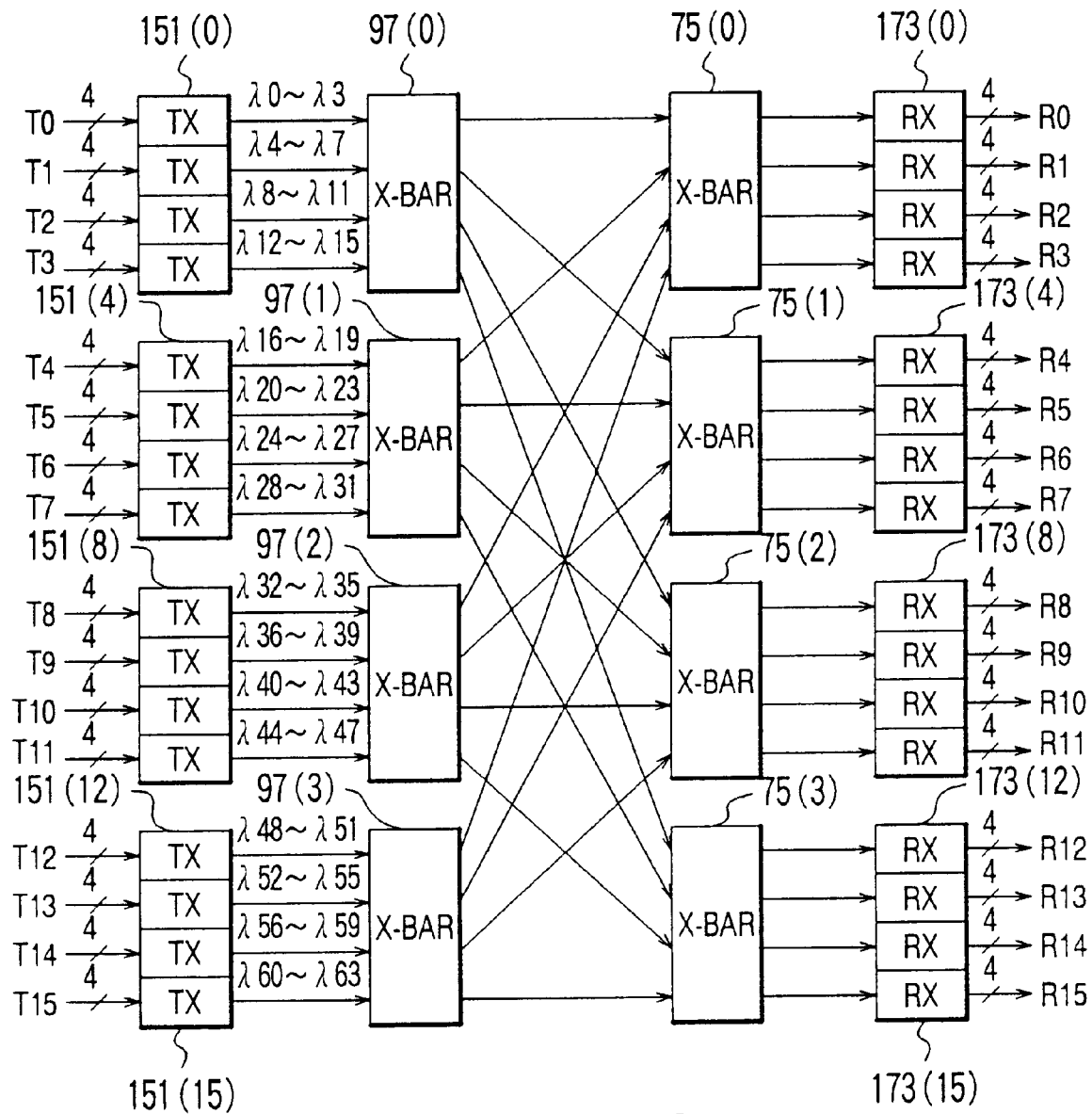
FIGS. 26 and 27 are block diagrams of optical networks according to ninth and tenth embodiments of this invention, respectively.

Referring to FIG. 26, an optical network is according to a ninth preferred embodiment of this invention. Use is made, like in FIG. 24, of the sixty-four wavelengths λ0 to λ63 grouped into the zeroth to the fifteenth wavelength groups λG(0) to λG(15), each consisting of four wavelengths. The primary zeroth to third optical crossbar exchange parts 97(0) to 97(3) are substituted for the zeroth to the third splitter/multiplexers 123(0) to 123(2) which are used in FIG. 24.

In FIG. 26, it will be presumed again that the zeroth, the first, and the fourth transmitting nodes T0, T1, and T4 are concurrently transmitting the zeroth, the first, and the fourth multiplexed electric signals with their final destinations selected respectively at the first, the zeroth, and again the zeroth receiving nodes R1, R0, and R0. As before, each multiplexed electric signal consists of four component transmission signals. In the optical network, the component transmission signals of the zeroth multiplexed electric signal are produced by the zeroth multiplexed optical signal transmitter 151(0) as the zeroth multiplexed optical signal which has the zeroth wavelength group λG(0) and in which wavelength multiplexed are the component optical signals of the wavelengths λ0 to λ3 as indicated by the legends. Similarly, the first and the fourth multiplexed optical transmitters 151(0) and 151(4) respectively produce the first and the fourth multiplexed optical signals of the first and the fourth wavelength groups λG(1) and λG(4).

Taking FIG. 5 into consideration, the zeroth and the fourth semiconductor optical amplifiers 83(0) and 83(4) are switched on in the primary zeroth optical crossbar exchange part 97(0) in compliance with the intermediate destination which is the zeroth wavelength multiplexer 99(0). The zeroth and the first multiplexed optical signals are therefore produced at the zeroth output port 87(0) as the primary zeroth exchanged signal in which the wavelength groups λG(0) and λG(1) are further multiplexed. In the primary first exchange part 97(1), the zeroth optical amplifier 83(0) alone is switched on according to the intermediate destination of its zeroth wavelength multiplexer 99(0) to produce at its zeroth output port 87(0) the primary first exchanged signal in which "further multiplexed" is only the fourth wavelength group λG(4).

With attention directed to FIG. 3, the primary zeroth and first exchanged signals are delivered respectively through the zeroth and the first input ports 79(0) and 79(1) to the secondary zeroth exchange part 75(0). In this exchange part 75(0), the zeroth, the first, and the fourth optical amplifiers 83(0), 83(0), and 83(4) are rendered on according to the zeroth and the first receiving nodes R0 and R1, to which respectively assigned are its zeroth and first output ports 87(0) and 87(1). Consequently, the further multiplexed wavelength groups λG(0) and λG(1) and the "further multiplexed" wavelength group λG(4) are combined in the zeroth and the first optical combiners 85(0) and 85(1) to be delivered to their zeroth and first output ports 87(0) and 87(1) as the secondary zeroth and first exchanged signals in which respectively combined are the further multiplexed wavelength group λG(0), λG(1), and λG(4) and the further multiplexed wavelength group λG(0) and λG(1).

With attention directed additionally to FIG. 25, the secondary zeroth and first exchanged signals are delivered to the zeroth and the first multiplexed optical signal receivers 173(0) and 173(0), respectively, and are demultiplexed by their wavelength demultiplexers respectively into a first plurality of the demultiplexed signals of the wavelengths λ0 to λ3 or the zeroth wavelength group λG(0), of the wavelengths λ4 to λ7 or the first wavelength group λG(1), and of the wavelengths λ16 to λ19 or the fourth wavelength group λG(4) and a second plurality of the demultiplexed signals of the wavelengths λ0 to λ3 or the zeroth wavelength group λG(0) and of the wavelengths λ4 to λ7 or the first wavelength group λG(1). In the zeroth multiplexed optical signal receiver 173(0), the demultiplexed signals of the zeroth, the first, and the fourth wavelength groups are stored, after converted to the reproductions of the zeroth, the first, and the fourth multiplexed electric signals, respectively in the zeroth, the first, and the fourth memory units 177(0), 177(1), and 177(4) (not shown) together with their destinations of the first, the zeroth, and again the zeroth receiving nodes R1, R0, and R0 as the zeroth, the first, and the fourth contents. The first multiplexed optical signals of the zeroth and the first wavelength groups are respectively stored, after conversion to the reproductions and together with their destinations of the first and the zeroth receiving nodes R1 and R0, in the zeroth and the first memory units 177(0) and 177(1) as the zeroth and the first contents.

As for the zeroth receiving node R0, the first contents of the zeroth and the first multiplexed optical signal receivers 173(0) and 173(0) need not the arbitration. However, the arbitration is necessary between the first and the fourth contents. According to results of the arbitration, the first and the fourth contents are delivered in succession to the zeroth receiving node R0. As for the first receiving node R1, no arbitration is necessary between the zeroth and the first multiplexed optical signal receivers 173(0) and 173(0) as regards their zeroth contents, which may therefore be delivered to the first receiving node R1 while being stored in their zeroth memory units 177(0) provided that the final destination precedes in each of the zeroth contents. In FIG. 26, the optical network is theoretically equivalent to four optical networks of the type described in conjunction with FIG. 16. As a consequence, this optical network is again an optical crossbar network in practice. That is to say, the optical network is completely nonblocking and is readily controlled because the transmission path therethrough of each multiplexed electric signal is unambiguously determined from any one of the transmitting nodes T to any selected one of the receiving nodes R. Despite similar in structure to the optical network of FIG. 16 as regards its exchange facility, the optical network of FIG. 26 has an exchange capacity which is four times as great as that of the optical network of FIG. 16. In addition, the optical network being illustrated is an output buffered one like the optical network of FIG. 4 and is capable of achieving the throughput which is beyond the theoretical restriction of an input buffered optical exchange network in which it is necessary to keep the multiplexed electric signal or signals buffered on the side of the transmitting nodes T depending on the circumstances.

In the optical network being illustrated, the primary optical crossbar exchange parts 97(0) to 97(3) are substituted for the splitter/multiplexers 123(0) to 123(2) used in the optical network of FIG. 24. In contrast to an optical power loss of at least 6 dB in each optical splitter 127 of each splitter/multiplexer 123 of FIG. 8, it is possible by the use of the primary exchange parts 97(0) to 97(3) to make each optical amplifier 83 have a gain. This provides a technical advantage of giving a large margin to optical power to each receiver input signal for the optical receivers 91 used in the multiplexed optical signal receivers 173.

In contrast to the splitter/multiplexer 123 which produces its output signal with all the sixteen wavelengths of the zeroth to the third wavelength groups, each primary exchanged signal of the primary exchange parts 97(0) to 97(3) is of only necessary wavelength group or groups and prevents the optical amplifiers 83 from being saturated in the secondary exchange parts 75(0) to 75(3).

In contrast to the sequential order which is necessary in FIG. 19 for due operation of the wavelength group demultiplexer 161, it is unnecessary for the optical network of FIG. 26 that the sixty-four wavelengths should be arranged in a sequential order because the wavelengths may be arranged in any order for the wavelength demultiplexer 175 used in FIG. 25 in place of the wavelength group demultiplexer 161. As for the semiconductor optical amplifiers 83 necessary in the optical network, the number is equal to sixty-four in the primary exchange parts 97(0) to 97(3) and also sixty-four in the secondary exchange parts 75(0) to 75(3) and equal in total to one hundred and twenty-eight. This total is only a half of two hundred and fifty-six which total is indispensable when a sixteen by sixteen optical exchange network is implemented with the structure of FIG. 4.

Figure 27:
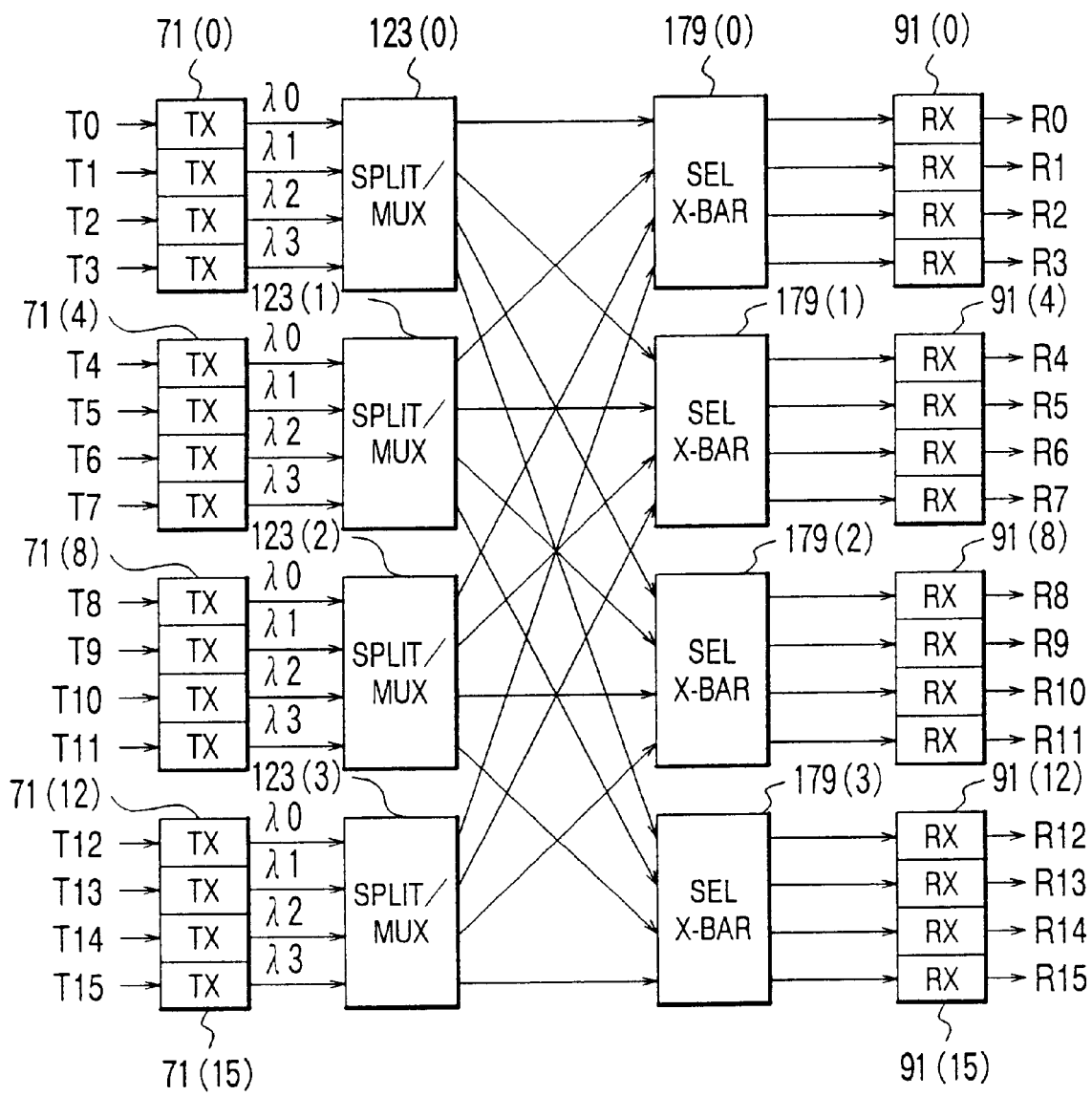

Referring now to FIG. 27, the description will proceed to an optical network according to a tenth preferred embodiment of this invention. In FIG. 27, each of the primary first and second predetermined integers P and Q is equal to four. The secondary first and second integers U and V are equal respectively to four and one. The ternary predetermined integer S is equal to one.

Like in FIG. 8, the optical network is for use between the zeroth to the fifteenth transmitting nodes T0 to T15 for producing the zeroth to the fifteenth transmission signals, respectively, and the zeroth to the fifteenth receiving nodes R0 to R15 for respectively receiving the zeroth to the fifteenth reception signals into which the zeroth to the fifteenth transmission signals are selectively exchanged. The optical network comprises the zeroth to the fifteenth optical transmitters (TX) 71(0) to 71(15), the zeroth to the third splitter/multiplexers 123(0) to 123(2), zeroth to third wavelength selecting crossbar exchange parts (SEL X-BAR) 179(0) to 179(3) or 179, and the zeroth to the fifteenth optical receivers 91(0) to 91(15).

Figure 28:
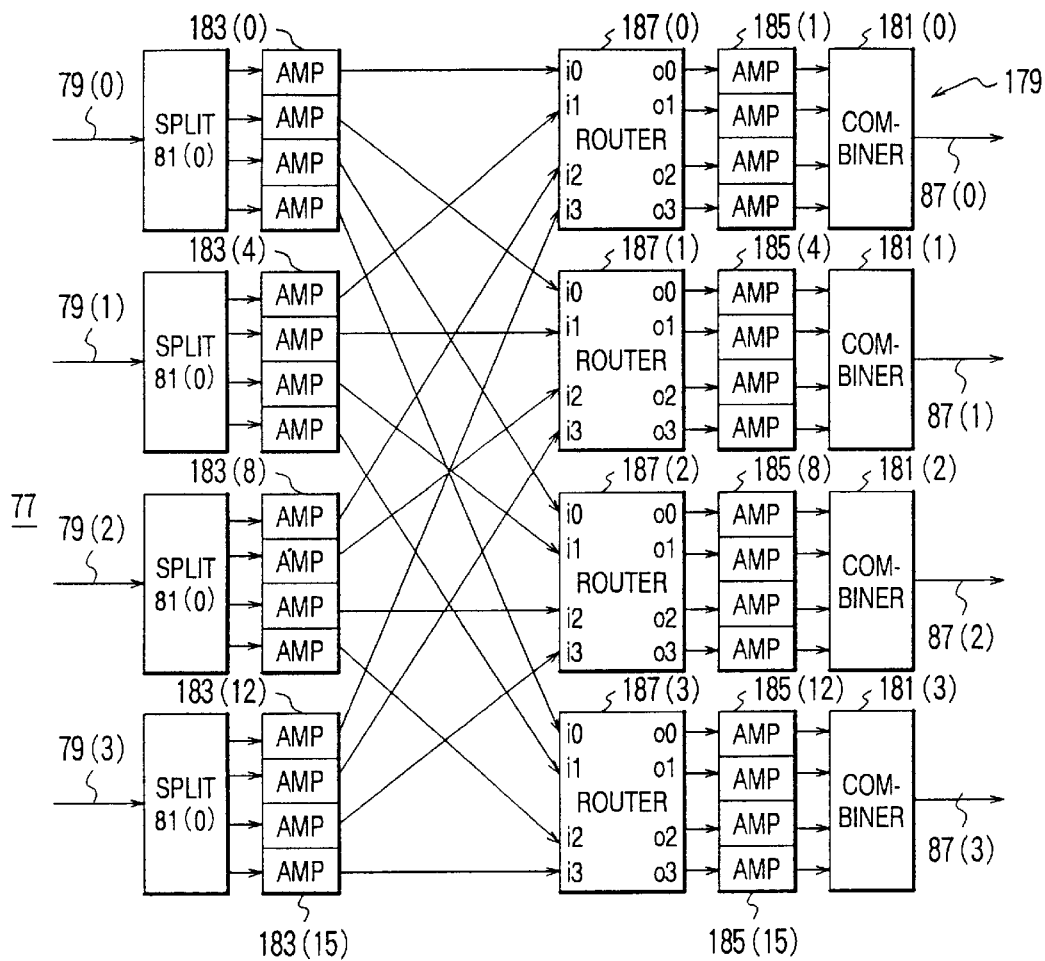
FIG. 28 is a block diagram of a wavelength selective optical crossbar exchange for use in the optical network illustrated in FIG. 27.

Turning to FIG. 28 during a short while, each wavelength selecting crossbar exchange part 179 comprise a semiconductor substrate which may again be the semiconductor substrate 77 and on which formed are, like in FIGS. 3 and 5, the zeroth to the third input ports 79(0) to 79(3), the zeroth to the third optical splitters 81(0) to 81(3) connected respectively to the zeroth to the third input ports 79, and the zeroth to the third output ports 87(0) to 87(3). Instead of the optical combiners 85 and the wavelength multiplexers 99, zeroth to third optical combiners 181(0) to 181(3) or 181 are connected respectively to the zeroth to the third output ports 87. Each optical combiner 181 is a little different from the wavelength multiplexer 99 or 143 described in conjunction with FIG. 10 in the manner which will presently be described.

Connected in FIG. 28 respectively to the zeroth to the third optical splitters 81 are zeroth to third, fourth to seventh, eighth to eleventh, and twelfth to fifteenth input semiconductor amplifiers 183(0) to 183(2), 183(4) to 183(7), 183(8) to 183(11), and 183(12) to 183(15) or 183 which are not different from the semiconductor optical amplifiers 83 used in FIGS. 3 and 5 and will hereafter be referred to simply as input amplifiers 183. Connected respectively to the zeroth to the third optical combiners 181 are zeroth to third, fourth to seventh, eighth to eleventh, and twelfth to fifteenth output (semiconductor optical) amplifiers 185(0) to 185(3), 185(4) to 185(7), 185(8) to 185(11), and 185(12) to 185(15) or 185 which are not different from the semiconductor optical amplifiers 141 used in FIG. 10. A combination of such four output amplifiers 185 and the optical combiner 181 connected thereto is therefore operable as one of the optical selectors 135 of FIG. 10 that lacks the wavelength demultiplexer 139.

Between the input and the output amplifiers 183 and 185 used in FIG. 28 are zeroth to third wavelength routers 187(0) to 187(3) or 187, each of which is of the arrayed waveguide grating type, is operable as each optical combiner 85 and the wavelength demultiplexer 139 described in connection with FIGS. 3 and 10, respectively, and consequently has zeroth to third input ports 10 to 13 and zeroth to third output ports o0 to o3. Such input ports of the zeroth to the third wavelength routers 187 are crosswise connected to the zeroth to the fifteenth input amplifiers 183 through intermediate waveguides which are similar to those used in FIGS. 3 and 5. The zeroth to the third wavelength routers 187 are connected at their output ports to the zeroth to the fifteenth output amplifiers 185.

Figure 29:
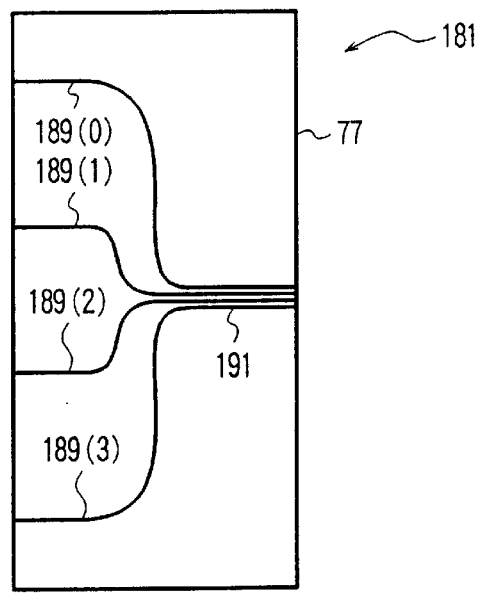
FIG. 29 is a schematic diagram of an optical combiner for use in the optical crossbar exchange depicted in FIG. 28.

Further turning to FIG. 29 with FIG. 28 continuously referred to, the optical combiner 181 comprises the semiconductor substrate 77 on which formed are zeroth to third single-mode input waveguides 189(0) to 189(3) or 189 connected respectively to the zeroth to the third output ports o0 to o3 of one of the zeroth to the third wavelength routers 187 through output amplifiers 185 and zeroth to third multimode output waveguide 191 which are connected to the zeroth to the third input waveguides 189 and as a bundle to a pertinent one of the output ports 87 of the wavelength selecting crossbar exchange part 179. In contrast to the wavelength multiplexer 143 used in FIG. 10 and supplied with optical inputs of definite wavelengths to produce an optical output in which the definite wavelengths are multiplexed, the optical combiner 181 has no wavelength selectivity and is supplied with optical inputs of case-dependent wavelengths to supply the output port 87 in question with an optical output of a combination of the case-dependent wavelengths, which may vary at times depending on the circumstances.

Reviewing FIGS. 27 to 29, it is understood that a combination of each optical combiner 181 and four of the output amplifiers 185 connected thereto serves as an optical selector which is similar to the optical selector 135 illustrated with reference to FIG. 10 except for the wavelength demultiplexer 139. Each wavelength router 187 is operable more particularly as follows. When supplied at each of the input ports i0 to i3 with a port input of, for example, the wavelengths $\lambda 0$ to $\lambda 3$, the wavelength router 187 produces, at the output ports o0 to o3, port outputs which have output wavelengths cyclically rearranged as indicated in the following Table 1 according as the port input is delivered to which of the input ports i0 to i3.

TABLE 1

|  | Output Wavelength | | | |
| --- | --- | --- | --- | --- |
|  | o0 | o1 | o2 | o3 |
| Input | | | | |
| i0 | $\lambda 0$ | $\lambda 1$ | $\lambda 2$ | $\lambda 3$ |
| i1 | $\lambda 1$ | $\lambda 2$ | $\lambda 3$ | $\lambda 0$ |
| i2 | $\lambda 2$ | $\lambda 3$ | $\lambda 0$ | $\lambda 1$ |
| i3 | $\lambda 3$ | $\lambda 0$ | $\lambda 1$ | $\lambda 2$ |

More particularly, it will be assumed in Table 1 that the port input is supplied to the zeroth input port i0 with the wavelengths $\lambda 0$ to $\lambda 3$. In this case, the wavelength router 187 produces a zeroth port output at the zeroth output port o0 with the wavelength of $\lambda 0$. When supplied with the port input of the wavelengths $\lambda 0$ to $\lambda 3$ at the first input port i1, the wavelength router 187 produces a first port output at the zeroth output port o0 with the wavelength $\lambda 1$ as a cyclically changed wavelength.

In FIG. 27, the optical network has various technical merits. It may be pointed out in the optical network of FIGS. 3 and 8 in principle that each optical combiner 85 of each of the secondary exchange parts 75(0) to 75(3) introduces an optical power loss of 3 dB on combining two optical signals into one. The loss is therefore equal at least to 6 dB in a signal combination of four to one. In contrast, each wavelength router 187 give rise to theoretically no loss in its equivalent component of the optical combiner 85 described before. Therefore, a total power loss amounts at most to 2 dB in the optical network of FIG. 27 even though losses may be included which inevitably arise in the waveguide themselves and their coupling. It may be temporarily surmised in each optical combiner 181 that the output waveguides 191 were single-mode waveguides. In this event, an optical power loss of 3 dB would theoretically be unavoidable in each two-to-one signal combination and consequently the loss of at most 6 dB in a four-to-one combination. In contrast, the multimode waveguides 191 do not introduce a combination loss in theory. When the losses in the waveguides themselves and their coupling are taken into account, an optical power loss in the wavelength combiners 181 is at most 1 dB and is substantially equal to that of the wavelength multiplexers 143 which are of the type described in connection with FIG. 10 and are used in the optical selectors 135 of FIG. 8. Furthermore, it is possible with each optical combiner 181 of no wavelength selectivity to combine with no problem the optical inputs delivered to one of its input ports with wavelengths which may vary from case to case.

It is now clearly understood that each wavelength selecting crossbar exchange part 179 is operable as a mixture, in FIG. 8, of one of the secondary exchange parts 75(0) to 75(3) and four of the optical selectors 135 connected thereto. This avoids an optical power loss of at least 6 dB inevitable in the optical combiners 85 of FIG. 3 and makes it possible to provide in FIG. 27 a sufficient optical power to each receiver input signal of the optical receivers 91 even when the optical network is of a large scale. In other respects, the optical network of FIG. 27 is operable in complete equivalent to that of FIG. 8.

Figure 30:
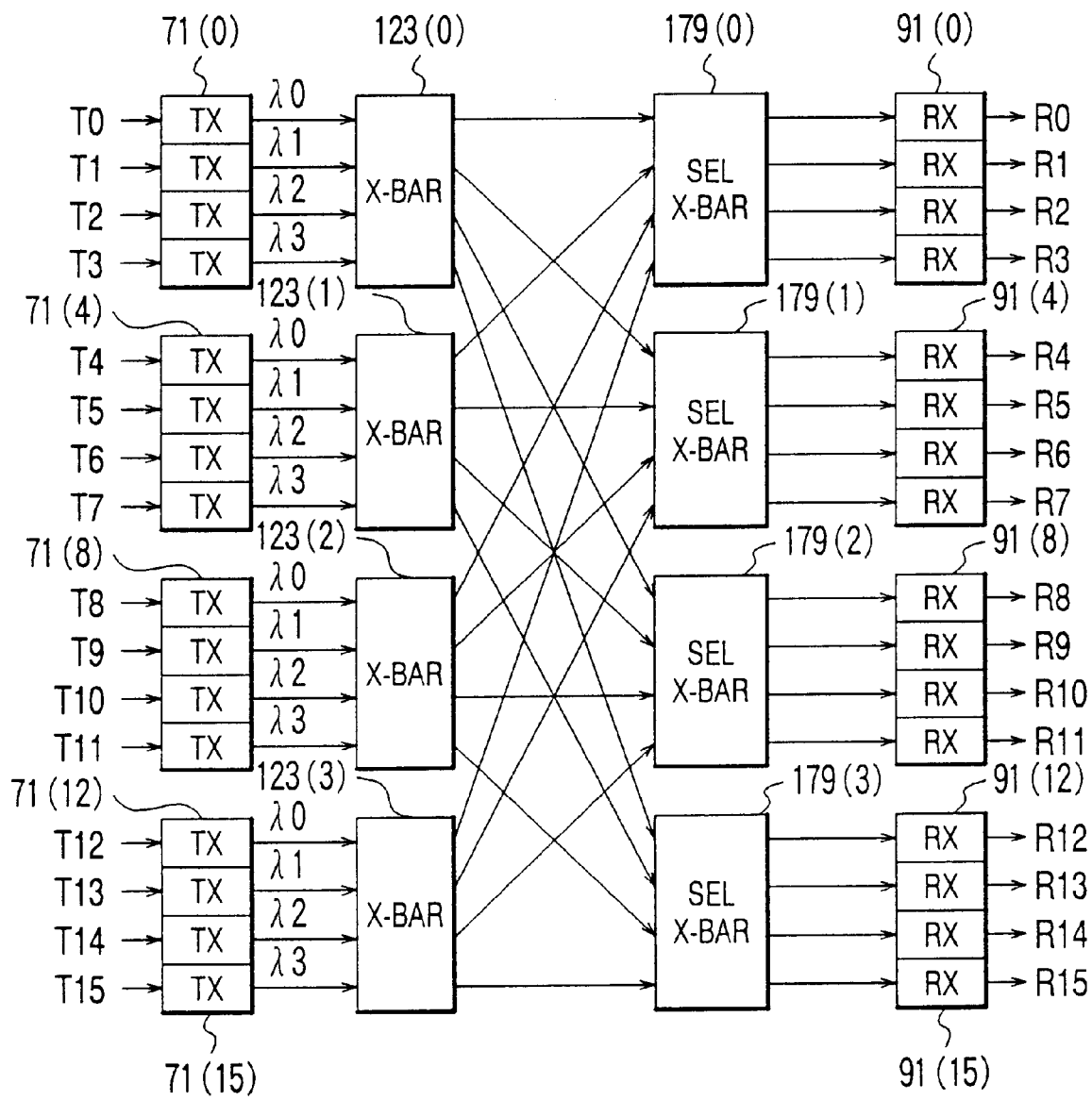
FIGS. 30 and 31 are block diagrams of optical networks according to eleventh and twelfth embodiments of this invention, respectively.

Referring to FIG. 30, an optical network is according to an eleventh preferred embodiment of this invention. Herein, each of the primary first and second predetermined integer P and Q is equal to four. In this optical network, the primary exchange parts 97(0) to 97(3) are substituted for the splitter/multiplexers 123(0) to 123(2) used in the optical network of FIG. 27. In other words, the wavelength selecting crossbar exchange parts 179(0) to 179(3) are used in the optical network of FIG. 13 in place of the secondary exchange parts 75(0) to 75(3). As a consequence, it is possible with the optical network of FIG. 30 to get rid of the optical power loss which is unavoidable in the network of FIG. 13 and amounts to at least 6 dB. This again makes it possible to provide in FIG. 30 a sufficient optical power to each receiver input signal of the optical receivers 91 however great a scale the optical network may have.

Figure 31:
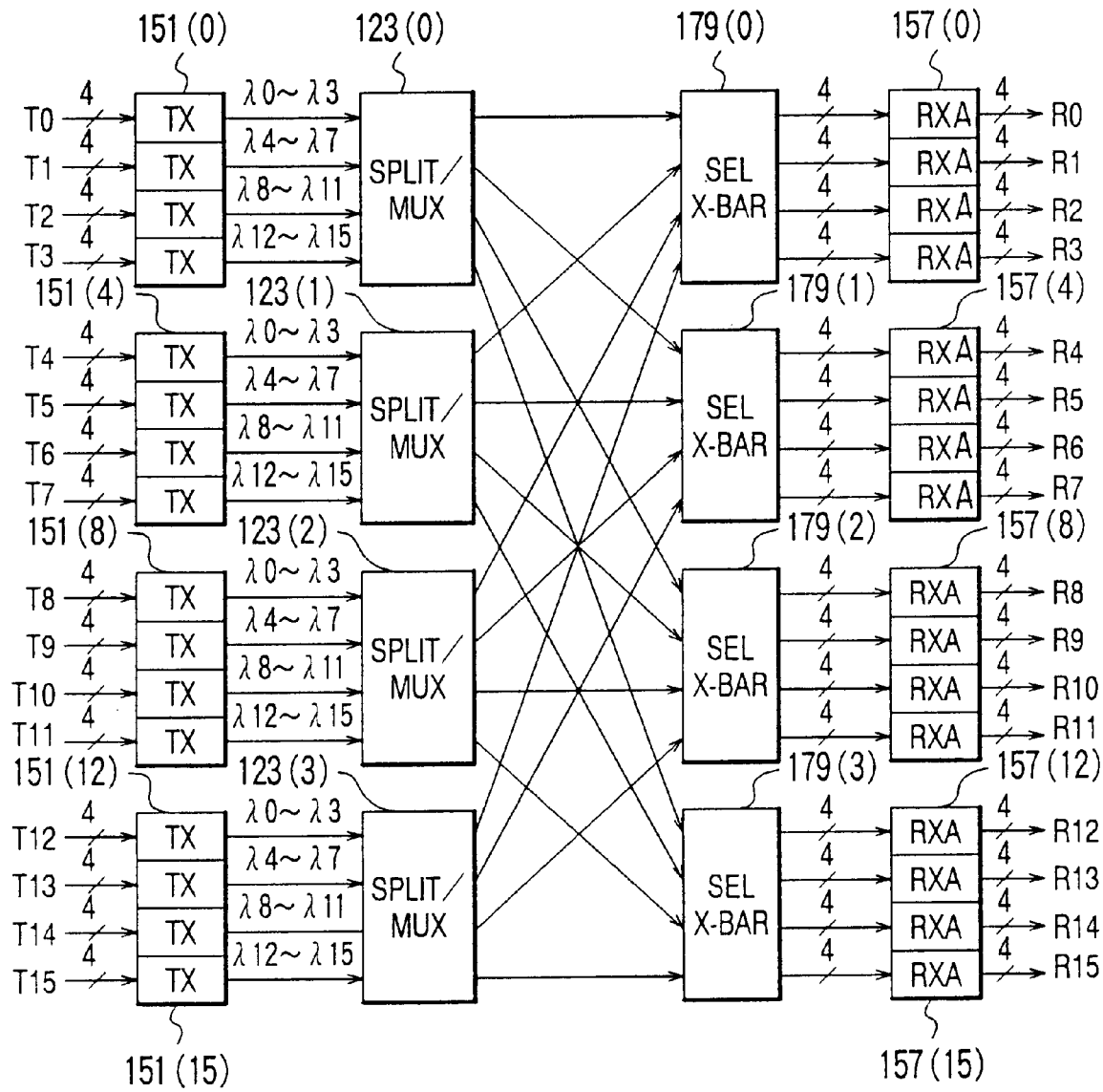

Referring to FIG. 31, an optical network is according to a twelfth preferred embodiment of this invention. For this optical network, each of the primary first and second predetermined integers P and Q is equal to four. Each of the secondary first and second predetermined integers U and V is equal also to four. The sixteen wavelengths $\lambda 0$ to $\lambda 15$ are grouped into the zeroth to the third wavelength groups $\lambda G(0)$ to $\lambda G(3)$. The ternary predetermined integer S is equal to four.

Figure 32:
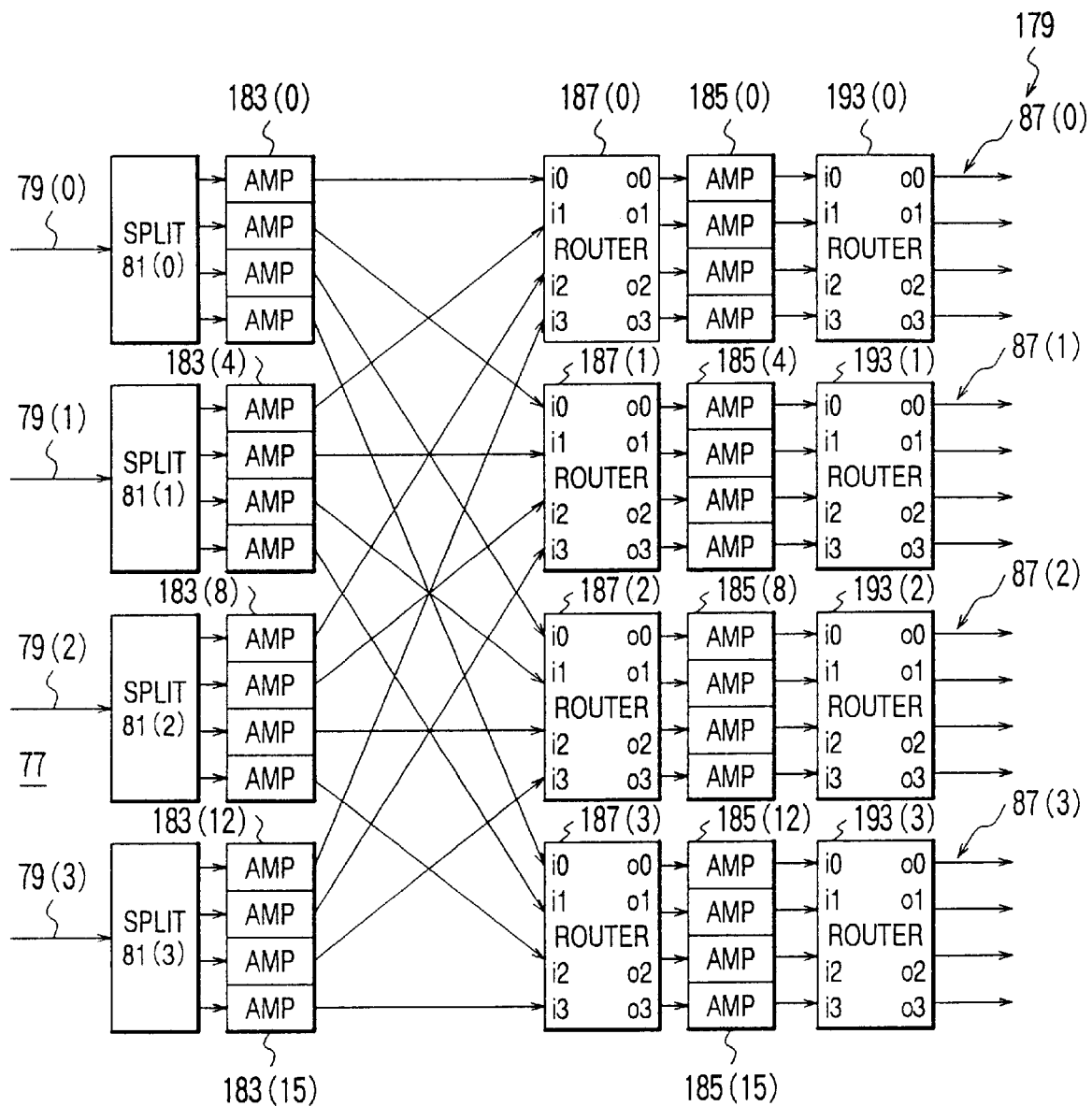
FIG. 32 is a block diagram of another wavelength selective optical crossbar exchange for use in the optical network illustrated in FIG. 31.

Turning to FIG. 32 for a short while, it should first be noted that the optical network of FIG. 31 is similar in structure and operation to that illustrated with reference to FIG. 17. In this optical network, the wavelength selecting crossbar exchange parts 179 are operable as four combinations of the primary exchange parts 75(0) to 75(3) and the first to the fifteen router-selectors 155. In FIG. 32, each wavelength selecting crossbar exchange part 179 is, however, a little different from that described with reference to FIG. 28 although so referred to. More particularly, each exchange input signal is delivered, like in FIG. 17, to one of the input ports 79(0) to 79(3) as a wavelength group combined signal of the zeroth to the third wavelength groups λG. The wavelength routers 187 will now be referred to as primary routers 187. Instead of the optical combiners 181, used are secondary zeroth to third wavelength routers or secondary routers 193(0) to 193(2) or 193, each having zeroth to third input ports and zeroth to third output ports which will be indicated by the reference symbols i0 to i3 and o0 to o3 used also for each primary router 187. The input ports of the secondary routers 193 are connected to the first to the fifteenth output amplifiers 185. The output ports of each secondary router 193 are connected respectively to four component ports of one of the output ports 87(0) to 87(3).

In FIG. 32, each primary router 187 is arrayed waveguide grating type and is operable as follows. Inasmuch as supplied now with the port input of a combination of the wavelength groups λG at the zeroth to the third input ports as a primary port input, the primary router 187 produces at its output ports o0 to o3 primary port outputs which have the output wavelength groups cyclically rearranged as indicated in the following Table 2 according as which of the input ports i0 to i3 is supplied with the port input.

TABLE 2

| | Output Wavelength Group | | | |
|---|---|---|---|---|
| | o0 | o1 | o2 | o3 |
| Input | | | | |
| i0 | λ G(0) | λ G(1) | λ G(2) | λ G(3) |
| i1 | λ G(1) | λ G(2) | λ G(3) | λ G(0) |
| i2 | λ G(2) | λ G(3) | λ G(0) | λ G(1) |
| i3 | λ G(3) | λ G(0) | λ G(1) | λ G(2) |

More specifically, it will be assumed in Table 2 that the primary port input is delivered to the zeroth input port i0 with the wavelength groups λG(0) to λG(3). In this event, the primary router 187 produces at the zeroth output port o0 a primary zeroth port output of the wavelength group λG(0). When supplied with the primary port input of the wavelength groups λG(0) to λG(3) at the first input port i1, the primary router 187 produces at the zeroth output port o0 a primary first port output of the wavelength group λG(1), which is a cyclically rearranged wavelength group.

Each secondary router 193 is again of the arrayed waveguide grating type and is operable as follows. It should be noted in connection with the secondary routers 193 that the primary routers 187 deliver their primary port outputs of the rearranged wavelength groups through some conducting amplifiers 185(c) of the output amplifiers 185 to corresponding ones of the input ports of the secondary routers 193 that are connected to the conducting amplifiers 185(c). A combination of each secondary router 193 and four of the output amplifiers 185 connected thereto is operable as the router-selector 155 which is described in conjunction with FIG. 19 and does not include the wavelength group demultiplexer 161. Consequently, the secondary router 193 is operable without necessity of a sequential wavelength order to route the wavelength groups λG(0) to λG(3) to its output ports o0 to o3 with the routed group λrG. In this manner, each secondary router 193 routes a secondary port input supplied to each of the input ports i0 to i3 with the cyclically rearranged wavelength group to its output ports o0 to o3 as secondary port outputs with the routed groups λrG(0) to λrG(3) as indicated in the following Table 3.

TABLE 3

| | Output Wavelength Group | | | |
|---|---|---|---|---|
| | o0 | o1 | o2 | o3 |
| Input | | | | |
| i0 | λ rG(0) | λ rG(1) | λ rG(2) | λ rG(3) |
| i1 | λ rG(1) | λ rG(2) | λ rG(3) | λ rG(0) |
| i2 | λ rG(2) | λ rG(3) | λ rG(0) | λ rG(1) |
| i3 | λ rG(3) | λ rG(0) | λ rG(1) | λ rG(2) |

It is shown in Table 3 that each secondary router 193 produces the secondary port outputs at the output ports o0 to o3, respectively, with the routed groups λrG when a specific input port i(s) of the input ports i0 to i3 is supplied with the secondary port input of whichever of the cyclically rearranged wavelength groups. For example, it will be assumed that the zeroth input port i0 is used as the specific input port i(s) and supplied with the secondary port input of wavelength group λG(0). In this event, the secondary router 193 produces at its outputs o0 to o3 the secondary port outputs of the wavelength λ0, λ1, λ2, and λ3, respectively.

In the manner described with reference to FIGS. 31 and 32, an additive optical power loss of at most 4 dB results from each of the primary routers 187 and one of the secondary routers 193 that is supplied with the primary port output as the secondary port input through one of the conducting amplifiers 185(c). This optical power loss is clearly less than the optical power loss which amounts to at least 6 dB and is inevitable in each optical combiner 85 of the secondary exchange parts 75(0) to 75(3) used in FIG. 17. It is therefore possible with the optical network of FIGS. 31 and 32 to avoid the power loss of at most 6 dB and to give a sufficient optical power, even when this optical network has a large scale, to the receiver input signal of each of the optical receivers 91 which are used in the optical receiver arrays 157 depicted in FIG. 22. In other respects, the optical network is operable like that illustrated with reference to FIG. 17.

Figure 33:
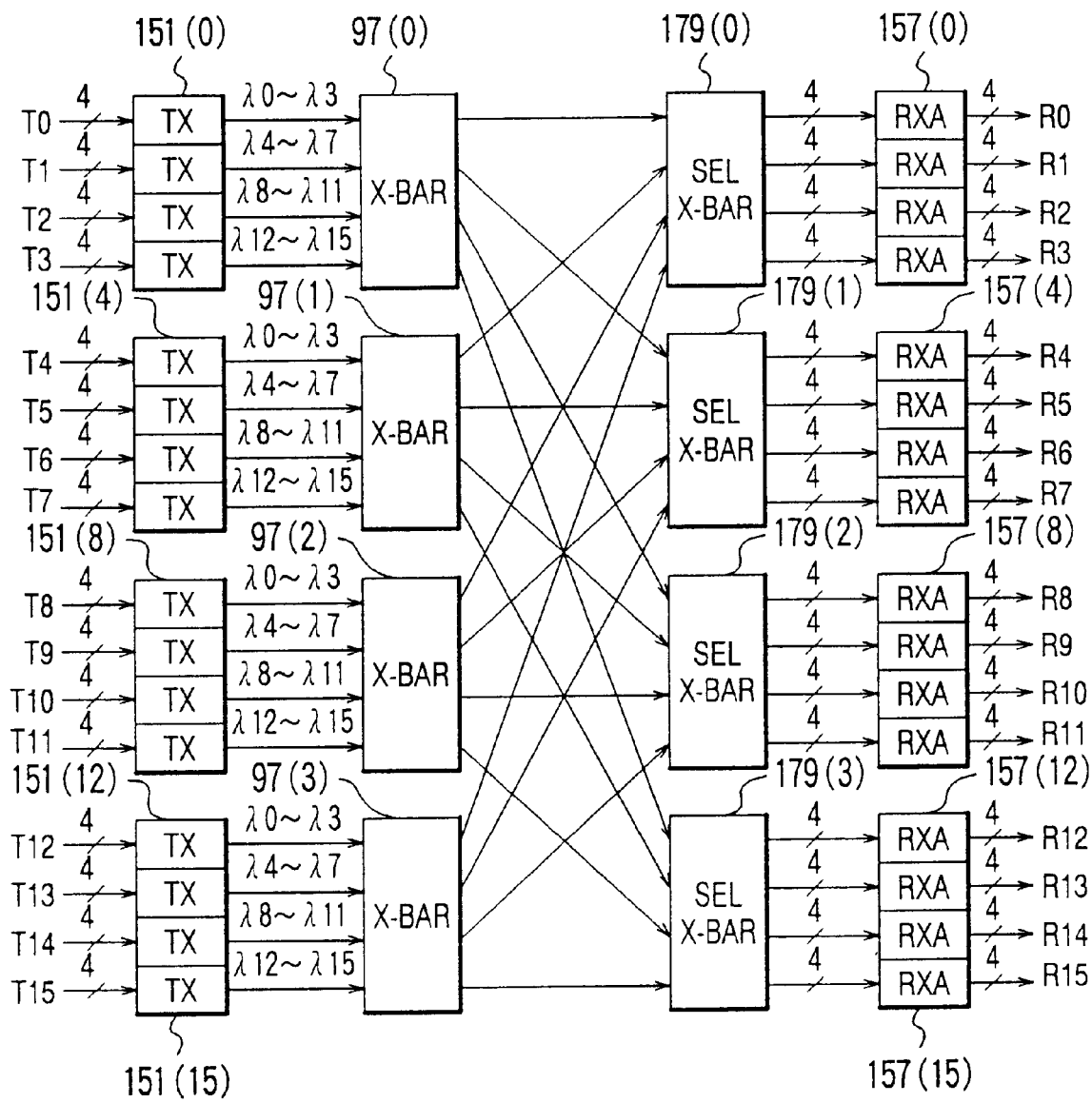
FIGS. 33 and 34 are block diagrams of optical networks according to thirteenth and fourteenth embodiments of this invention, respectively.

Referring to FIG. 33, an optical network is according to a thirteenth preferred embodiment of this invention. Like in the optical network of FIG. 23, each of the primary first and second integers P and Q is equal to four. Each of the secondary first and second integers U and V is equal to four. The ternary predetermined integer S is equal to four. This optical network is similar in structure and operation to a mixture of those described with reference to FIGS. 23 and 31. In other words, the zeroth to the fifteenth multiplexed optical transmitters 151 are used. The so-called wavelength selecting crossbar exchange parts 179 of the structure of FIG. 32 are used.

It should be noted in FIG. 33 that each wavelength selecting crossbar exchange part 179 is substituted for a combination, used in FIG. 23, of each of the secondary exchange parts 75(0) to 75(3) and four of the router-selectors selector 155 that are connected to this each of the secondary exchange parts 75(0) to 75(3). It is therefore possible to avoid the optical power loss of at least 6 dB inevitable in the optical combiner 85 used in each of the secondary exchange parts 75(0) to 75(3) and to give a sufficient optical power to the receiver input signal of each optical receiver 91 used in the optical receiver array 157. In other respects, the optical network of FIG. 33 is operable like that described with reference to FIG. 23.

Figure 34:
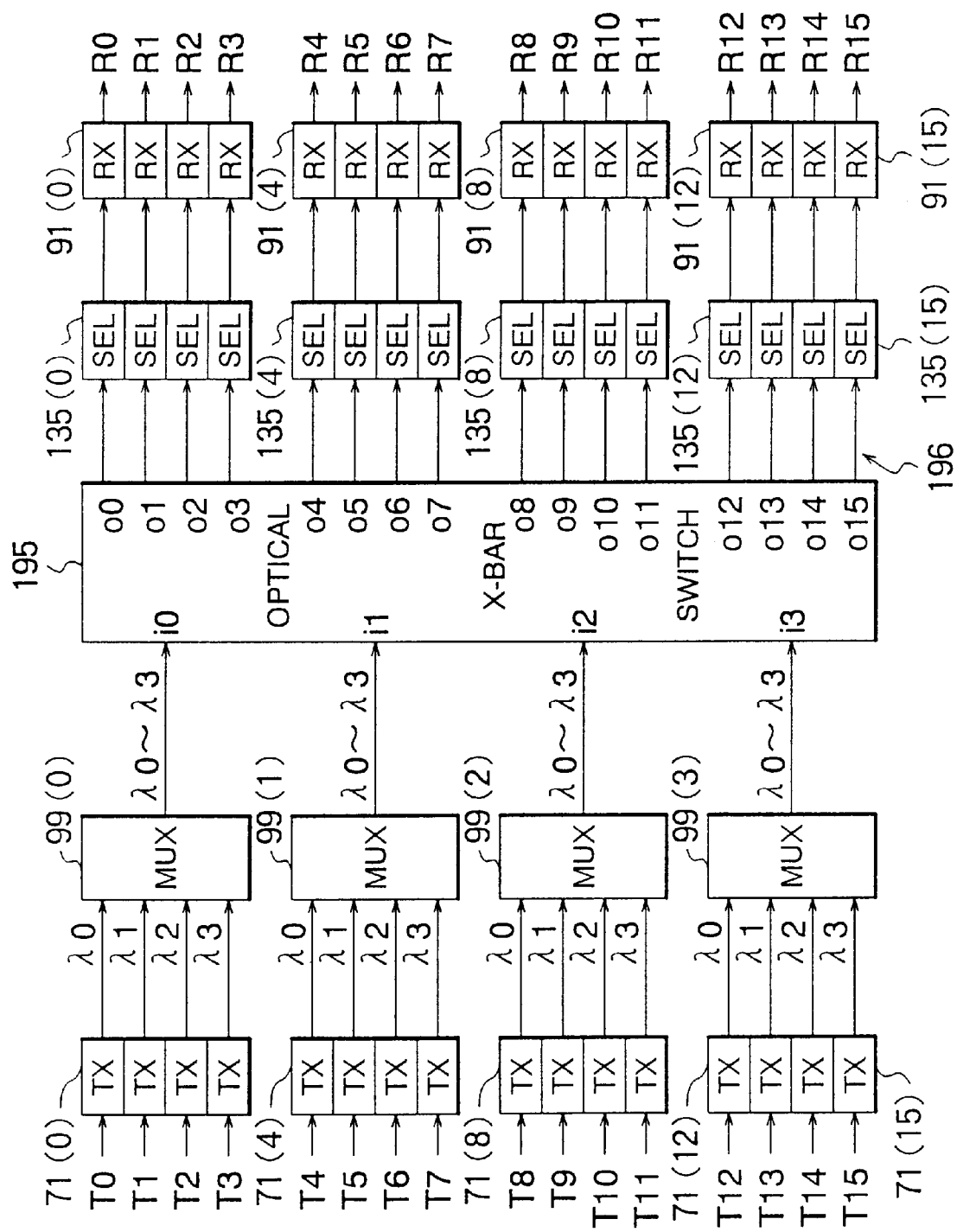

Referring now to FIG. 34, the description will proceed to an optical network according to a fourteenth preferred embodiment of this invention. This optical network is similar to that illustrated with reference to FIG. 8. Each of the primary first and second predetermined integers P and Q is equal to four. The secondary predetermined integer M is also equal to four. The ternary predetermined integer S is equal to one.

In FIG. 34, the input connections 73 (FIG. 4 and other drawing figures) consist of the zeroth to the third wavelength demultiplexers 99(0) to 99(3) or 99 which are described in conjunction with FIG. 6 and have the input waveguides 101, sixteen in total, connected respectively to the zeroth to the fifteenth optical transmitters 71 and zeroth to third output waveguides which may be designated by 109(0) to 109(3). In the manner which will presently be described, a ternary optical crossbar exchange (X-BAR SWITCH) 195 has zeroth to third input ports i0 to i3 or i connected respectively to the zeroth to the third output waveguides 109 and zeroth to fifteenth output ports o0 to o15 or 196. Like in FIG. 8, the zeroth to the fifteenth optical selectors 135 are used and are connected respectively to the output ports 196. Furthermore, the zeroth to the fifteenth optical receivers 91 are connected respectively to the zeroth to the fifteenth optical selectors 135.

Figure 35:
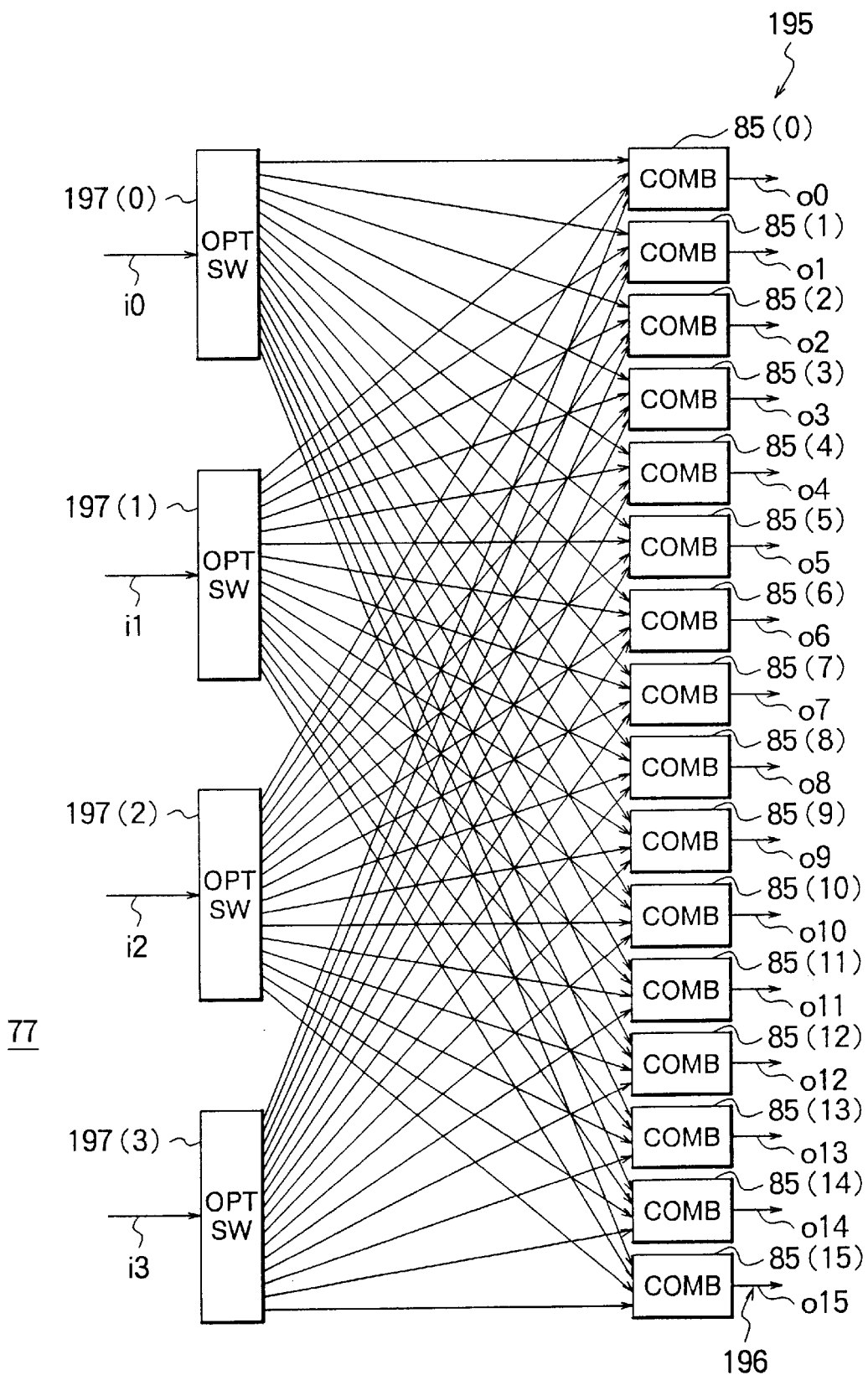
FIG. 35 is a block diagram of a different optical crossbar exchange for use in the optical network illustrated in FIG. 34.

Turning to FIG. 35 during a short while, the ternary crossbar exchange 195 comprises a semiconductor substrate which is designated by the reference numeral 77 and on which formed are the zeroth to the third input ports or waveguides i0 to i3 and zeroth to third optical switches (OPT SW) 197(0) to 197(3) or 197, each having an input connected to one of the input ports i0 to i3 and sixteen outputs as will be illustrated in the following. Such sixteen outputs of each optical switch 197 are connected to each of four inputs which each of zeroth to fifteenth optical combiners 85(0) to 85(15) or 85 has. These optical combiners 85 are not different from the optical combiners 85 described in connection with FIG. 3 except for the number of inputs of each optical combiner 85 and are connected respectively to the zeroth to the fifteenth output ports 196.

Figure 36:
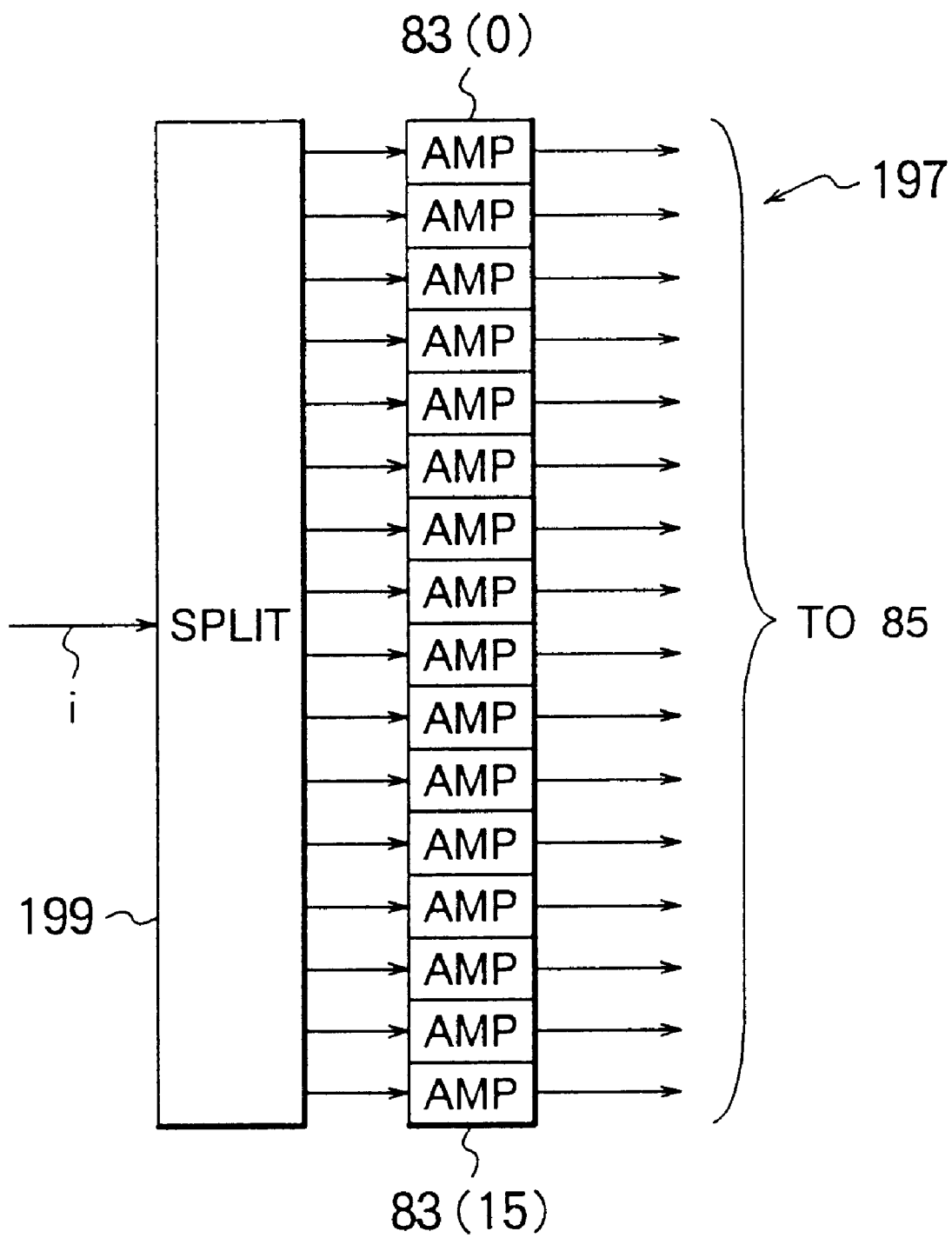
FIG. 36 is a block diagram of an optical switch used in the different optical crossbar exchange depicted in FIG. 35.

Further turning to FIG. 36 with FIGS. 34 and 35 additionally referred to, each optical switch 197 comprises an optical splitter (SPLIT) 199 which is similar to the optical splitter 81 of FIG. 3. This optical splitter 199 is supplied with an optical splitter input through one of the input ports i0 to i3 that is now indicated by the reference letter i. Its sixteen split optical outputs are supplied respectively to zeroth to fifteenth semiconductor optical amplifiers which are designated by the reference numerals 83(0) to 83(15) or 83 connected as depicted in FIG. 35 to each of the optical combiners 85. When one alone of the semiconductor optical amplifiers 83 of the ternary exchange 195 is rendered on, an exchange input signal of a pertinent one of the zeroth to the third input ports i0 to i3 is exchanged into an exchanged signal delivered to one of the zeroth to the fifteenth output ports 196 that is connected to this one alone of the optical amplifiers 83 through one of the optical combiners 85 as a selected output port. When a plurality of the optical amplifiers 83 are rendered on, the ternary exchange 195 exchanges some exchange input signals supplied to one or more of the input ports i0 to i3 connected thereto through one or more of the optical splitters, such as 199, into exchanged signals produced at one or more of the output ports 196 that is or are connected to the optical amplifiers 83 under consideration as similar selected output port or ports through one or more of the optical combiners 85.

In this manner in FIGS. 34 to 36, the ternary optical crossbar exchange 195 is capable of exchanging the exchange input signals into a single exchanged signal produced at the selected output port connected to one of the optical combiners 85 that is connected to the optical amplifiers 83 connected to different ones of the input ports i0 to i3 through pertinent ones of the optical splitters 199 and selectively switched on. The ternary exchange 195 is furthermore capable of exchanging an exchange input signal to a plurality of exchanged signals produced concurrently at the selected output ports with this exchange input signal supplied to an arbitrary one of the input ports i0 to i3 provided that switched selectively on are some of the optical amplifiers 83 that are connected to the selected output ports through interposed ones of the optical combiners 85 and to the input port i in question through an intervening one of the optical splitters 199. In each exchanged signal, combined are the wavelengths which the optical signals respectively have and are multiplexed in each exchange input signal.

It will be assumed in FIGS. 34 to 36 as before that the zeroth and the first transmitting nodes T0 and T1 are simultaneously transmitting zeroth and first electric transmission signals with their final destinations set respectively at the first and the zeroth receiving nodes R1 and R0. The optical transmitters 71 are grouped into primary to quaternary transmitter groups, each consisting of four optical transmitters 71(0) to 71(3), 71(4) to 71(7), 71(8) to 71(11), or 71(12) to 71(15) and assigned with zeroth to third wavelengths $\lambda 0$ to $\lambda 3$. Supplied from the zeroth transmitting node T0 with the zeroth transmission signal, the zeroth optical transmitter 71(0) delivers a zeroth optical signal to the zeroth wavelength multiplexer 99(0) with the zeroth wavelength $\lambda 0$ as indicated by a legend. Responsive to the first transmission signal delivered from the first transmitting node T1, the first optical transmitter 71(0) supplies also the zeroth wavelength multiplexer 99(0) with a first optical signal of the first wavelength $\lambda 1$ as indicated by another legend. The zeroth wavelength multiplexer 99(0) supplies the ternary optical crossbar exchange 195 at its zeroth input port i0 with a zeroth exchange input signal in which the zeroth and the first wavelengths are multiplexed. In the ternary exchange 195, switched on according to intermediate destinations of the first and the zeroth output ports o1 and o0 are the zeroth and the first optical amplifiers 83(0) and o0 connected to the zeroth input port i0 through the zeroth optical switch 197 and to the zeroth and the first output ports o0 and o1 respectively through the zeroth and the first optical combiners 85(0) and 85(1). Consequently, the ternary exchange 195 supplies the zeroth and the first optical selectors 135(0) and 135(1) respectively with zeroth and first exchanged signals in which "combined" are only the first wavelength alone and the zeroth wavelength alone in compliance with the intermediate destination and which are delivered respectively to the zeroth and the first optical selectors 135(0) and 135(1). Supplied with the zeroth exchanged signal, in which the zeroth optical signal of the first wavelength may be combined with like optical signals, the zeroth optical selector 135(0) supplies the zeroth optical receiver 91(0) with a zeroth receiver input signal of the first wavelength which is selected from the zeroth to the third wavelengths by the first optical amplifier 141(0) rendered on according to the final destination. Similarly selecting the zeroth wavelength among the zeroth to the third wavelengths by the zeroth optical amplifier 141(0) switched on according to the final destination which is the zeroth receiving node R0, the first optical selector 135(1) supplies the first optical receiver 91(0) with a first receiver input signal of the zeroth wavelength. As a result, the zeroth and the first receiving nodes R0 and R1 are respectively supplied with zeroth and first electric reception signals which are respectively derived from the first and the zeroth transmission signals transmitted as the first and the zeroth optical signals on the first and the zeroth wavelengths.

It is possible with the optical network of FIG. 34 to carry out multicast. For example, the zeroth and the first optical amplifiers 83(0) and 83(0) of the zeroth optical switch 197(0) are switched on together with the zeroth optical amplifiers 141(0) of the zeroth and the first optical selectors 135(0) and 135(1). This enables the multicast of the zeroth transmission signal concurrently to the zeroth and the first receiving modes R0 and R1.

In FIGS. 34 to 36, the optical network is theoretically an optical crossbar network. In other words, this optical network is of a completely nonblocking type and is readily controlled because each transmission route of an electric transmission signal is uniquely determined from an arbitrary one of the transmitting nodes T to a selected one of the receiving nodes R.

Figure 37:
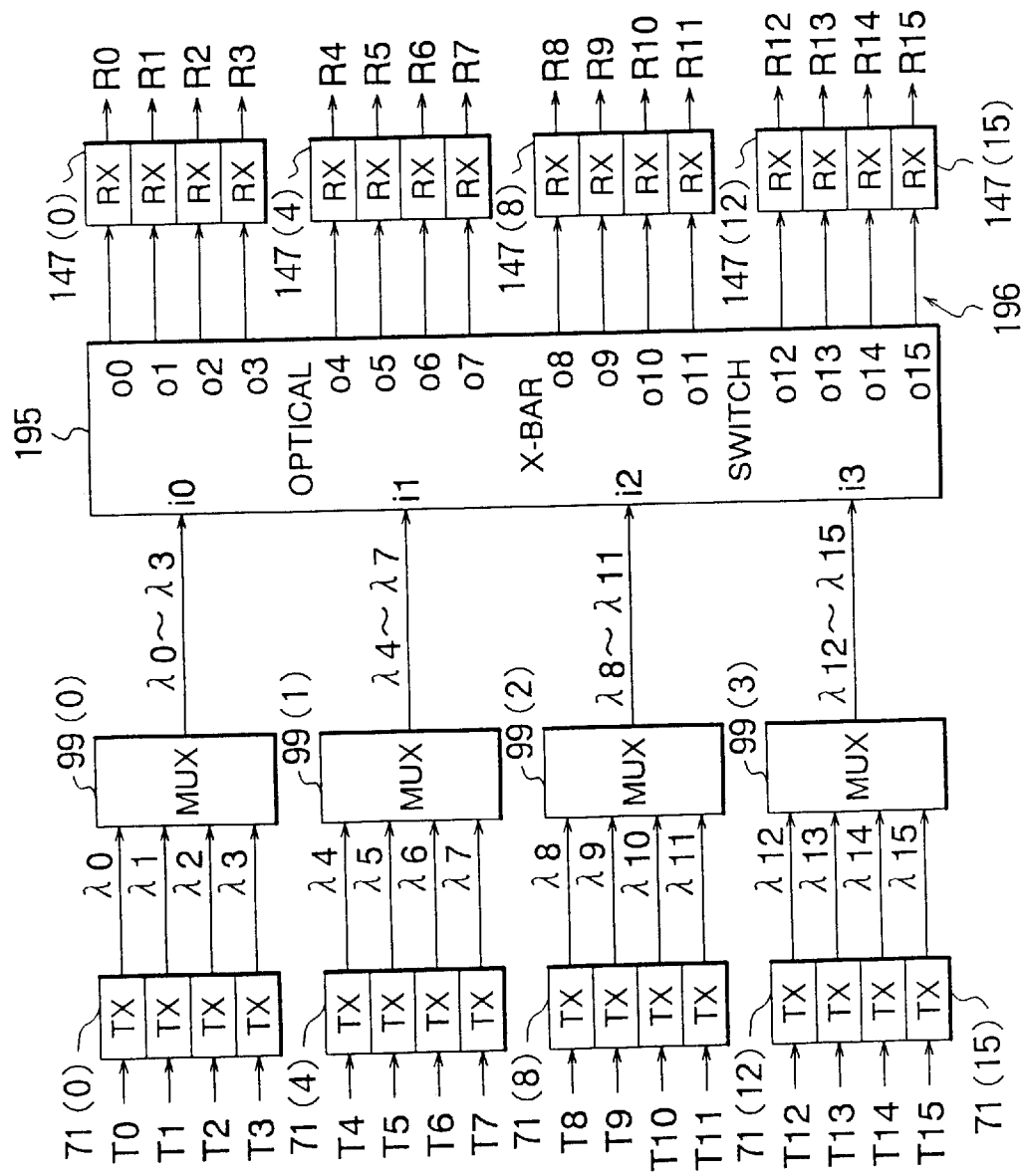
FIGS. 37 to 40 are block diagrams of optical networks according respectively to fifteenth to eighteenth embodiments of this invention.

Referring to FIG. 37, an optical network is according to a fifteenth preferred embodiment of this invention. Each of the primary first and second predetermined integers P and Q is equal to four. The secondary predetermined integer M is equal to fifteen. The zeroth to the fifteenth optical signals are produced by the zeroth to the fifteenth optical transmitters 71 with the zeroth to the fifteenth wavelengths $\lambda 0$ to $\lambda 15$ as indicated by the legends. Like in FIG. 34, use is made of the zeroth to the third wavelength multiplexers 99 and the ternary optical crossbar exchange 195 having the zeroth to the third input ports i0 to i3 or i and the zeroth to the fifteenth output ports o0 to o15 or 196. Like in FIG. 14, the zeroth to the fifteenth multiplexed optical signal receivers 147 are connected to the ternary exchange 195 at its output ports 196.

Supplied with the zeroth to the fifteenth optical signals of the wavelengths $\lambda 0$ to $\lambda 15$, the zeroth to the third wavelength multiplexers 99 respectively produce the zeroth to the third wavelength multiplexed signals in which multiplexed are the wavelengths $\lambda 0$ to $\lambda 3$, the wavelengths $\lambda 4$ to $\lambda 7$, the wavelengths $\lambda 8$ to $\lambda 11$, and the wavelengths $\lambda 12$ to $\lambda 15$. At the zeroth to the fifteenth output ports 196, the ternary exchange 195 produces respectively the zeroth to the fifteenth exchanged signals, in each of which multiplexed are four wavelengths $\lambda 0$ to $\lambda 3$, $\lambda 4$ to $\lambda 7$, $\lambda 8$ to $\lambda 11$, or $\lambda 12$ to $\lambda 15$. As described in connection with FIG. 15, each wavelength multiplexed signal receiver 147 comprises the zeroth to the fifteenth optical receivers 91 and the zeroth to the fifteenth memory units 69.

In FIG. 37, it will be assumed that the zeroth, the first, and the fourth transmitting nodes T0, T1, and T4 are simultaneously transmitting their electric transmission signals with the first, the zeroth, and also the zeroth receiving nodes R1, R0, and R0 selected as the final destinations. The zeroth transmission signal is converted by the zeroth optical transmitter 71(0) into the zeroth optical signal of the zeroth wavelength. Likewise, the first transmission signal is converted to the first optical signal of the first wavelength. The zeroth wavelength multiplexer 99(0) produces the zeroth wavelength multiplexed signal in which multiplexed are the zeroth and the first wavelengths. The fourth transmission signal is converted by the fourth optical transmitter 71(4) to the fourth optical signal of the fourth wavelength. The first wavelength multiplexer 99(1) produces the first wavelength multiplexed signal in which "multiplexed" is only the fourth wavelength.

Supplied with the zeroth wavelength multiplexed signal at the zeroth input port i0 and with the first wavelength multiplexed signal at the first input port i1, only the zeroth and the first optical amplifiers 83(0) and 83(0) of the zeroth optical switch 197(0) (FIG. 35) and only the zeroth optical amplifier 83(0) of the first optical switch 197(1) are switched on according to the intermediate destinations of the output ports o0 and o1, respectively. The ternary exchange 195 therefore produces respectively at the output ports o0 and o1 the zeroth and the first exchanged signals in which multiplexed are the wavelengths $\lambda 0$, $\lambda 1$, and $\lambda 4$ and the wavelengths $\lambda 0$ and $\lambda 1$. In response to the zeroth exchanged signal, the wavelength demultiplexer 149 (FIG. 15) of the zeroth multiplexed optical receiver 147(0) directs the receiver input signals of the wavelengths $\lambda 0$, $\lambda 1$, and $\lambda 4$ respectively to the zeroth, the first, and the fourth optical receivers 91(0), 91(0), and 91(4) connected thereto. Responsive to the first exchanged signal, the wavelength demultiplexer 149 of the first multiplexed optical signal receiver 147(1) delivers the receiver input signals of the wavelengths $\lambda 0$ and $\lambda 1$ respectively to the zeroth and the first optical receivers 91(0) and 91(0) connected thereto.

Connected to these optical receivers 91(0), 91(0), and 91(4) in the zeroth multiplexed optical signal receiver 147(0), the zeroth, the first, and the fourth memory units 69(0), 69(1), and 69(4) respectively store their contents. Similarly, the zeroth and the first memory units 69(0) and 69(1) respectively store their contents in the first multiplexed optical signal receiver 147(1). In the manner described in conjunction with FIGS. 14 and 15, no arbitration is necessary between the contents of the zeroth memory units of the zeroth and the first multiplexed optical signal receivers 147(0) and 147(1). These contents are collectively delivered to the first receiving node R1 as the first electric reception signal. After settling the arbitration, the contents of the first memory units 69(1) of the zeroth and the first multiplexed optical receivers 147(0) and 147(1) and the content of the fourth memory unit 69(4) of the zeroth multiplexed optical signal receiver 147(0) are supplied in succession to the zeroth receiving node R0.

Figure 38:
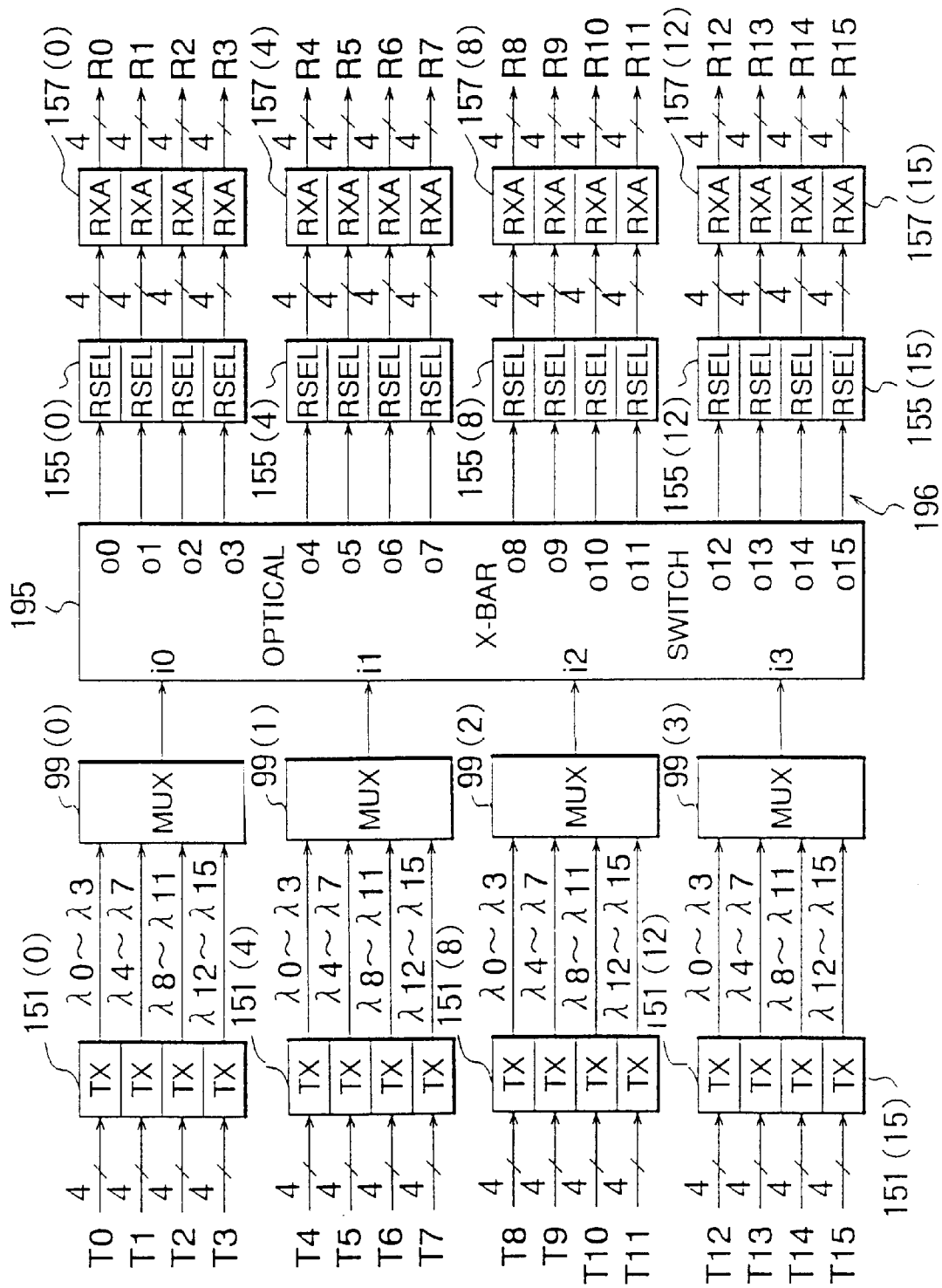

Referring to FIG. 38, an optical network is according to a sixteenth preferred embodiment of this invention. For the optical network being illustrated, each of the primary first and second predetermined integers P and Q is equal to four. The secondary predetermined integer M is equal to sixteen. The ternary predetermined integer S is equal also to four. As in FIG. 17, sixteen wavelengths are grouped into the zeroth to the third wavelength groups $\lambda G(0)$ to $\lambda G(3)$ or $\lambda G$. In this optical network, the zeroth to the third wavelength multiplexers 99 and the ternary optical crossbar exchange 195 are substituted for a combination, used in FIG. 17, of the zeroth to the third splitter/multiplexers 123 and the zeroth to the third secondary optical crossbar exchange parts 75(0) to 75(3).

The quadruple electric transmission signal of each transmitting node T is converted by a correspondingly numbered one of the multiplexed optical signal transmitters 151 to a four-wavelength optical signal of a pertinent one of the wavelength groups $\lambda G$ as indicated by the legends $\lambda 0$ to $\lambda 3$ or the like. In the multiplexed optical signal transmitter 151, each multiplexer 153 should have in FIG. 38 a wider wavelength range to deal with the four wavelength groups $\lambda G$ instead of only the four wavelengths. Each of the router-selectors 155 is operable as described in connection with FIGS. 19 to 21. More particularly, each router-selector 155 is supplied with an input signal with one or more wavelength groups and supplies its zeroth to third routed waveguides 167 in general with the zeroth to the third routed groups $\lambda rG$ in accordance with switch on and off of the optical amplifiers 163. Each optical receiver array 157 comprises its zeroth to third optical receivers 91 connected to the zeroth to the third routed waveguides 167.

In FIG. 38, it will be assumed that the zeroth and the first transmitting nodes T0 and T1 are concurrently transmitting the zeroth and the first electric multiplexed transmission signals respectively with the first and the zeroth nodes R1 and R0 selected as their final destinations. The zeroth and the first electric multiplexed signals are converted by the zeroth and the first multiplexed optical signal transmitters 151(0) and 151(0) to the zeroth and the first optical signals and delivered to the zeroth wavelength multiplexer 99(0) with the wavelength groups $\lambda G(0)$ and $\lambda G(1)$. The zeroth wavelength multiplexer 99(0) produces the zeroth multiplexed signal as the zeroth exchange input signal in which the zeroth and the first wavelength groups are multiplexed.

In the ternary exchange 195, only the zeroth and the first optical amplifiers 83(0) and 83(0) are switched on in the zeroth optical switch 197(0) alone in accordance with the intermediate destinations of the zeroth and the first output ports o0 and o1. The ternary exchange 195 therefore produces the zeroth and the first exchanged signals, in each of which the zeroth and the first wavelength groups $\lambda G(0)$ and $\lambda G(1)$ are combined. In the zeroth router-selector 155(0), the first optical amplifier 163(0) alone is switched on. The router 165 supplies the optical receivers 91 of the zeroth optical receiver array 157(0) respectively with the receiver input signals of the wavelengths $\lambda 4$ to $\lambda 7$. In the first router-selector 155(1), the zeroth optical amplifier 163(0) alone is switched on. The router 165 supplies the optical receivers 91 of the first optical receiver array 157(1) respectively with the receiver input signals of the wavelengths $\lambda 0$ to $\lambda 3$. The zeroth and the first optical receiver arrays 157(0) and 157(1) respectively supply the zeroth receiving node R0 with an electric reproduction of the first multiplexed transmission signal and the first receiving node R1 with another electric reproduction of the zeroth multiplexed transmission signal.

In the manner similar to that described in connection with FIG. 34, it is possible with the optical network of FIG. 38 to carry out the multicast. Furthermore, the optical network is theoretically an optical crossbar network and easy to control because of the unique decision of each transmission route from an arbitrary one of the transmitting nodes T to any one of the receiving nodes R.

The optical network has a large exchange capacity which is four times as great as that achieved by a sixteen by sixteen optical exchange network implemented in accordance with a conventional structure of FIG. 2. The number of the optical amplifiers 83 and 163 are equal to sixty-four in the ternary exchange 195 and also sixty-four in the zeroth to the fifteenth router-selectors 155. The total of one hundred and twenty-eight is only a half of a total number of two hundred and fifty-six for the semiconductor optical amplifiers 83 indispensable on implementing a sixteen by sixteen exchange network with the structure of FIG. 2.

Figure 39:
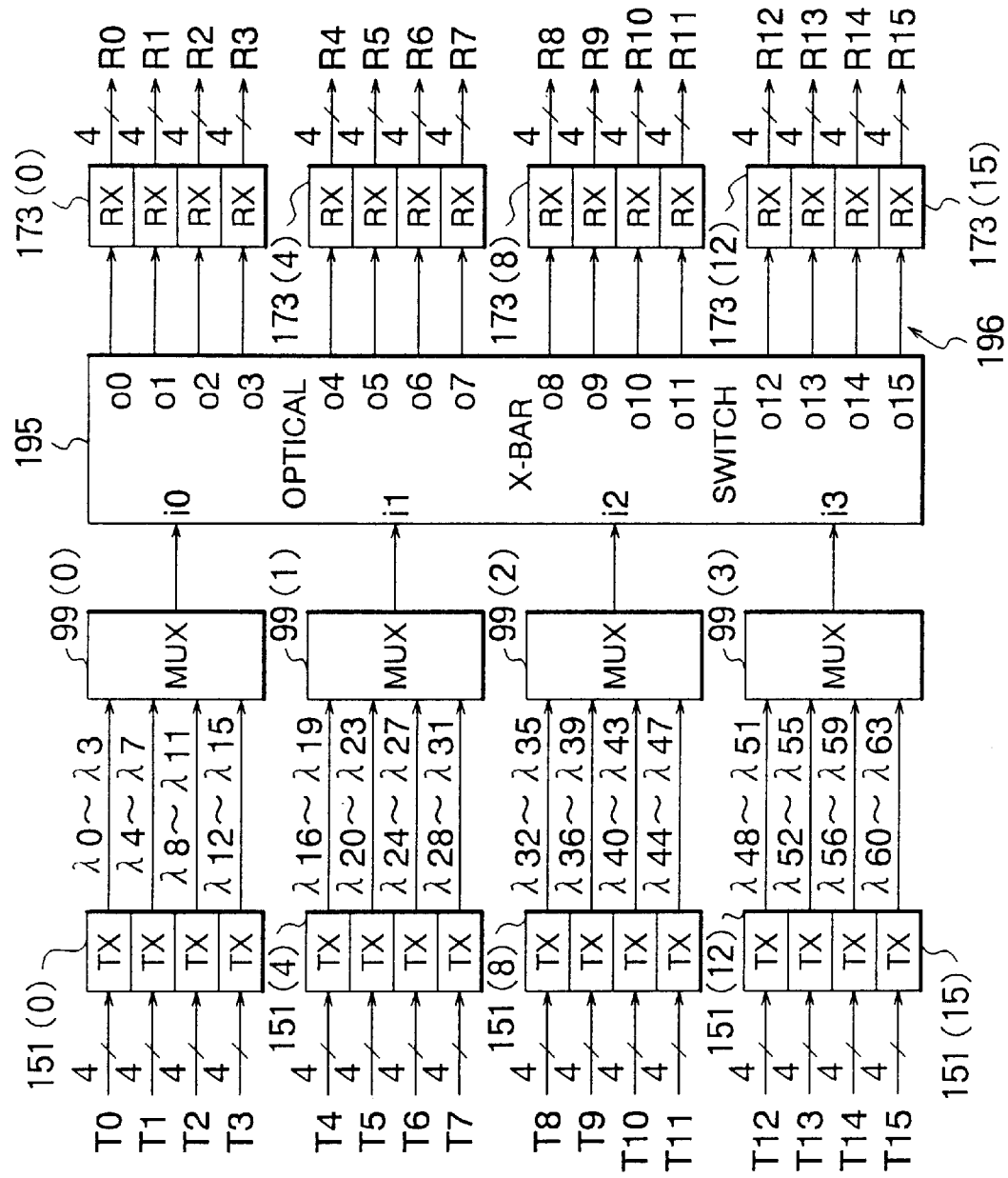

Referring to FIG. 39, an optical network is according to a seventeenth preferred embodiment of this invention. For the optical network, each of the primary first and second predetermined integers P and Q and the secondary first predetermined integer U is equal to four. The secondary second predetermined integer V is equal to sixteen. The ternary predetermined integer S is equal to four. In the optical network being illustrated, the zeroth to the fifteenth multiplexed optical signal receivers 173 (FIGS. 24 and 25) are substituted for a combination, used in FIG. 38, of the router-selectors 155 and the optical receiver arrays 157. The zeroth to the sixty-third wavelengths $\lambda 0$ to $\lambda 63$ are grouped into the zeroth to the fifteenth wavelength groups $\lambda G(0)$ to $\lambda G(15)$, which are assigned respectively to the multiplexed optical signal transmitters 151.

In FIG. 39, it will be assumed as before that the zeroth, the first, and the fourth transmitting nodes T0, T1, and T4 are concurrently transmitting quadruple multiplexed electric transmission signals with their final destinations selected respectively at the first, the zeroth, and also the zeroth receiving nodes R1, R0, and R0. Produced at the zeroth and the first transmitting nodes T0 and T1, the zeroth and the first quadruple multiplexed electric transmission signals are respectively converted by the zeroth and the first multiplexed optical signal transmitters 151(0) and 151(0) for supply in common to the zeroth wavelength multiplexer 99(0) to the zeroth and the first quadruple multiplexed optical signals of the zeroth and the first wavelength groups $\lambda G(0)$ and $\lambda G(1)$ as indicated by the legends representative of the wavelengths $\lambda 0$ to $\lambda 3$ and $\lambda 4$ to $\lambda 7$. For delivery to the first wavelength multiplexer 99(1) a fourth quadruple multiplexed optical signal of the fourth wavelength group $\lambda G(4)$ is produced by the fourth multiplexed optical signal transmitter 151(4) in response to the fourth quadruple multiplexed electric signal. The zeroth and the first wavelength multiplexers 99(0) and 99(1) respectively produce the zeroth and the first wavelength multiplexed signals in which multiplexed are the zeroth and the first wavelength groups $\lambda G(0)$ and $\lambda G(1)$ and only the fourth wavelength group $\lambda G(4)$, respectively.

At the ternary optical crossbar exchange 195, the zeroth and the first wavelength multiplexed signals are supplied respectively to the zeroth and the first input ports i0 and i1. In the zeroth and the first optical switches 197(0) and 197(1)(FIG. 35) connected respectively to the zeroth and the first input ports i0 and i1, only the zeroth and the first optical amplifiers 83(0) and 83(0) (FIG. 36) and the zeroth optical amplifier 83(0) alone are switched on according respectively to the intermediate destinations of the zeroth and the first output ports o0 and o1. The ternary exchange 195 therefore supplies the zeroth and the first output ports o0 and o1 respectively with the zeroth and the first exchanged signals in which combined respectively are the zeroth, the first, and the fourth wavelength groups $\lambda G(0)$, $\lambda G(1)$, and $\lambda G(4)$ and only the zeroth and the first wavelength groups $\lambda G(0)$ and $\lambda G(1)$.

Supplied with the zeroth exchanged signal, the zeroth multiplexed optical signal receiver 173(0) (FIGS. 39 and 25) delivers the receiver input signals of the wavelengths in the zeroth, the first, and the fourth wavelength groups respectively to the optical receivers 91(0) to 91(3), 91(4) to 91(7), and 91(16) to 91(19) included therein. Supplied with the first exchanged signal, the first multiplexed optical signal receiver 173(0) supplies the receiver input signals of the wavelengths in the zeroth and the first wavelength groups respectively to the optical receivers 91(0) and 91(0) included therein. In the zeroth multiplexed optical signal receiver 173(0) depicted in detail in FIG. 25, the zeroth, the first, and the fourth memory units 177(0), 177(1), and 177(4) respectively store their contents in which the first, the zeroth, and also the zeroth receiving nodes R1, R0, and R0 are indicated as the final destinations. Similarly in the first multiplexed optical signal receiver 173(0), the zeroth and the first memory units 177(0) and 177(1) respectively store their contents including the final destinations of the first and the zeroth receiving nodes R1 and R0. Originating in common at the zeroth transmitting node T0, the contents of the zeroth memory units 177(0) of the zeroth and the first multiplexed optical signal receivers 173(0) and 173(0) do not conflict with each other. It is therefore possible to deliver these contents immediately as the first quadruple reception signal to the first receiving node R1 even while being stored in the zeroth memory units 177(0) of the zeroth and the first multiplexed signal receivers 173(0) and 173(0) provided that indications of the final destination precede in the respective contents. According to the arbitration, the contents of the first memory units 177(1) of the zeroth and the first multiplexed optical receivers 173(0) and 173(0) and of the fourth memory unit 177(4) are delivered in succession as the zeroth quadruple multiplexed electric reception signal to the zeroth receiving node R0.

With the optical network being illustrated, it is possible to deal with the multicast exemplified in conjunction with FIGS. 34 to 36. This optical network is again an optical crossbar network in theory. In addition, the optical network is of a completely nonblocking type and is readily controlled because a propagation route is uniquely determined for each multiplexed electric transmission signal from one of the transmitting nodes T to an arbitrary selected one of the receiving nodes R.

In FIG. 39, the optical network has an exchanging capacity which is four times as great as that of the optical network illustrated with reference to FIG. 37 although their structures are equivalent to each other. Furthermore, this optical network is of the output buffered type in which the electric transmission signals are never kept waiting on the input side and for which the throughput is not limited to the theoretical restriction of the input buffered optical network. The number of the semiconductor optical amplifiers 83 is equal to sixty-four in the ternary optical crossbar exchange 195 alone and is equal to only a quarter of two hundred and fifty-six in total which is indispensable when a sixteen by sixteen network is implemented according to the structure of FIG. 2.

Figure 40:
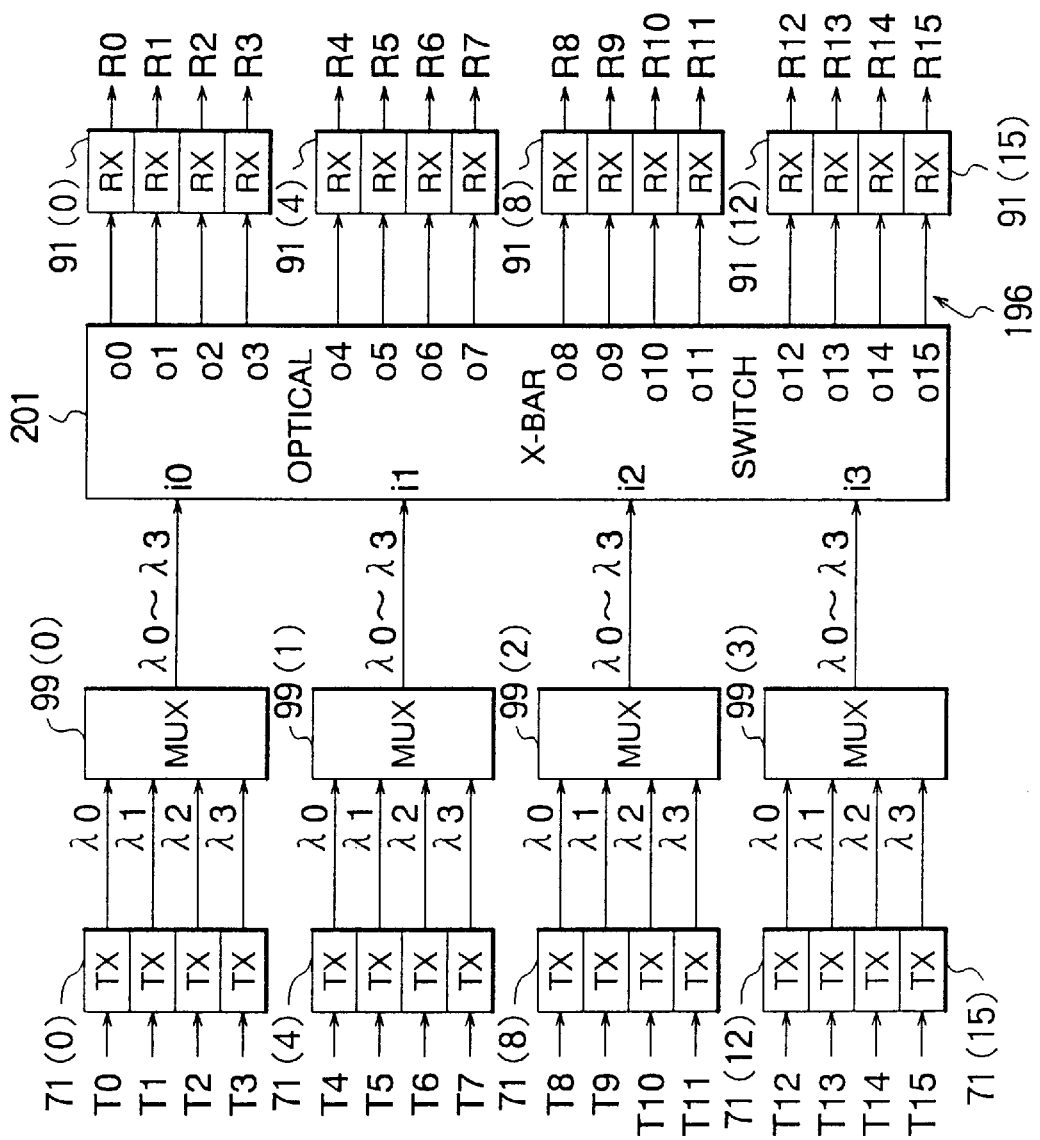

Referring to FIG. 40, an optical network is according to an eighteenth preferred embodiment of this invention. For the optical network, the primary first and second predetermined integers P and Q are equal to only one and sixteen, respectively. The secondary predetermined integer M is equal to four. In this optical network, use is made of a quaternary or wavelength selecting optical crossbar exchange (X-BAR SWITCH) 201 of the type of the wavelength selecting exchange 179 of FIG. 27 instead of a combination, used in FIG. 34, of the ternary exchange 195 and the optical selectors 135.

Figure 41:
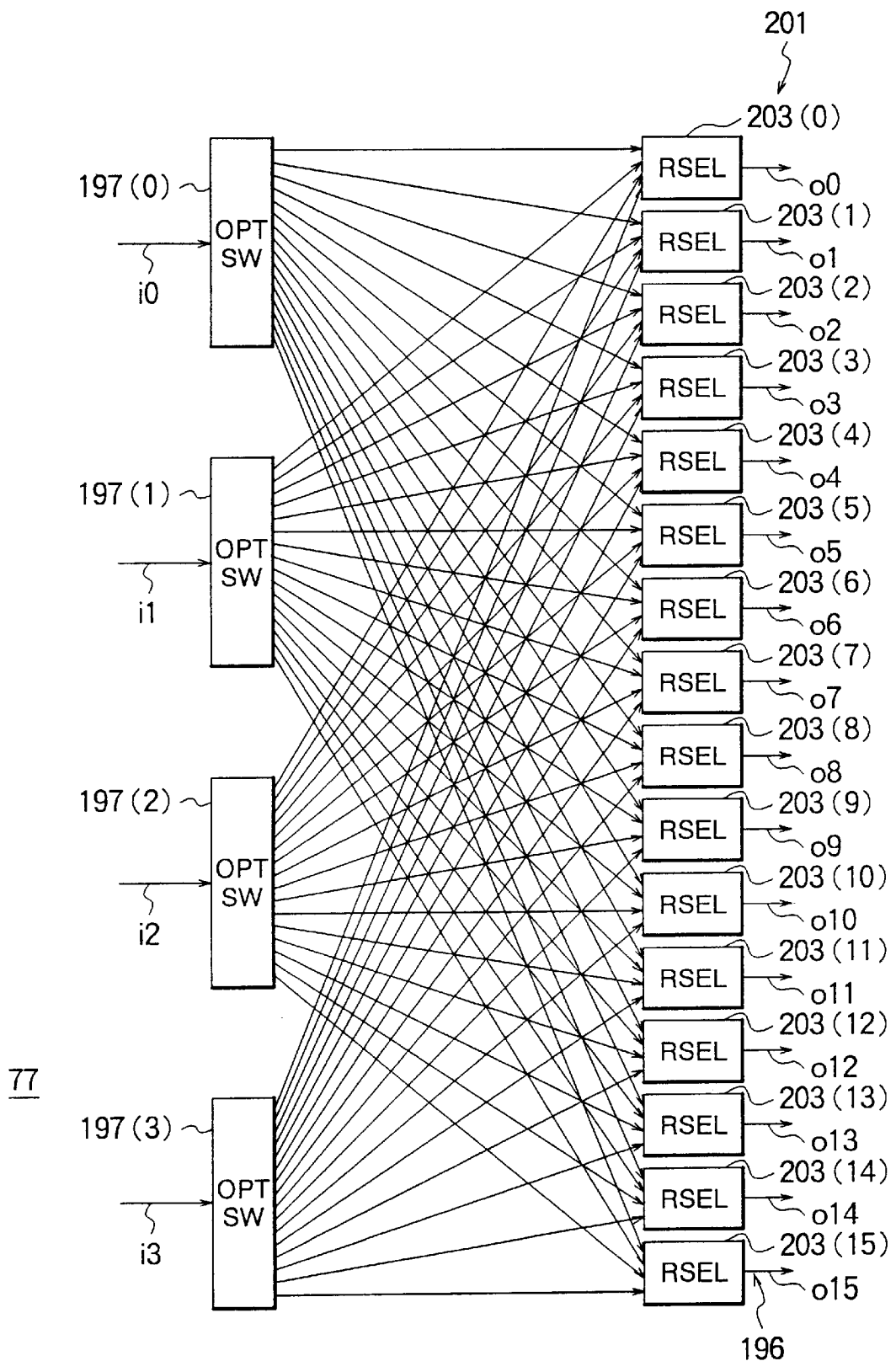
FIG. 41 is a block diagram of an optical crossbar exchange for use in the optical network illustrated in FIG. 40.

Turning to FIG. 41 for a short while, the quaternary exchange 201 comprises a semiconductor substrate, such as 77, on which formed are zeroth to third input ports i0 to i3 or i connected respectively to the zeroth to the third wavelength multiplexers 99 and zeroth to fifteenth output ports o0 to o15 or 196. On the semiconductor substrate 77, additionally formed are zeroth to third optical switches 197, each equivalent to that of FIG. 35 to have sixteen outputs, and zeroth to fifteenth optical router/selectors (R/SEL) 203(0) to 203(15) or 203 which are connected respectively to the output ports 196 and each of which has four inputs connected respectively to the optical switch 197.

Figure 42:
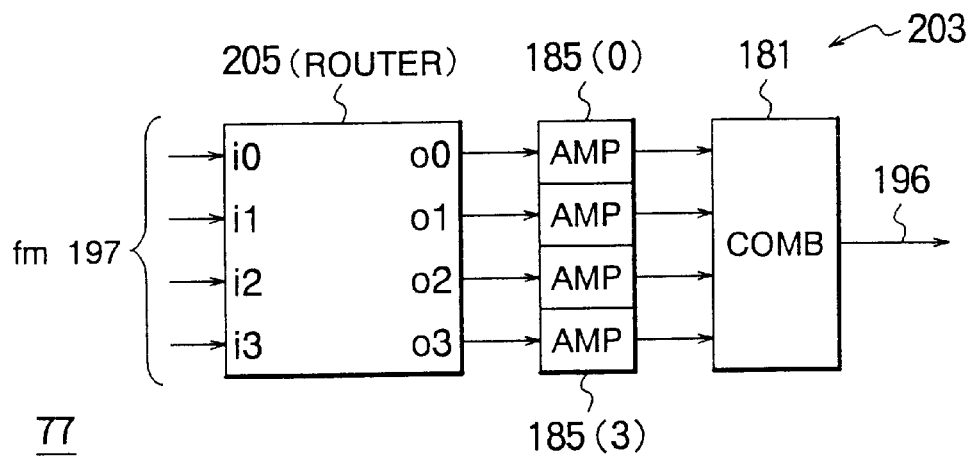
FIG. 42 is a block diagram of each router/selector used in FIG. 41.

Further turning to FIG. 42 with FIG. 40 additionally referred to, each optical router/selector 203 comprises a wavelength router 205 which is similar to the wavelength router 187 of FIG. 28 to have four inputs i0 to i3 connected respectively to the zeroth to the third optical switches 197 and four outputs o0 to o3. The four outputs G0 to o3 are respectively connected to zeroth to third semiconductor amplifiers which correspond to those depicted in FIG. 28 and will therefore be designated by the reference numerals 185(0) to 185(3) or 185. The optical amplifiers 185 are connected respectively to four inputs of the optical combiner 181 which is not different from that described in connection with FIG. 29 and is connected to one of the output ports 196. Like the wavelength router 187 of FIG. 28, the wavelength router 205 is supplied with a multiplexed optical input of the wavelengths λ0 to λ3 at one of the four inputs i0 to i3 and produces at the four outputs G0 to o3 the optical outputs with cyclically rearranged wavelengths. This one of the four inputs depends on one of the optical switches 197 that is supplied with one of the wavelength multiplexed signals from the zeroth to the third wavelength multiplexers 99. In each optical router/selector 203, the wavelength router 205 is operable in the manner listed in Table 1 given before.

Reviewing FIGS. 40 to 42, it is understood that the quaternary exchange 201 is operable like a combination, used in FIG. 34, of the ternary exchange 195 and the zeroth to the fifteenth optical selectors 135. In each optical combiner 85 of FIG. 35, an optical power loss of 3 dB takes theoretically place whenever two optical signals are subjected to two-to-one combination into an optical signal. An optical power loss of at least 6 dB is unavoidable in four-to-one combination. In contrast, such an optical power loss is absent in principle in the wavelength router 205 and amounts at most to only 2 dB even with attention directed to losses in the waveguides, such as 189 and 191 of FIG. 29, in themselves and their coupling. The quaternary exchange 201 consequently makes it easy to give a sufficient optical power to each receiver input signal of the optical receivers 91. In other respects, the optical network of FIG. 40 is operable like that of FIG. 34.

Figure 43:
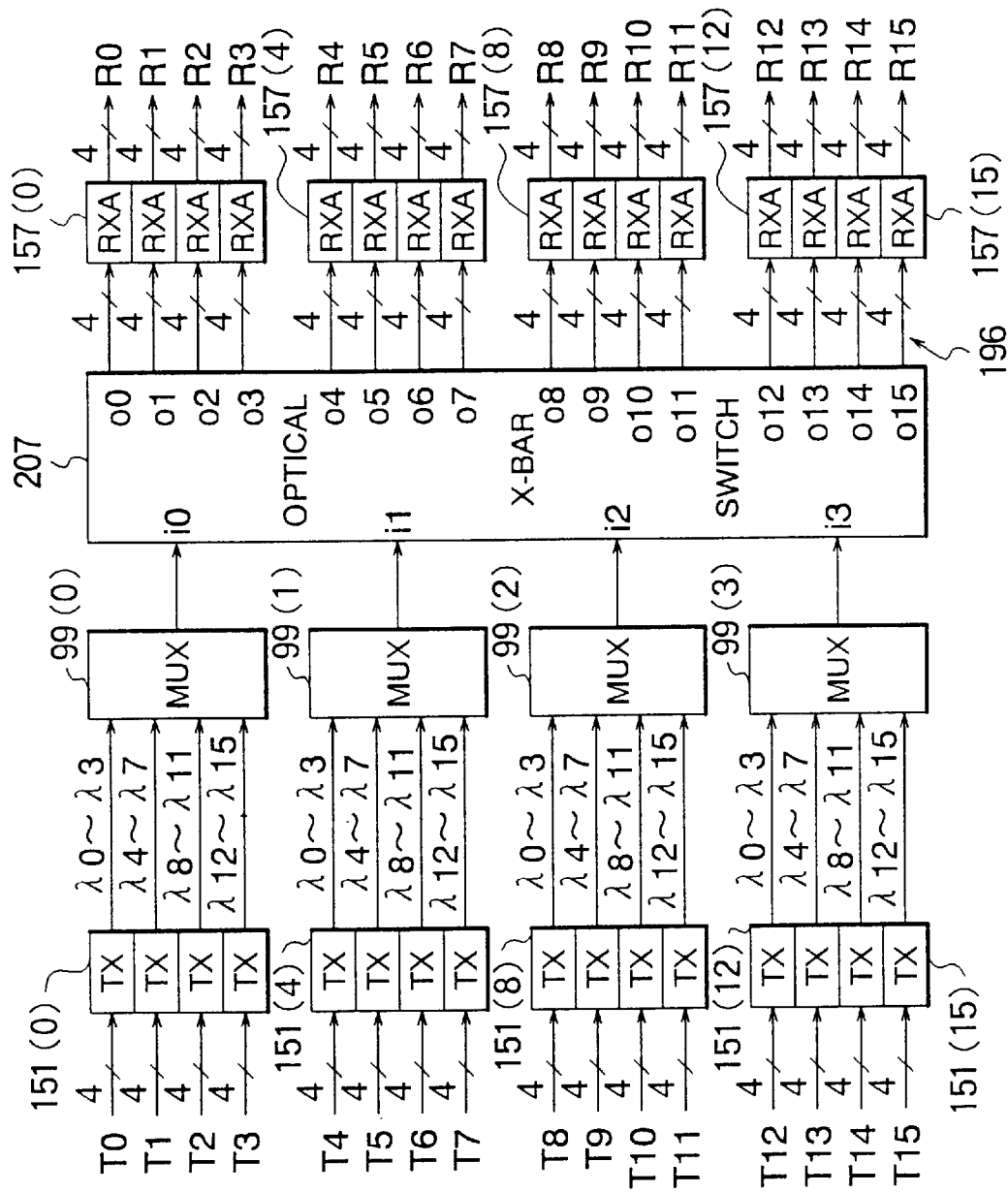
FIG. 43 is a block diagram of an optical network according to a twentieth embodiment of this invention.

Referring to FIG. 43, the description will proceed to an optical network according to a nineteenth preferred embodiment of this invention. For this optical network, each of the primary first and second predetermined mined integers P and Q and the secondary first and second predetermined integers U and V is equal to four. The ternary predetermined integer S is equal to four. The sixteen wavelength λ0 to λ15 are grouped into the zeroth to the third wavelength groups λG(0) to λG(3) or λG. The optical network is therefore similar to that illustrated with reference to FIG. 31 except for the fact the a combination of the splitter/multiplexers 123 and the wavelength selecting optical crossbar exchange parts 179 is changed, like in FIG. 38 into a combination of the zeroth to the third wavelength multiplexers 99(0) to 99(3) and a quinary optical crossbar exchange (X-BAR SWITCH) 207 having, like the quaternary exchange 195 of FIG. 34, the zeroth to the third input ports i0 to i3 or i and the zeroth to the fifteenth output ports o0 to o15 or 196.

Figure 44:
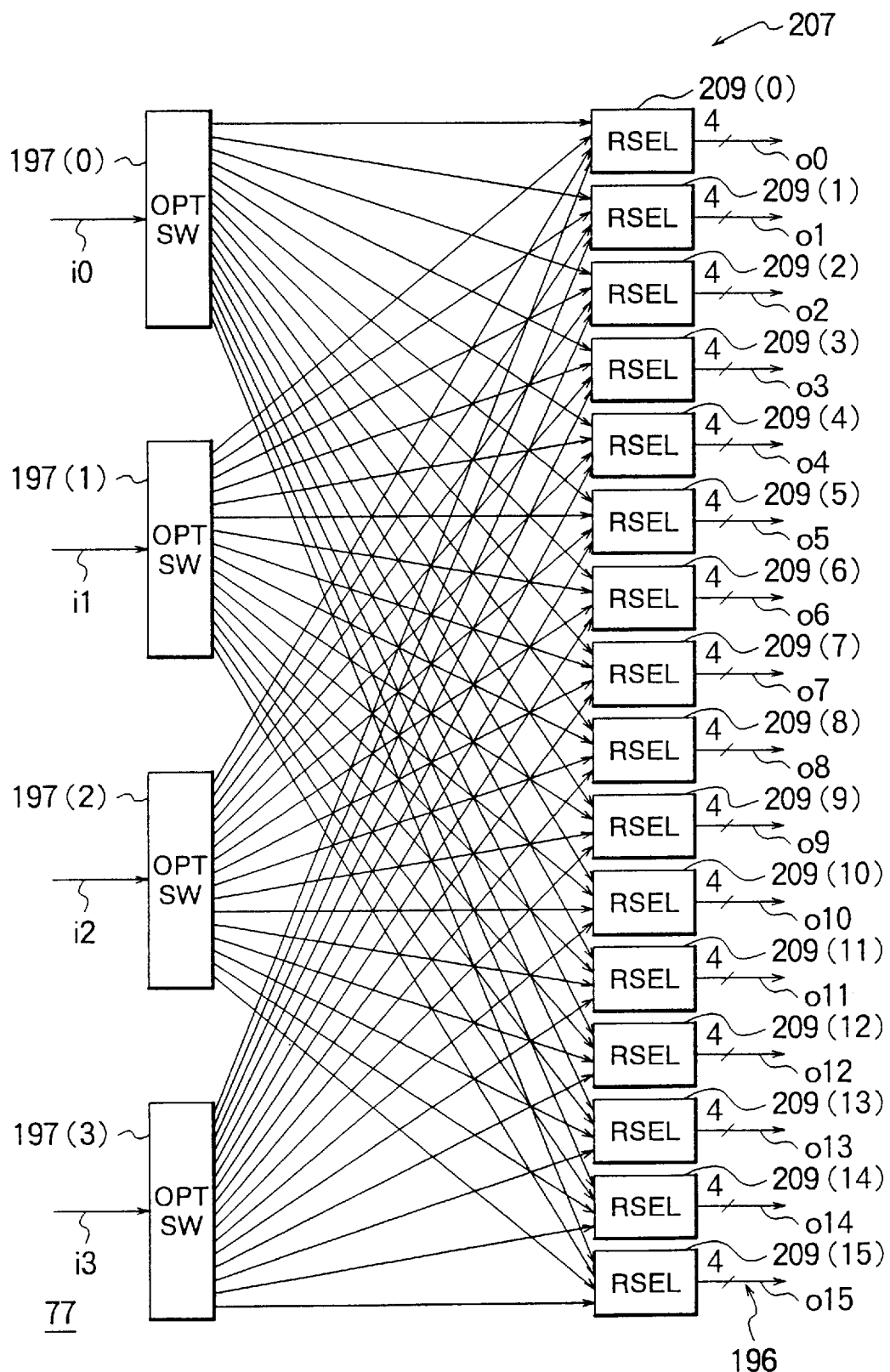
FIG. 44 is a block diagram of an optical crossbar exchange for use in the optical network illustrated in FIG. 30.

Turning to FIG. 44 for a short while, the quinary exchange 207 is similar in structure to the exchange 195 of FIG. 35 or the exchange 201 of FIG. 41 and comprises the semiconductor substrate 77 on which the zeroth to the third optical switches 197(0) to 197(3) are formed, each optical switch 197 having sixteen switch outputs. Use is made, however, instead of the combiners 85 of FIG. 35, of zeroth to fifteenth wavelength router/selectors (RSEL) 209(0) to 209(15) or 209 having selector outputs connected to the output ports 196, respectively. Like the router/selector 203 described in conjunction with FIG. 41, each router/selector 209 has zeroth to third selector inputs connected respectively to the zeroth to the third optical switches 197 at their switch outputs which respectively correspond to the zeroth to the fifteenth router/selectors 209.

Figure 45:
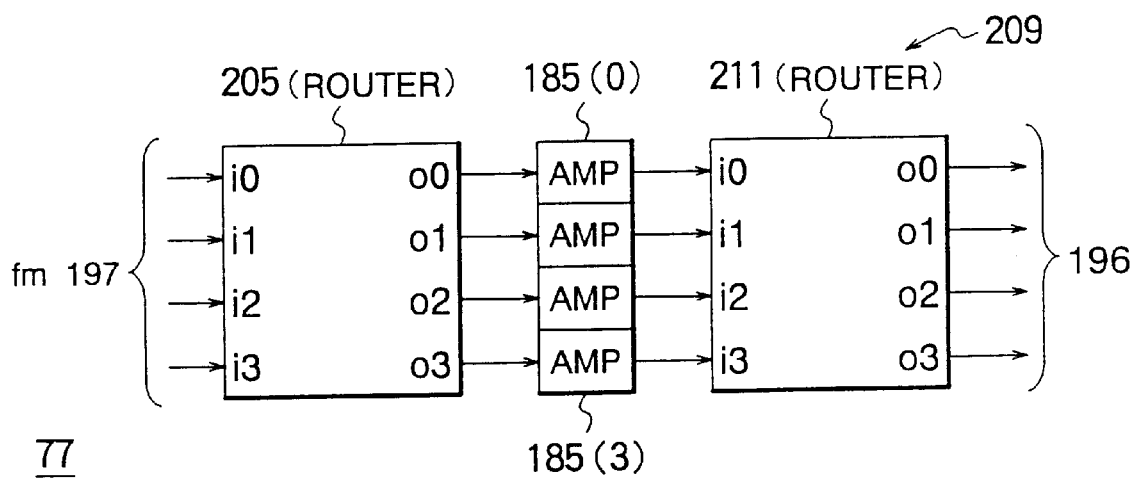
FIG. 45 is a block diagram of each router/selector used in FIG. 44.

Further turning to FIG. 45 with FIGS. 43 and 44 additionally referred to, each router/selector 209 is similar in structure to the router/selector 203 illustrated with reference to FIG. 42. In FIG. 45, the router 205 of FIG. 42 is formed on the semiconductor substrate 77 and will be referred to as a primary router 205. A secondary router 211 is similar to the router 193 of FIG. 32 and has zeroth to third secondary router outputs which are used collectively as one of the output ports 196 and are connected respectively to inputs of zeroth to fifteenth optical receiver array 157 described with reference to FIG. 22.

It is understood in FIGS. 43 to 45 that each primary router 205 is operable as listed in Table 2 given before and that each secondary router 211 is operable in the manner listed in Table 3 given also before. In FIGS. 34 and 38, an optical power loss of at most 6 dB is inevitable in each optical combiners 85 of optical crosbar exchange 197. In contrast, the combiner/selectors 209 individually give an optical power loss of at most 4 dB to each exchanged signal in the manner discussed in connection with FIG. 32. As a consequence, the quinary exchange 207 is operable as a combination of a quaternary exchange 195 and the router/selectors 155 of FIG. 38 and is despite possible to give a sufficient optical power to each receiver input signal for the optical receivers 91 used in the receiver arrays 157 of the type illustrated with reference to FIG. 22. In other respects, the illustrated optical network is operable as described in connection with the optical receiver of FIG. 38.

Reviewing FIGS. 3 to 45 with FIGS. 1 and 2 taken into consideration, it should be known to optionally divide the primary and the secondary predetermined integers N and M. Similarly possible to divide the primary and the secondary first and second predetermined integers P, Q, U, and V and the ternary predetermined integer S provided that products of P and Q and of U and V are equal respective to N and M and that the wavelengths of the second predetermined integer M in number may be divided by the ternary predetermined integer S into a plurality of wavelength groups λG, such as the wavelength groups λG(0) to λG(4) or λG(0) to λG(15). Each of the secondary first integer U and the ternary predetermined integer S may be equal to only one provided that each electric transmission signal is not a multiplexed transmission signal and accordingly that the optical transmitters 71 are used rather than the multiplexed optical signal transmitters 151.

Furthermore, each of the primary to the quinary optical crossbar exchanges or their parts 97, 75, 195, 201, and 207 and the wavelength selecting optical crossbar exchanges 179 of FIGS. 27 and 31 may not be formed on the semiconductor substrate 77 but on a substrate of silicon, polymer, lithium niobate, or the like. Each of the exchanges 75, 97, 179, 195, and 207 may not be an optical crossbar exchange of a splitter/combiner type but may be an optical crossbar exchange of any one of a directional coupler type, a Mach-Zehnder type, and a mechanical type, in which use is made of an electro-optical effect, an acoustic-optical effect, or a temperature-optical effect.

Similarly, each of the demultiplexers and the multiplexers 99, 111, and others may not be formed on the semiconductor substrate 77 but on a substrate of silicon or polymer. For example. silica arrayed waveguide grating device, fabricated on silicon substrate, is applicable. Each of such demultiplexers and the multiplexers may not be of the arrayed waveguide grating type but may be either demultiplexers and multiplexers, each including a diffraction grating of a different type, or an optical filter of any one of a Fabry-Perot type, an acoustic-optical effect type, and an interferometer type, Similarly, each of the semiconductor optical amplifiers 83, 163, and others may be either an optical modulator of electro-absorption type or an amplifier made of an erbium doped optical fiber. Alternatively, it is possible to use a Mach-Zehnder optical switch, a mechanical optical switch, or a liquid crystal optical switch.

In addition, the optical transmitter, such as 71 or 151, and each optical crossbar exchange, such as 75, 97, 179, 195, and 207, may not be interconnected by an optical fiber but by a optical waveguide formed on a substrate of the above-exemplified material other than a semiconductor material. It is possible to optionally select the wavelength except for the wavelengths, such as λ0 to λ15, which must be selected in a predetermined order, as for use in the optical network described in connection with FIGS. 17 and 20.

In FIGS. 8, 13, 17, 23, 34, 38, and 44, each optical or wavelength selector 135, 155, or 209 may be formed on a substrate of silicon, polymer, or lithium niobate. Alternatively, wavelength multiplexer of such an optical or wavelength selector may be an optical coupler. As a further alternative, it is possible to use a wavelength tunable optical filter, such as a Fabry-Perot optical filter, acoustic-optic filter, or a wavelength tunable interference filter.

In FIGS. 8, 14, 17, 24, 27, and 31, each splitter/multiplexer 123 need not be of the type described in connection with these drawing figures. For example, it is possible to use a star coupler exemplified in conjunction with FIG. 17.

In FIGS. 14, 16, 24, 26, 37, and 39, each combiner 85 in the secondary optical crossbar exchange parts 75 or of the ternary optical crossbar exchange 195 is supplied at its input waveguides or ports with optical signals of different wavelengths. It is therefore possible to use the optical multiplexer 99 of the arrayed waveguide grating type for each combiner 85 and thereby to get rid of the optical loss inevitable in the combiner 85.

In FIGS. 27, 40, and 43, each of the wavelength selecting optical crossbar switch 179 and the quaternary optical crossbar exchange 201 comprises optical switches, each composed of the optical amplifiers 185 and an optical combiner 181. Each optical switch may be composed of directional coupler optical switches or Mach-Zehnder optical switches which are tree-connected. In each of these optical combiners 181, it is possible to substitute single-mode optical waveguides for the multimode optical waveguides 191 although the before-mentioned optical loss of 3 dB is unavoidable in each two-to-one coupling. It is possible to use as the optical crossbar exchanges 75, 95, 195, and 207 or the optical selectors 135, 155, and 209 either an integrated device or discrete devices formed on a silicon or a semiconductor substrate, such as 77.

With each of the optical networks of FIGS. 4, 8, 13, 14, 16, 17, 23, 24, 26, 27, 31, 38, 37, 39, 44, and the like, it is possible to carry out the multicast in the manner described in conjunction with FIGS. 34, 38, and 39. It is, however, necessary that the primary optical crossbar exchange 97 should be capable of, in this case, exchanging an exchange input signal concurrently into two or more exchanged signals.

Each of the optical networks of FIGS. 8, 13, 14, 16, 17, 23, 24, 26, 27, 30, 31, and 33, has a salient feature of modularity. More particularly, it is possible to form a transmitter module by four of the optical transmitters 71 and the primary optical crossbar exchange 75 or one of its parts 133 connected thereto. Alternatively, it is possible to form a receiver module by each secondary optical crossbar exchange part 75 and four multiplexed optical signal receivers 151 connected thereto. This makes it possible to readily adapt the optical network to a desired scale by merely increasing the number of pairs of the transmitter and the receiver modules.

The optical networks described with reference to FIGS. 4, 14, 16, 24, 26, 37, and 39, are of the output buffered type. Such being the case, it is made possible with this invention to raise the throughput beyond the theoretical restriction of 58.6%. According to the optical networks illustrated with reference to FIGS. 3 and 5 to 45, it is possible to decrease an amount of hardware in comparison to the conventional optical networks of FIGS. 1 and 2 and thereby to provide an optical network which is compact and low cost. For example, it will be assumed that an optical network is established according to FIG. 8. When sixteen wavelengths are used to provide a 1,024 by 1,024 network, the number of indispensable semiconductor optical amplifiers 83 and 141 is equal to 65,536 for the secondary optical crossbar exchange parts 75 and 16,384 for the optical selectors. The total amounts to 81,920. This total is in markedly less than a similar total indispensable with a conventional optical network which may be of the structure of FIG. 1 and in which the total amounts as great as 1,048,576. The indispensable number is reduced to one-thirteenth with this invention.

With the optical networks of FIGS. 17, 23, 24, 26, 31, 33, 38, 39, and 44, it is possible to increase an exchange capacity with the number of optical gate switches, such as 83 and 141 kept constant. For example, the optical network of FIG. 17 will be compared with that of FIG. 8. Furthermore, the number of the transmitting nodes T and consequently that of the receiving nodes R will be assumed equal to that of the optical or multiplexed optical signal transmitters 91 or 151 and that digital signals are exchanged by the optical networks. When a unit bit rate per one wavelength is 10 Gb/s in FIG. 8, an input and output bit rate per node T or R is also 10 Gb/s. The exchange capacity is equal to 160 Gb/s for the whole optical network of FIG. 8. In contrast, the input and output bit rate is 40 Gb/s in FIG. 17. The exchange capacity amounts to 640 Gb/s with the whole optical network of FIG. 17 and to four times that achieved with the whole optical network of FIG. 8.

It is possible to use modules in composing each of the optical networks of FIGS. 8, 13, 14, 16, 17, 23, 26, 27, 30, 31, and 33. This makes it possible readily by a module pair to enlarge or reduce the scale of each optical network, to reduce the cost, to facilitate mounting, and to simplify maintenance.

With the optical networks of FIGS. 13, 16, 23, 26, 30, and 33, it is possible to enlarge a power margin of the receiver input signal of each optical receiver 91 in comparison with each of the optical networks of FIGS. 8, 14, 17, 24, 27, and 31. In contrast, each of the optical networks of latter drawing figures need a less number of the semiconductor optical amplifiers and is compact and of low cost in comparison with each of the optical networks of former drawing figures. It is also possible to enlarge the power margin with the optical networks of FIGS. 27, 30, 31, 33, 40, and 44 and to readily provide an optical network of a larger scale. For example, the quaternary optical crossbar exchange 201 gives rise in FIG. 40 to an optical power loss which is about 6 dB less than that results from a combination, in FIG. 34, of the ternary optical crossbar exchange 195 and each optical selector 135.

With the optical networks of FIGS. 4, 8, 14, 17, 24, 27, 31, 37, 38, 39, 40, 44, and the like, it is possible to carry out the multicast. Incidentally, it makes the optical crossbar exchanges 75, 97, 179, 195, 201, and 207 contribute to the multicast because it is possible to exchange various exchange input signals of different wavelength or different wavelength groups into an exchanged signal at one alone of their output ports and to prevent such exchanged signals from conflicting with one another. With each of these optical crossbar exchanges, it is additionally possible to contribute to the capability of multicast because it is possible to exchange an exchange input signal simultaneously into a plurality of exchanged signals.

What is claimed is:

1. An optical network comprising:

P transmitter groups, each consisting of Q optical transmitters respectively assigned with Q wavelengths for transmitting optical signals of different wavelengths, where each of P and Q represents an integer which is not less than two;

P splitter/multiplexers, each for wavelength splitting and multiplexing the Q optical signals of one of said transmitter groups into Q split and multiplexed signals having multiplexed wavelengths;

Q wavelength selecting optical crossbar exchanges, each having P input ports and P output ports, supplied with said split and multiplexed signals from said splitter/multiplexers as exchange input signals and comprising P one-input and P-output splitters for splitting said exchange input signals into $P^2$ split signals with said multiplexed wavelengths split in each split signal, $P^2$ optical gate switches for respectively switching said split signals into at least one switched signal, P-input and Q-output wavelength routers connected respectively to said optical gate switches, and P optical selectors having PQ inputs respectively connected to outputs of said P wavelength routers and P outputs respectively connected to said output ports, said optical crossbar exchange being for exchanging and selecting said selected exchange input signals into at least one exchanged and selected signal produced at one of said output ports with selected wavelengths of said Q wavelengths;

PQ optical receivers for converting said exchanged signals respectively to electric reception signals.

2. An optical network comprising:

P transmitter groups, each consisting of Q multiplexed optical signal transmitters and assigned with Q wavelength groups, each consisting of S wavelengths, for transmitting multiplexed optical signals of different wavelength groups, where each of P, Q, and S represents an integer which is not less than two;

P splitter/multiplexers, each for wavelength multiplexing and splitting the Q multiplexed optical signals of one of said transmitter groups into Q split and multiplexed signals having multiplexed wavelengths;

Q wavelength selecting optical crossbar exchanges each of which has P input ports and P output ports and comprises P one-input and P-output splitters for splitting P split and multiplexed signals supplied from each transmitter group into P split signals with said multiplexed wavelengths split in each split signal, $P^2$ primary optical gate switches, each for switching respectively said split signals into a less plurality of switched signals, P P-input and Q-output primary wavelength routers connected respectively to said primary optical gate switches, PQ secondary optical gate switches connected respectively to outputs of said primary wavelength routers for switching the primary switched signals routed by said primary routers into at least one secondary switched signal, and P secondary wavelength routers having Q inputs connected respectively to said secondary optical gate switches and S output ports and which are for selecting, from a plurality of exchange input signals selected from the Q multiplexed optical signals supplied from said splitter/multiplexers, a plurality of selected inputs having selected groups of said wavelength groups and exchanging said selected input signals into a plurality of exchanged signals produced by the secondary wavelength routers of said optical crossbar exchanges at different ones of the output ports of said optical crossbar exchanges with at least one of the S wavelengths of said selected groups given to each exchanged signal; and PQS optical receivers for converting said exchanged signals respectively to multiplexed electric reception signals.

3. An optical network comprising:

P transmitter groups, each consisting of Q multiplexed optical signal transmitters and assigned with Q wavelength groups, each consisting of S wavelengths, for transmitting multiplexed optical signals of different wavelength groups, where each of P, Q, and S represents an integer which is not less than two;

P primary optical crossbar exchanges each of which has Q input ports and Q output ports, and is supplied with P multiplexed optical signals from one of said transmitter groups and which are for exchanging a plurality of multiplexed optical signals supplied to different ones of the input ports of said primary optical crossbar exchanges into a primary exchanged signal produced at one of the output ports of said primary optical crossbar exchanges with the wavelength groups of said P multiplexed optical signals further multiplexed;

Q wavelength selecting and secondary optical crossbar exchanges, each having P input ports and P output ports, supplied with P primary exchange input signals including said primary exchanged signal from said primary optical crossbar exchanges as exchange input signals, and comprising P one-input and P-output splitters for splitting said exchange input signals into $P^2$ split signals with said multiplexed wavelength split in each split signal, $P^2$ primary optical gate switches for respectively switching said split signals into a less plurality of switched signals, P P-input and Q-output primary wavelength routers connected respectively to said primary optical gate switches, PQ secondary optical gate switches connected respectively to outputs of said primary wavelength routers for switching the primary switched signals routed by said primary wavelength routers into at least one secondary switched signal, and P secondary wavelength routers having Q inputs connected respectively to said secondary optical gate switches and S outputs, said secondary optical crossbar exchanges being for selecting, from a plurality of selected multiplexed optical signals selected from the exchange input signals supplied to the input ports thereof, a plurality of selected input signals having selected groups of said wavelength groups and exchanging said selected input signals into a plurality of secondary exchanged signals produced by the secondary wavelength routers thereof at different ones of the output ports thereof with at least one of the S wavelengths of said selected groups given to each exchanged signal; and PQS optical receivers for converting said secondary exchanged signals respectively to electric reception signals.

4. An optical network as claimed in claim 3, wherein said primary optical crossbar exchanges are for furthermore exchanging one multiplexed signal supplied to each input port of said primary optical crossbar exchanges into a plurality of primary exchanged signals produced at different output ports of said primary optical crossbar exchanges.

5. An optical network comprising:

P transmitter groups, each consisting of Q optical transmitters respectively assigned with Q wavelengths for transmitting optical signals of different wavelengths, where each of P and Q represents an integer which is not less than two;

P primary optical crossbar exchanges each of which has Q input ports and Q output ports and is supplied with Q optical signals from one of said transmitter groups and which are for exchanging a plurality of optical signals supplied to different ones of the input ports of said optical crossbar exchanges into a primary exchanged signal produced at one of the output ports of said optical crossbar exchanges with the wavelengths of the last-mentioned optical signals multiplexed into multiplexed wavelengths;

Q wavelength selecting and secondary optical crossbar exchanges, each having P input ports and P output ports, supplied with P optical signals including said primary exchanged signal from said primary optical exchanges as exchange input signals, and comprising P one-input and P-output splitters for splitting said exchange input signals into $P^2$ split signals with said multiplexed wavelengths split in each split signal, $P^2$ optical gate switches for respectively switching said signals into at least one switched signal, P P-input input and Q-output wavelength routers connected respectively to said optical gate switches, and P optical selectors having PQ inputs respectively connected to outputs of said P wavelength routers and P outputs respectively connected to said output ports, said secondary optical crossbar exchange being for exchanging and selecting said selected optical signals into at least one secondary exchanged and selected signal produced at one of said output ports with selected wavelengths of said Q wavelengths;

PQ optical receivers for converting said secondary exchanged signals respectively to electric reception signals.

6. An optical network as claimed in claim 5, wherein said primary optical crossbar exchanges are for furthermore exchanging one optical signal supplied to each input port of said optical crossbar exchanges into a plurality of primary exchanged signals produced at different output ports of said optical crossbar exchanges.

* * * * *